United States Patent
Lai et al.

(10) Patent No.: US 7,518,886 B1
(45) Date of Patent: Apr. 14, 2009

(54) MULTIPHASE SOFT SWITCHED DC/DC CONVERTER AND ACTIVE CONTROL TECHNIQUE FOR FUEL CELL RIPPLE CURRENT ELIMINATION

(75) Inventors: Jih-Sheng Lai, Blacksburg, VA (US); Changrong Liu, Sunnyvale, CA (US); Amy Ridenour, Salem, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 202 days.

(21) Appl. No.: 11/249,945

(22) Filed: Oct. 13, 2005

Related U.S. Application Data

(60) Provisional application No. 60/654,332, filed on Feb. 18, 2005.

(51) Int. Cl.
*H02M 3/335* (2006.01)
(52) U.S. Cl. .............................. 363/17; 363/65; 363/71
(58) Field of Classification Search ................. 363/17, 363/65, 71, 21.03, 46, 69, 70, 21.02, 45, 363/67, 98, 132
See application file for complete search history.

(56) References Cited

U.S. PATENT DOCUMENTS

| | | | | |
|---|---|---|---|---|
| 5,946,206 | A * | 8/1999 | Shimizu et al. | 363/65 |
| 6,067,237 | A * | 5/2000 | Nguyen | 363/17 |
| 6,574,125 | B2 * | 6/2003 | Matsukawa et al. | 363/71 |
| 6,944,033 | B1 * | 9/2005 | Xu et al. | 363/16 |
| 7,295,448 | B2 * | 11/2007 | Zhu | 363/17 |
| 2004/0037092 | A1 * | 2/2004 | Kurio et al. | 363/17 |

OTHER PUBLICATIONS

A. Monti, et al, Fuel Cell Based Domestic Power Supply-A Student Project, Electronics Specialists Conf., Cairns, Australia, Jun. 2002, pp. 315-320.
Y. R. Novaes, et al, Low Frequency Ripple Current Elimination in Fuel Cell Systems, Proc. of 2003 Fuel Seminar Special Session on Fuel Cell Power Conditioning, Miami, FL, pp. 21-27.
Michael E. Schenck, et al, Fuel Cell and Power Conditioning System Interactions, Electronics Conf., Austin, TX, Mar. 2005, pp. 114-120.

(Continued)

*Primary Examiner*—Akm E Ullah
*Assistant Examiner*—Harry Behm
(74) *Attorney, Agent, or Firm*—Blank Rome LLP

(57) ABSTRACT

DC/DC converter has a transformer having primary coils connected to an input side and secondary coils connected to an output side. Each primary coil connects a full-bridge circuit comprising two switches on two legs, the primary coil being connected between the switches on each leg, each full-bridge circuit being connected in parallel wherein each leg is disposed parallel to one another, and the secondary coils connected to a rectifying circuit. An outer loop control circuit that reduces ripple in a voltage reference has a first resistor connected in series with a second resistor connected in series with a first capacitor which are connected in parallel with a second capacitor. An inner loop control circuit that reduces ripple in a current reference has a third resistor connected in series with a fourth resistor connected in series with a third capacitor which are connected in parallel with a fourth capacitor.

22 Claims, 45 Drawing Sheets

OTHER PUBLICATIONS

R. S. Gemmen, Analysis for the Effect of Inverter Ripple Durrent on Fuel Cell Operating Condition, J. Fluids Eng., vol. 125, No. 3, 2003, pp. 576-585.

G. Fontes, et al, Interactions between fuel cells and power converters Influence of current harmonics on a fuel cell stack, Power Elecdtronics Specialists Conf., Aachen, Ger.

W. Choi, et al, Development of an equivalent circuit Moderl of a Fuel Cell to Evaluate the Effects of Inverter Ripple Current, Proc. of IEEE Applied Power Electronics Conf.

Praveen K. Jain, et al, Analysis and Design Considerations of a Load and Line Independent Zero Voltage Switching Full Bridge DC/DC Converter Topology, IEEE Trans. on Power Electronics, vol. 17, No. 5, Sep. 2002.

Jung G. Cho, et al, Zero Voltage and Zero Current Switching Full Bridge PWM Converter Using Secondary Active Clamp, Conf. Redc. of IEEE Power Electronics Specialists Conf. 1994.

Jung C. Cho, et al, Novel Zero-Voltage and Zero-Current-Switching (ZVZCS) Full Bridge PWM Converger Using Transformer Auxiliary Winding, Conf. Rec. of IEEE Power Electronics.

R. Watson, et al, A Soft-Switched, Full-Bridge Boost Converter Employing and Active-Clamp Circuit, Conf. Rec. of IEEE Power Electronics Specialists Conf., Jun. 1996, pp. 1948-1954.

Dachuan Yu, et al, A Novel Circuit Model For PEM Fuel Cells, IEEE Conf. Proceedings of Applied Power Electronics Conf. & Exposition, 2004, (CDROM), Feb. 2004.

Secong-Jeub Jeon, A Zero-Voltage and Ze40-Current Switching Full Bridge DC-DC Converter with Transformer Isolation, IEEE Trans. on Power Electronics, vol. 16, No. 5, Sep. 2001.

M. T. Aydemir, et al, A Critical Evaluation of High Power Hard and Soft Switched Isolated DC-DC Converters, IEEE Conf. Proceedings of Industry Applications Conf. 2002.

J. G. Cho, et al, Zero-Voltage and Zero-Current-Switching Full Bridge PWM Converter for High Power Applications, IEEE Conf. Proceedings of Applied Power Elerctonics Con. & Ex.

Guichao Hua, An Improved Full-Bridge Zero- Voltage-Switched PWM Converter Using a Saturable Inductor, IEEE Trans. on Power Electronicvs, vol. 8, No. 4, Oct. 1993.

J.A. Sabate, et al, Design Considerations for High-Voltage High-Power Full-Bridge Zero-Voltage-Switched PWM Converter, Proceedings of IEEE Applied Power Elec.

Demercil S. Oliveria, Jr., et al, A Three-Phase ZVS PWM DC/DC Converter with Asymmetricval Duty Cycle for High Power Applications, IEEE Conf. Proceedings of Power.

Ballard Power System, Nexa (310-0027) Power Module Integration Guide, 2001.

* cited by examiner

MODE 0

MODE 3 duty (4)
mean (1)

($P_O \sim 600$ W)
38.54 %
33.76 A

5ms/div 10 ms/div

MULTIPHASE SOFT SWITCHED DC/DC CONVERTER AND ACTIVE CONTROL TECHNIQUE FOR FUEL CELL RIPPLE CURRENT ELIMINATION

RELATED APPLICATIONS

This application claims the benefit of U.S. Provisional Application Ser. No. 60/654,332 entitled "Multiphase Soft-switched DC to DC Converter" filed on Feb. 18, 2005, the contents of which are incorporated herein by reference in its entirety.

STATEMENT REGARDING FEDERALLY SPONSORED RESEARCH OR DEVELOPMENT

This invention was made with government support under contract No. DE-FC26-02NT41567 awarded by the National Energy Technology Laboratory of the U.S. Department of Energy. The U.S. Government has certain rights in the invention.

BACKGROUND OF THE INVENTION

As the demand for clean energy sources increases, more research effort is being placed on fuel cells, wind-generation, and photovoltaic energy sources. Fuel cells are expected to be used in a wide variety of applications including stationary electric power plants, motive and auxiliary power for vehicles, and micro-power applications. Fuel cells are considered to be a major contribution to future energy generation devices due to energy efficiency and environmental friendliness.

For many stationary and portable power applications, the general structure is to have a low voltage fuel cell as the primary source, a DC/DC converter to obtain isolated high voltage, and a DC/AC inverter to obtain AC voltage. In a typical fuel cell power conversion system, the input source is low voltage DC and the output is high voltage AC. Solid oxide fuel cells (SOFC) are a promising option for high powered applications such as industrial applications and distributed electrical power generators. SOFC are constructed entirely from solid state materials, typically using a thin layer of stabilized zirconia (zirconium oxide) as the electrolyte in conjunction with a lanthanum manganate cathode and nickel zirconia anode.

Unfortunately, a fuel cell power system that contains a single phase DC/AC inverter tends to draw an AC ripple current at twice the output frequency. Such a ripple current may shorten fuel cell life span and worsen the fuel efficiency due to the hysteresis effect. The most obvious impact is the reduction of fuel cell output capacity because the fuel cell controller trips under instantaneous over current condition.

An example system, that has been the target development of the U.S. Department of Energy (DOE) Solid State Energy Conversion Alliance (SECA), is to have a nominal 5 kW single phase AC output for residential power system using the low voltage solid oxide fuel cell (SOFC), which has an output voltage ranging from 20 to 50V. In order to generate the 120/240V AC required for general home applications, a DC/DC converter is essential to boost fuel cell output voltage to a level that can be used by the inverter. A desired inverter DC input voltage for 120V AC generation is 200V, while 400V is desired for 240V AC generation. Any increase in efficiency is greatly desired. An increase in efficiency of only 1% is worth $75/kW given a $6.50/mbtu gas cost for a SOFC power plant the size of about 150 kW.

Some existing commercial off the shelf proton exchange membrane (PEM) fuel cells also have their nominal voltage set at 48V (and below) for either telecommunication or residential applications. In order for low voltage DC fuel cells to generate 50/60 Hz 120/240V AC for residential applications, a DC/DC converter is needed to boost the fuel cell voltage to a level that can be converted to the desired AC output.

Similarly, when a DC source is used for AC applications, such as Uninterrupted Power Supply (UPS) or distributed power, for standalone or grid tie applications, an inverter is needed to generate the required AC for the load. Using the power system of the United States of America as an example, the output load draws 60 Hz AC from the inverter. The AC needs to be rectified at the inverter input, and its frequency will be doubled; therefore, 120 Hz pulsating DC needs to be drawn from the DC/DC converter. The ripple component of this pulsating current will reflect back to the input side of the DC/DC converter, loading the DC power source such as a fuel cell with low frequency AC. This low frequency AC is referred to as a ripple current.

Additional issues are associated with a DC/DC converter, including cost, efficiency and reliability, as well as ripple current. Transient response along with auxiliary energy storage requirements are also a major consideration. Communication with a fuel cell controller and electromagnetic interference (EMI) emissions are of further concern.

Efforts have been extended to address these issues. Conventional passive methods with a single voltage loop controller may be used in an effort to dampen the ripple. Furthermore, adding an energy storage capacitor either on the high side of the DC bus to smooth the current at 200/400V level, or on the fuel cell bus to smooth ripple at a low voltage level, helps reduce the ripple. If the ripple current magnitude is 40% of the rated current, then the fuel cell source needs 20% additional power handling capability. Since the cost of the fuel cell is nontrivial, it is desirable to suppress ripple current to reduce the cost penalty.

Currently, the zero voltage switching (ZVS) pulse width modulation (PWM) full bridge converter is the dominate topology in high power DC/DC applications, although some research is being done on multi phase converters. Full bridge converters normally utilize large inductors to achieve ZVS, which will cause duty cycle loss and additional power loss during freewheeling. Metal oxide semiconductor field effect transistors (MOSFETs) are generally used as the switching device in a converter with low voltage and high current input. In such a converter, conduction loss introduced by the high circulating current may sacrifice the efficiency gained by soft switching. For a high power fuel cell system, high voltage conversion ratio and high input current are the major obstacles.

In order to provide a dual AC output, using an example specification with a nominal fuel cell having a DC output voltage of 22V and an AC load of 120/240V at 5 kW continuous and 10 kW peak, an isolated DC/DC converter is needed to convert low voltage DC to a DC voltage higher than 400V, sufficient for a 240V AC output. A DC/DC converter inevitably sees more than 240 A on the fuel cell side, making the design of a DC/DC converter with low voltage and high current desirable.

Desirable converters need to be capable of high power operation with a high voltage conversion ratio. A transformer is needed for both voltage boost and isolation; however, a high turns ratio is not favored due to potentially high leakage inductances. Furthermore, a high switching frequency is preferred to reduce the passive component size. In order to achieve a high switching frequency while improving converter efficiency, soft switching is necessary.

Among the soft switching techniques suitable for high power converter applications, phase shift (PS) control has been the favorite. However, for a single phase full bridge phase shift converter, the ZVS is achieved over a limited load range. Past efforts have focused on solving this problem. The most popular solutions are to add a saturable core or make some devices switch under zero current switching (ZCS) condition with added auxiliary circuitry.

Fuel cell current ripple reduction is a major issue for fuel cell converter design. It has been suggested that the ripple current be limited to less than 10%. Passive energy storage compensation methods have been suggested and tested extensively. Active compensation methods, with external bidirectional DC/DC converters, have been suggested. These methods require externally added components or circuits.

In conventional devices, losses occur during switch conduction, diode conduction, transformer, output rectifier, output filter inductor, output capacitor, input capacitor and parasitics, such as copper traces and other interconnects.

SUMMARY OF THE INVENTION

An embodiment of the present invention relates to a three-phase transformer isolated phase shift DC/DC converter (V6 converter). An n-phase transformer isolated phase shift DC/DC converter is also contemplated by the present invention. The present invention further contemplates operating modes for the converter and a low frequency current ripple reduction technique with active control for DC source power systems under an inverter load. Yet another embodiment of the present invention is a DC/AC transformer having current ripple control. A further embodiment of the present invention is a fuel cell having an n-phase transformer isolated phase shift DC/DC converter, a three-phase transformer isolated phase shift DC/DC converter, and/or an active current ripple control.

Major aspects of the present invention include: (1) increasing converter power rating by paralleling phases, not by paralleling multiple devices; (2) doubling the output voltage by utilizing a transformer delta-wye connection in the three phase embodiment, thus lowering the turns ratio; (3) reducing the size of output filter and input DC bus capacitor with interleaved control; (4) achieving zero voltage zero current switching (ZVZCS) over a wide load range without auxiliary circuitry. Due to these aspects, the multiphase soft switched DC/DC converter of the present invention is highly recommended as the interface between a low voltage high power fuel cell source and an inverter load. It is also suitable for other low voltage sources, such as batteries and photovoltaics, to supply high voltage high power DC to other circuits.

The present invention efficiently converts low voltage DC to high voltage DC with isolation. The circuit contains multiple phase legs having two switches each. Two phase legs form a full bridge circuit that allows efficient soft switching to be implemented. Multiple phases such as six phases allow three full bridge circuits to be interleaved to help eliminate output current ripple, thus reducing the passive component size. The circuit is suitable for high power converter without the need to parallel semiconductor devices. With simplicity of circuit layout and reduction of passive components, the circuit of the present invention may lower cost as compared to other state of the art technologies.

An aspect of the present invention is that it splits the switches in multiple phases with 120° phase shift between each phase to allow ripple cancellation. The output connection in Y-configuration effectively doubles the voltage, allowing smaller turns ratio. The entire converter has the features of being low cost, compact, high efficiency and low ripple.

Another aspect of the present invention is its wide range of high efficiency operation. An embodiment of the present invention is higher than 96% efficient from 600 watts to 3100 watts which is better than a 5:1 ratio. Prior art devices with high efficiency tend to have narrow ranges of operation.

Additionally, a clean operating environment and high energy conversion efficiency are important aspects of fuel cells. Stationary fuel cell power applications, either delivering electricity with utility intertie or directly supplying electricity to residential area as a standalone power source, can be used for future distributed generation systems.

Because fuel cell output is normally very low voltage and the system requires a high voltage output in order to provide high power output, a converter requires a lot of devices in parallel to ensure that switches can handle the current, and to ensure high efficiency power conversion. In this case, splitting in multiple phases can take advantages of ripple cancellation that allows smaller size filter components. It also allows soft switching for a wide load range because the non-switching phase utilizes other phases current to discharge its output capacitance and thus achieving zero voltage turn on even at light load condition.

In summary, the proposed multi-phase interleaved converter represents a performance improvement over conventional DC/DC converters. Efficiency improvements are achieved through the elimination of switching losses, the elimination of snubber losses, the elimination of voltage clamp circuit losses, and the elimination of parasitic ringing and EMI related losses due to the use of lower voltage power MOSFET with lower conduction voltage drop. Major cost and size reductions are also achieved through the present invention. Output filter inductor reduction voltage clamp circuit elimination and snubber circuit elimination results in fewer paralleled devices for input filter capacitor reduction.

A further aspect of the present invention is a new process that reduces fuel cell current ripple by an active control method within the existing power converter. The current ripple generated by an inverter load not only reduces the net fuel cell output power capability but also imperils fuel cell stack lifetime. Normally, the ripple is taken care of by adding more energy storage passive components, which collectively increase system size and cost. The present invention further introduces an active control method to the DC/DC converter circuit without adding additional energy storage or external converters. The conventional DC/DC converter either contains a voltage loop controller to control the output voltage magnitude or a current loop controller to control the output current magnitude. The present invention further uses voltage-loop to control the output voltage magnitude and to use the current loop to suppress the output current ripple, which indirectly suppresses the input current ripple. Since the active current control method of the present invention is only to improve the control function of the existing controller, the overall system on size and cost remains the same, while the performance is largely improved.

An active ripple reduction technique is also proposed by adding a current loop control into an existing voltage loop control system. This active current loop control does not need to add extra converters or expensive energy storage components. Rather, it cancels the ripple current at the DC/DC converter output before it propagates back. With proper selection of control bandwidth for both inner current and outer voltage loops, the ripple current can be significantly reduced while maintaining a stable DC bus output voltage. The proposed ripple current model and the control loop design guidelines were verified with computer simulation for a 1.2-kW PEM fuel cell system.

A multiphase DC/DC converter along with a full-bridge DC/AC inverter was built and tested to compare the ripple performance under different operating conditions including open loop, single voltage loop, and dual loop controls. Test results indicated that under open-loop and single voltage-loop controls, 17% ripple remains, but under the dual loop control, the ripple was reduced to within 1%.

Phase-shift modulation is used to achieve device soft-switching. Also, the multiphase structure reduces the root mean square (RMS) current per phase, thus reducing the $I^2R$ conduction loss, without paralleling multiple devices. Moreover, a Y-connection on the three-phase transformer secondary side doubles the output voltage without increasing the turns-ratio. Therefore, this converter is excellent for high power converters that have a low voltage source and high input current.

Overall, major design features and aspects of the present invention include a low transformer turns ratio achieved by the delta-wye connection of an embodiment, a reduced size of output filter and input capacitor with interleaved control, ZVZCS for a wide load range without auxiliary circuit, and high system efficiency.

Higher efficiency is emphasized because it implies a better operating condition on a fuel cell, savings on hydrogen fuel and smaller heat sinking requirements. Further reductions in the output filter may be possible since the inductor current ripple may be practically eliminated by interleaved operation. The reduction in passive components and heat sinking also implies potential reduction in size and weight as well as savings in cost.

Compared with passive methods, the active control method of the present invention can dramatically mitigate low frequency current ripple to the source, with only a small modification on controller design. It doesn't increase passive energy storage components in the circuit, therefore the sizes and costs for those circuit components would not increase. Conversely, the active control method of the present invention helps to reduce the energy storage requirements of the system, hence reducing energy storage components' sizes and subsequently system volume and cost. The immediate application of the active control method of the present invention is for a power system with a fuel cell as the DC power source. This technology, however, can be applied to any DC source subjected to low frequency harmonics. A significant design improvement of the present invention is that it dramatically reduces low frequency ripple components from the input DC source, and therefore, improves the converter's overall performance.

Another aspect of current ripple is that it not only affects fuel cell capacity, but also fuel consumption and life span. Fuel cells need higher power handling capability, and will therefore consume more fuel. The 100-Hz harmonic current exhibits a hysteresis behavior with PEM fuel cells. Injecting ripple current around this frequency to a fuel cell may result in thermal problems among stacks and impair the stack lifetime. Fuel cell current ripple reduction is thus a major issue in fuel cell converter design. It has been suggested that the ripple current should be limited to less than 10%.

There are numerous additional features of the converter aspect of the present invention. The output voltage may be doubled while the turns ratio and associated leakage inductance is reduced. There is no or minimal overshoot or ringing on the primary side of the device voltage. DC link inductor current ripple is eliminated. The cost size reduction on the inductor is advantageous. Secondary voltage overshoot is reduced resulting in cost and size reduction with the elimination of voltage clamping. There is significant EMI reduction with an associated reduction of cost pertaining to the EMI filter. Soft switching occurs over a wide load range. High efficiency embodiments of the present invention may have an efficiency of about 97%. Additionally, the device generates low temperature while maintaining high reliability.

In summary, some of aspects of the present invention include efficiency improvements that reduce fuel consumption. The multiphase control of the present invention reduces the number of passive components resulting in further cost reduction. Ripple current elimination reduces the size of the fuel cell stack. Soft start and current control reduce the in rush current resulting in improved reliability. Soft switching reduces the EMI. All of which potentially reduces cost of running fuel cells accordingly.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and control methods of the present invention may best be understood with reference to the following description and accompanying drawings.

FIG. 22b is a diagram depicting a current ripple propagation model of the single phase full bridge inverter of FIG. 22a.

FIG. 37b is a graph showing simulation results for the testing depicted in FIG. 37a.

Figure 51A:
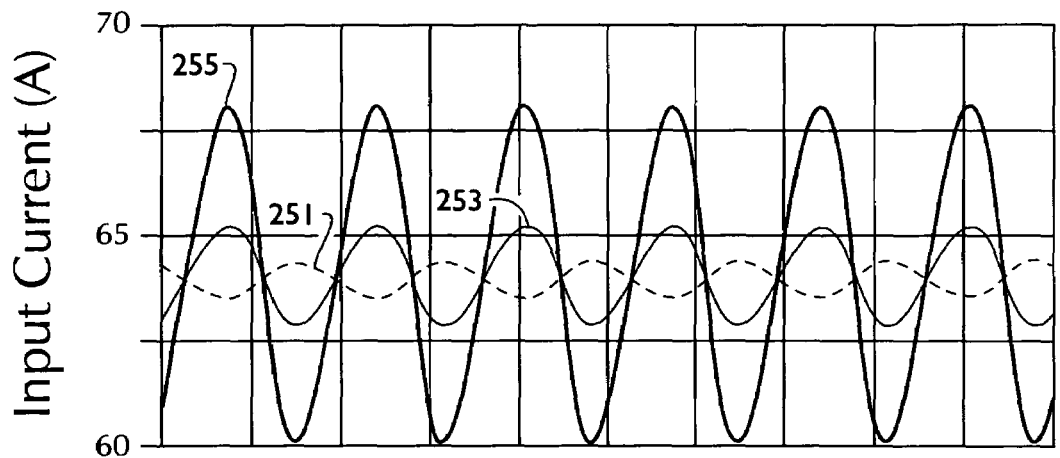

FIG. 51a is a graph depicting simulated low frequency ripple waveforms using different voltage loop bandwidths width dual loop control with 667 Hz current loop.

Figure 51B:
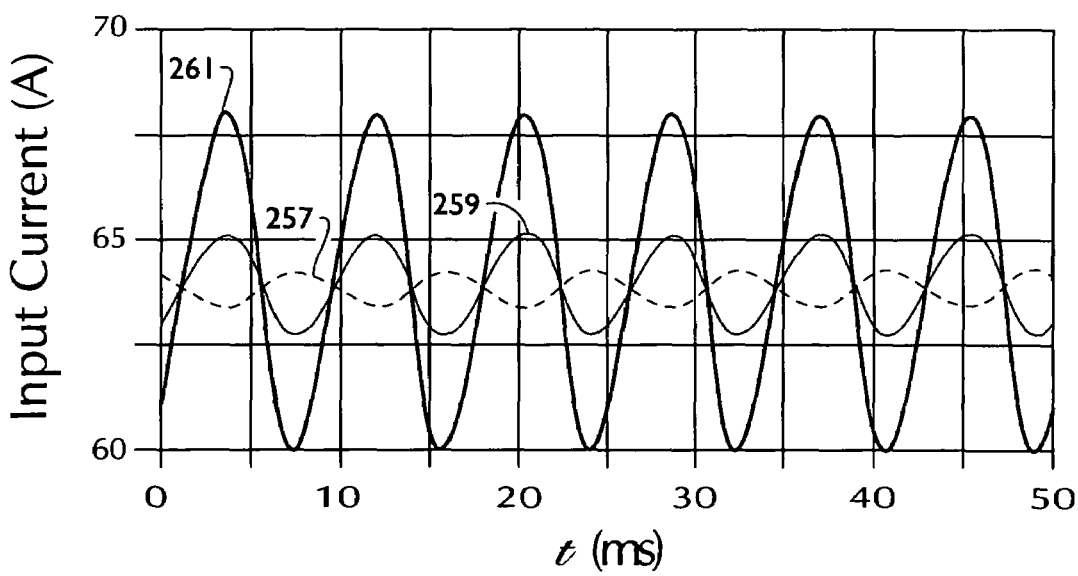

FIG. 51b is a graph depicting simulated low frequency ripple waveforms using different voltage loop bandwidths width dual loop control with 2 kHz current loop.

Similar reference characters denote corresponding features consistently throughout the attached drawings.

DETAILED DESCRIPTION OF PREFERRED EMBODIMENTS

Figure 1:
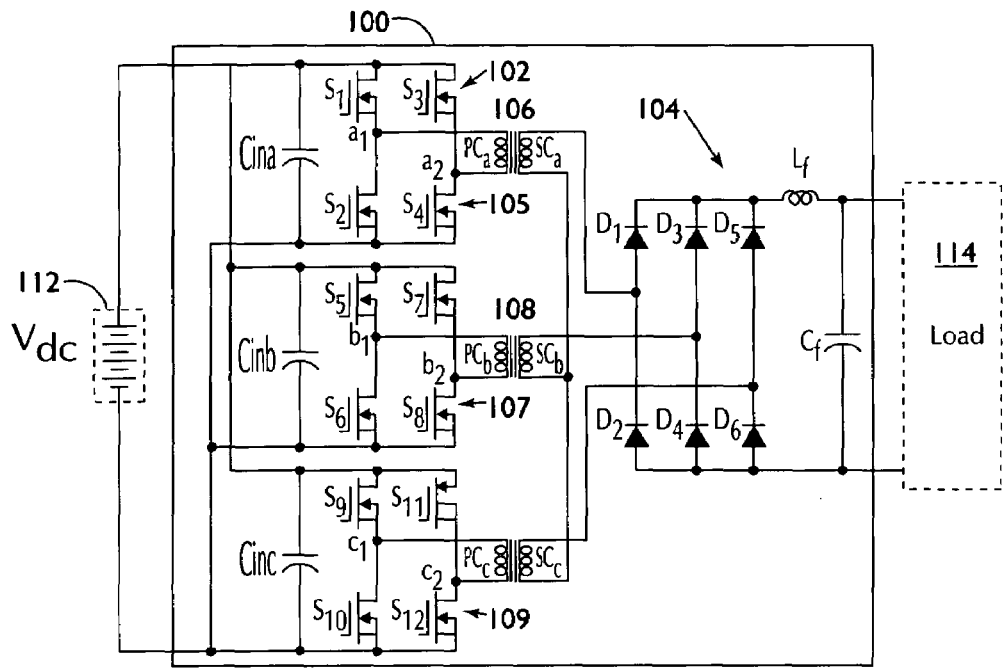
FIG. 1 is a circuit diagram of an embodiment of a multiphase soft-switching DC/DC converter according to the present invention.

FIG. 1 is a circuit diagram of an embodiment of a multiphase soft switching DC/DC converter according to the present invention. The embodiment depicted in FIG. 1 is a three phase converter 100 having an input side 102 and an output side 104. Each phase contains a transformer for isolation. The input side 102 of each transformer 106, 108 or 110 has a primary coil $PC_a$, $PC_b$ or $PC_c$ and a set of switches $S_1$-$S_4$, $S_5$-$S_8$ or $S_9$-$S_{10}$ along with an input DC bus capacitor $C_{ina}$, $C_{inb}$ or $C_{inc}$. The DC bus capacitor $C_{in1}$ for the first phase switches $S_1$-$S_4$ associated with the first phase transformer 106. These switches form a full bridge circuit 105, 107 or 109 with two switches on two legs, for example the switches $S_1$ and $S_2$ are on the $a_1$ leg, $S_3$ and $S_4$ are on the $a_2$ leg, and the combination renders the full bridge circuit 105.

Each transformer has a primary coil connected between the legs $a_1$, $a_2$, $b_1$, $b_2$, $c_1$ and $c_2$ between their respective switches. For example, the first phase transformer 106 has a primary coil $PC_a$ connected between the $a_1$ leg and the $a_2$ leg. The primary coil $PC_a$ is connected to the $a_1$ leg between the switches $S_1$ and $S_2$ and to the $a_2$ leg between the switches $S_3$ and $S_4$. The full bridge circuit is in turn connected to the input DC bus capacitor $C_{ina}$ in parallel and to a DC input source 112. All three full bridge circuits are connected in parallel on the input side and tied to a DC source. Examples of DC sources include a battery stack, a fuel cell stack or a photovoltaic panel.

The input side 102 of the second phase transformer 108 has the same structure as that of the first phase transformer 106. The second phase transformer 108 connects to four switches $S_5$-$S_8$ and an input capacitor $C_{inb}$. Similarly, the input side 102 of the third phase transformer 110 has the same structure as that of the first and second phase transformers 106 and 108. The third phase transformer 110 contains switches ($S_9$-$S_{12}$) and a capacitor $C_{inb}$, as shown in FIG. 1.

The output side 104 of the three phase converter 100 is also shown in FIG. 1. The secondary coils are connected to a rectifying circuit. Preferably, the secondary coils $SC_a$, $SC_b$ and $SC_c$ of the three transformers are connected in a Y configuration which is termed a wye connection. Each transformer secondary has an output tied to a common point 113, and an output tied to a three-phase diode bridge, which contains three secondary legs $D_1$-$D_2$, $D_3$-$D_4$ and $D_5$-$D_6$ each having two diodes $D_1$ and $D_2$, $D_3$ and $D_4$, and $D_5$ and $D_6$ on each leg respectively. The output of the diode bridge is then connected to an output filter circuit, which contains an inductor $L_f$ and a capacitor $C_f$. The voltage across the capacitor $C_f$ is connected to the load 114. The proposed transformer secondary wye connection is capable of boosting the output voltage without increasing the transformer turns ratio.

The present invention can have more than three coils on the input and output sides. The number n of primary coils having n number of full-bridge circuits is also contemplated by the present invention. The secondary coils may also have n number of secondary coils which are connected in a starburst pattern with each secondary coil connected between the other secondary coils and the rectifying circuit in a manner analogous to the wye configuration, wherein each secondary coil is connected to a secondary leg comprising two diodes. The secondary coils are connected between the two diodes. Each secondary leg is disposed in parallel to one another and to the load. An inductor $L_f$ may be disposed in series between the secondary legs and the load. A capacitor $C_f$ may be disposed in parallel with the load.

Figure 2:
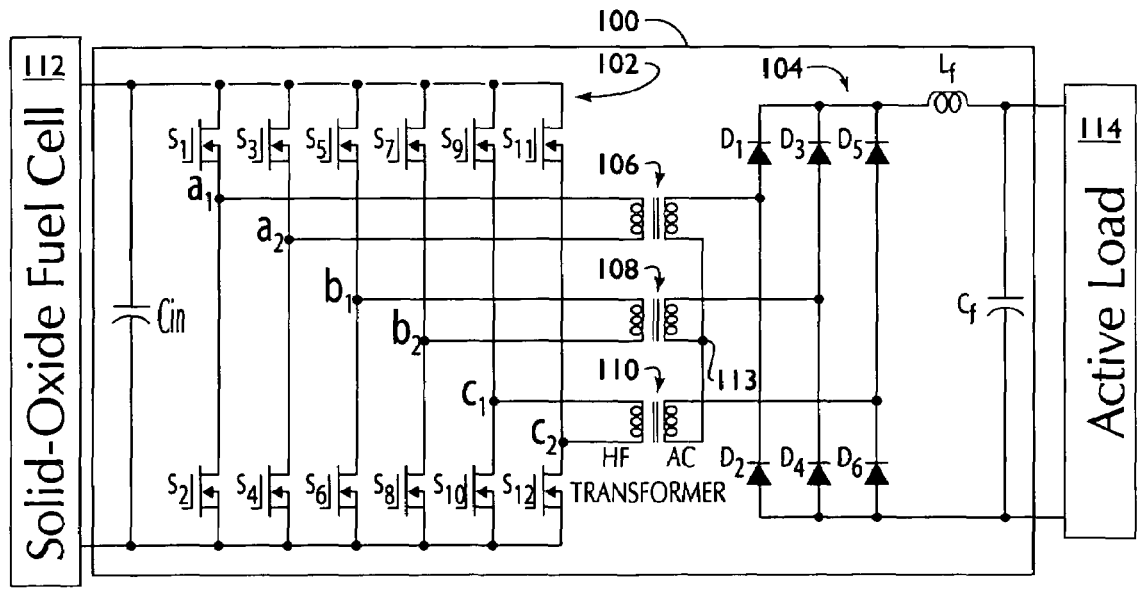
FIG. 2 is a circuit diagram of another embodiment of a multiphase soft-switching DC/DC converter according to the present invention.
Figure 3:
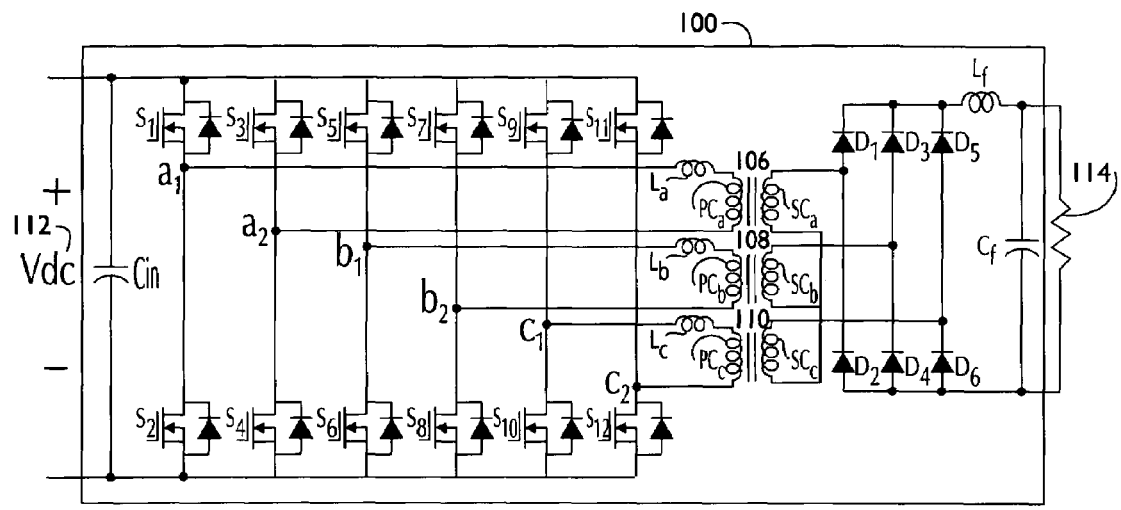
FIG. 3 is a circuit diagram depicting an alternative format of a three phase converter according to the present invention.
Figure 4A:
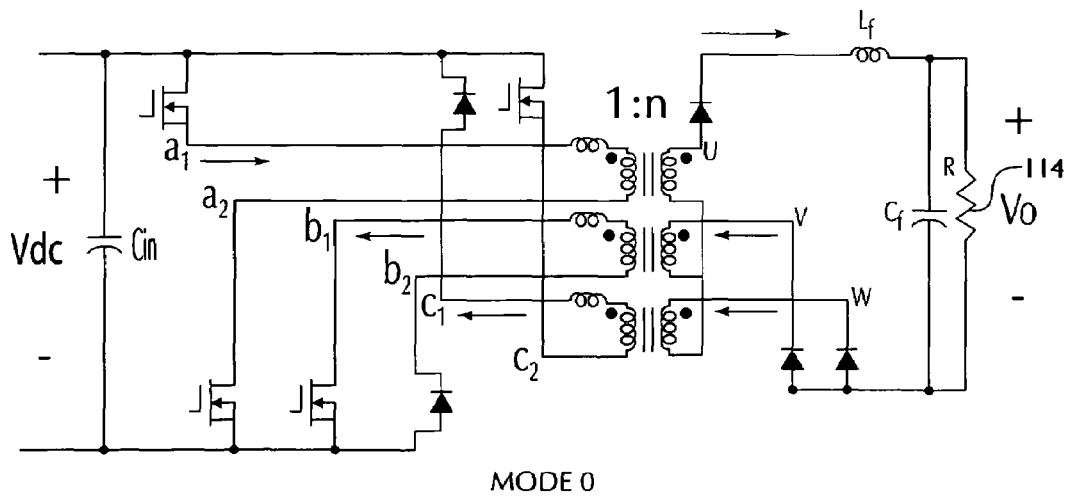
FIGS. 4a-4d are circuit diagrams depicting the topological changes, in the embodiment of the converter depicted in FIG. 8, in different modes of operation.
Figure 4B:
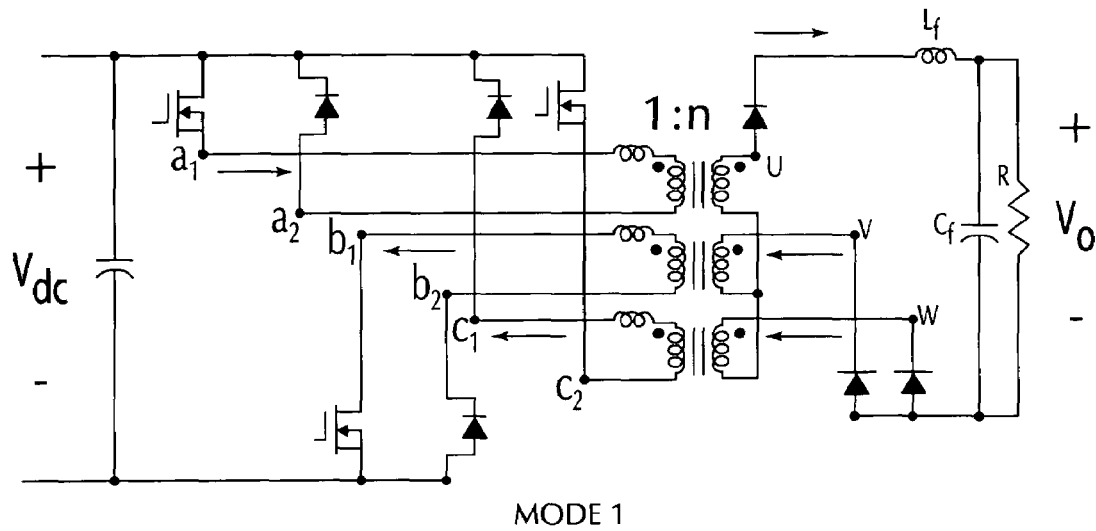
Figure 4C:
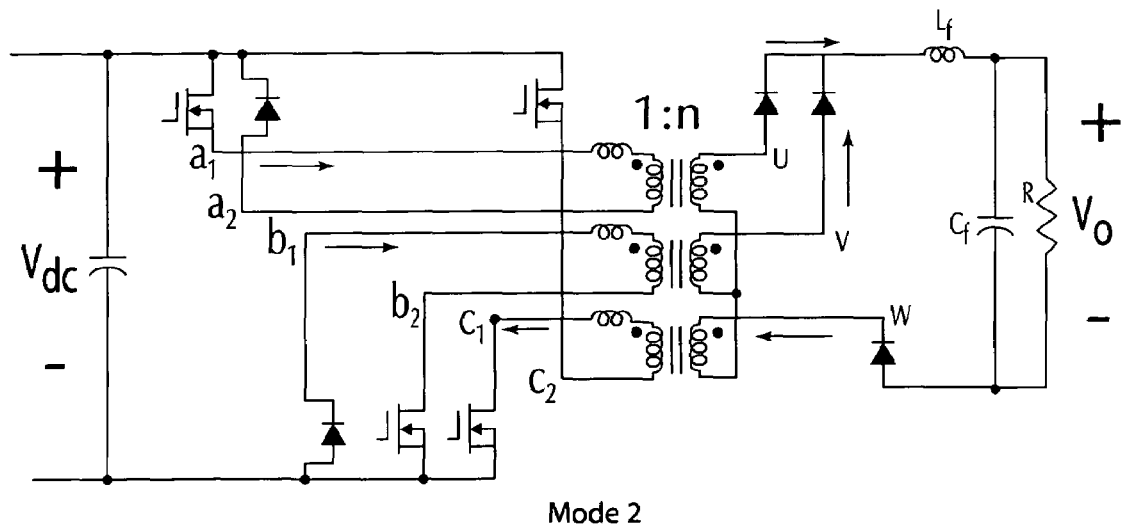
Figure 4D:
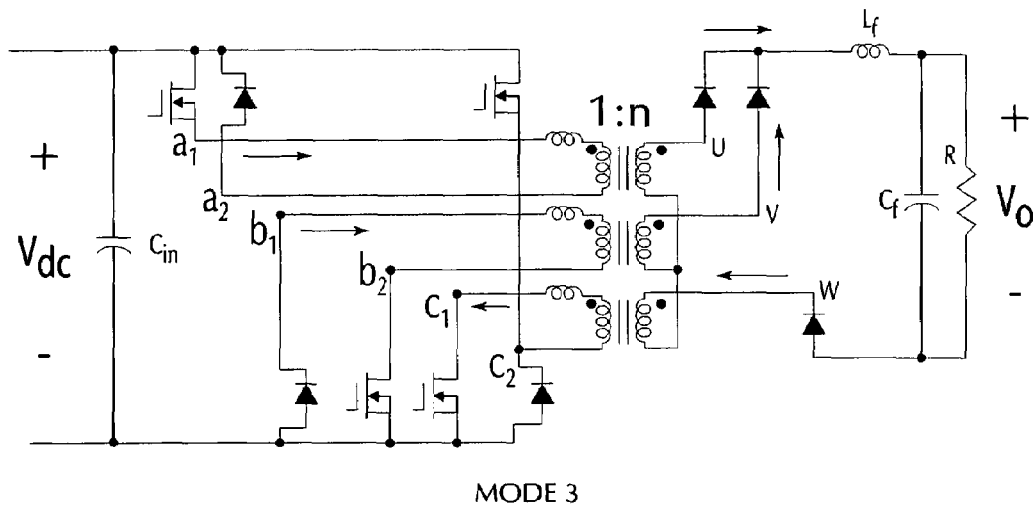

FIG. 2 represents an alternative embodiment of a converter 100 according to the present invention. This embodiment has a single input capacitor $C_{in}$ which is connected in parallel between the input DC source 112 and the switch legs $a_1$-$c_2$ on the input side 102, as shown in FIG. 2. Similarly, FIG. 3 represents an alternative embodiment of the present invention with a leakage inductor $L_a$, $L_b$ and $L_c$ connected to each primary coil $PC_a$, $PC_b$ and $PC_c$, as shown in FIG. 3, between the primary coil $PC_a$, $PC_b$ and $PC_c$ and one of the phase legs in each full-bridge circuit such that there is one leakage inductor adjacent the primary coil.

A proposed embodiment of the converter of the present invention consists of three full-bridge converters. Their outputs are connected to a three-phase full-bridge diode rectifier through a set of transformers, whose secondary windings are connected in a wye configuration. This connection allows boosting of the output voltage without increasing the transformer turns ratio.

In an ideal case, if 1 per-unit (pu) voltage is applied to one transformer input and −1 pu voltage is applied to another, then there will be 2 pu voltage imposed on the secondary output. For example, if $V_{a1a2}=V_{dc}$ and $V_{b1b2}=-V_{dc}$, then the voltage at the rectifier output will be 2n $V_{dc}$, which is twice the single-phase transformer converter output.

By controlling the six-leg three-phase converter in an interleaved manner, the three single-phase full bridge converters can be controlled much like a single-phase full-bridge converter, as discussed hereinbelow. Only one compensator is needed to regulate the same control variable for all three phases. The control variable can be either duty cycle, as used in a conventional pulse-width modulated (PWM) full-bridge converter, or shift-angle for phase modulation. Soft-switching can be achieved using phase-shift modulation, in which the device duty cycle is fixed at 50% and the gate control signals are shifted between legs.

With reference to the converter of FIG. 3, a steady-state operating mode analysis applies phase-shift modulation to the three-phase converter. For the proposed DC/DC converter, interaction occurs among phases from the connection of the transformer secondary windings. This interaction is determined by the phase-shift angle between the legs of each full-bridge converter. Complementary gate signals are adopted to control top and bottom switches for each leg. Based on the phase-shift modulation angle α the converter operating mode can be analyzed for three cases: $0°\leq\alpha<60°$, $60°<\alpha<120°$, and $120°<\alpha<180°$. The three modes are referred to as operating modes. FIGS. 4a-4d show different circuit structures and current directions corresponding to four operation modes. The designations u, v and w in the FIGS. 4a-4d refer to the legs $D_1$-$D_2$, $D_3$-$D_4$, and $D_5$-$D_6$ respectively.

Figure 5A:
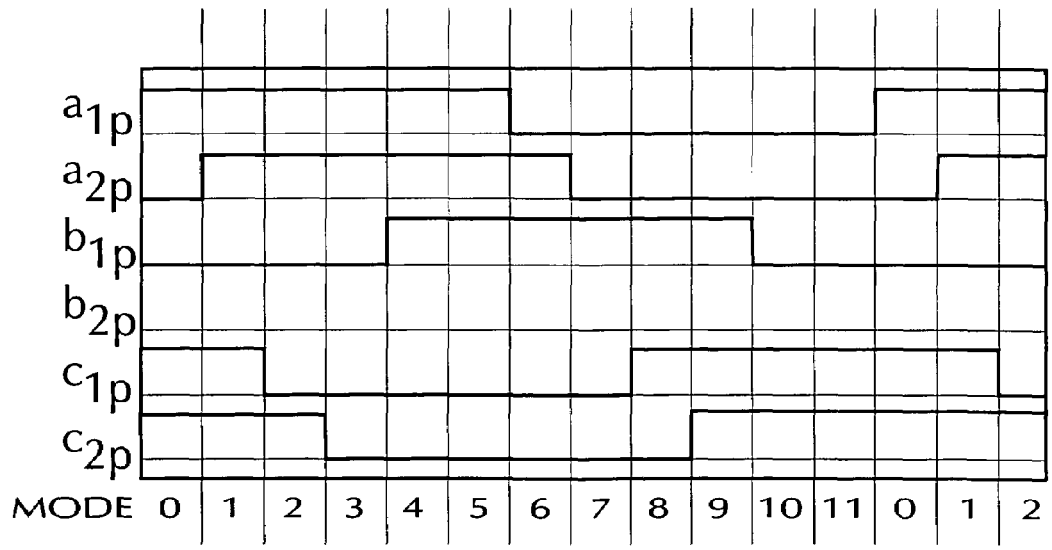
FIG. 5a is a diagram depicting gate signals for case 1.

Case 1: $0°<\alpha<60°$. In case 1, the gate control signal for the lagging leg (leg 2) is shifted less than 60° (or ⅙ switching period). The gate signals for the upper devices of all 6 legs are shown in FIG. 5a, the filter inductor current in illustrated in FIG. 5b, and the phase output voltages and rectifier output voltage (or filter input voltage) waveforms are illustrated in FIG. 5c. At most one phase transfers DC bus voltage to the output; thus, the maximum ideal voltage is 0. Consequently, the averaged output voltage is:

$$\overline{V_{out}} = \frac{\alpha}{60°} \cdot n \cdot V_{dc}.$$

Figure 5B:
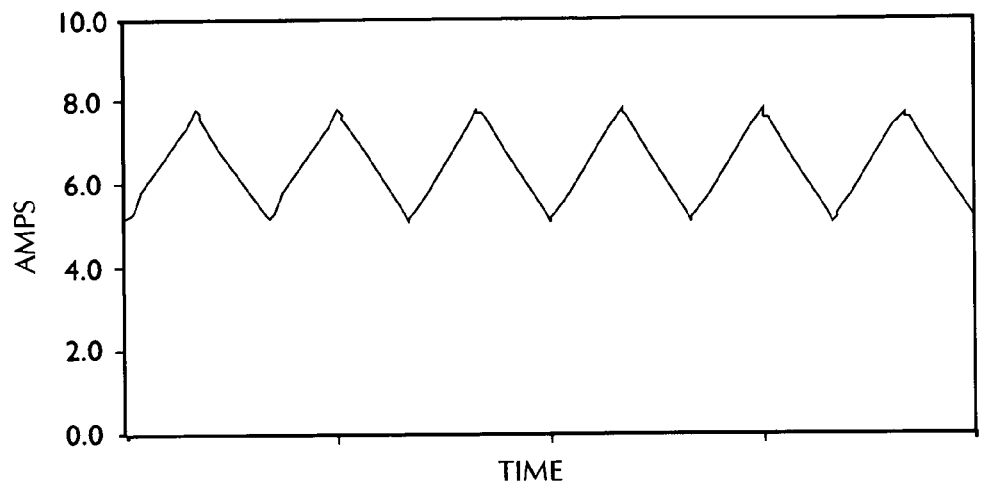
FIG. 5b is a diagram depicting filter inductor current for case 1.
Figure 5C:
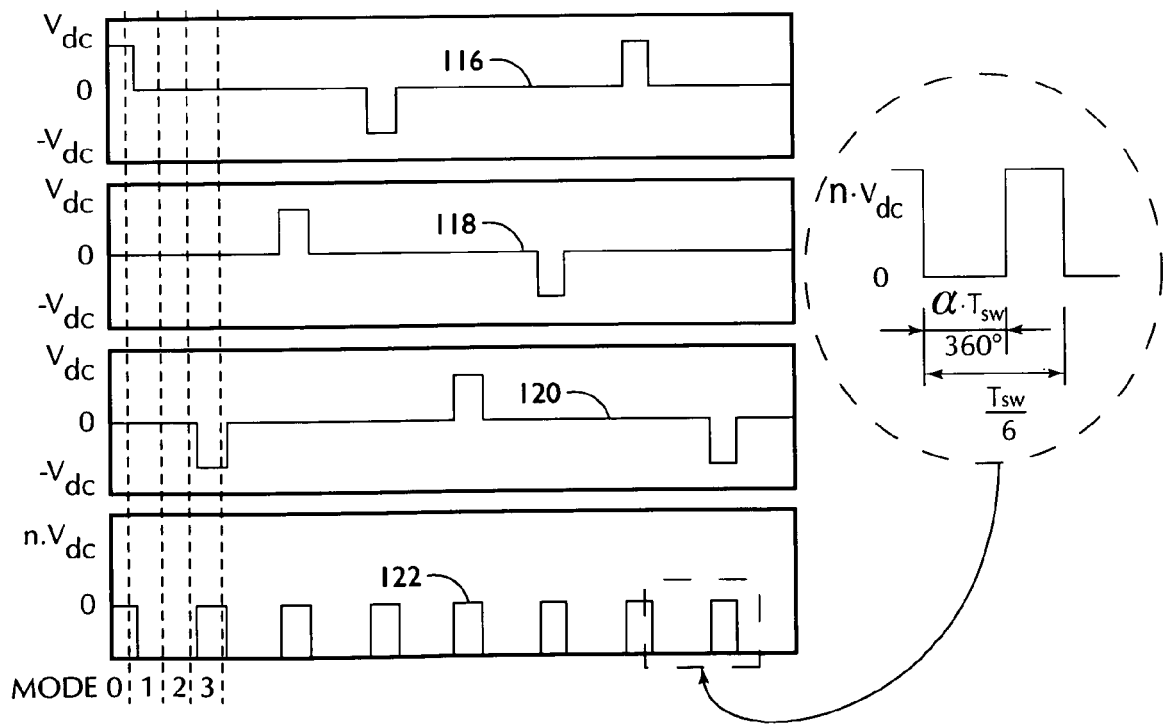
FIG. 5c is a diagram depicting transformer primary voltages and rectifier output for case 1 of the three phase converter.

The gate signals and inductor current waveforms are shown in FIGS. 5a and 5b. FIG. 5a corresponds to the case 1 switch gate signals. Symbol $a_{1p}$ means the upper switch gate signal of phase leg $a_1$. Similarly, $a_{2p}$, $b_{1p}$, $b_{2p}$, $c_{1p}$ and $c_{2p}$ are the upper switch gate signals of phase leg $a_2$, $b_1$, $b_2$, $c_1$ and $c_2$, respectively. From the timing diagram as an example in mode 0, upper switches $a_{1p}$, $c_{1p}$, and $c_{2p}$ are turned on, and three lower switches on phase legs $a_2$, $b_1$, and $b_2$ are turned on. Therefore, phase A is supplying a positive voltage $V_{dc}$ to the transformer, and phases B and C are supplying zero voltage to the transformer. Similar voltage conditions can be applied to other modes. FIG. 5c demonstrates the transformer primary voltages and rectifier output also for case 1 and further illustrates the voltage across each transformer primary and the corresponding voltage at the output of the rectifier. The waveform for $V_{a1a2}$ is designated 116 in the figures, for $V_{b1b2}$ is designated 118, for $V_{c1c2}$ is designated 120, and the rectifier output is designated 122, as shown. Detailed circuit operations for each mode are described as follows.

Mode 0($t_0$~$t_1$): In this mode, phase A applies a positive voltage $V_{dc}$ to the transformer, which causes the output inductor current, thus phase A current, to increase linearly. Meanwhile, phase B and C are under freewheeling conduction due to the reflected current from transformer secondary side. The sum of phase B and C currents is $$\Delta t = \frac{\alpha}{360°} T.$$

Mode 1($t_1$~$t_2$): This is an idle mode, where all three phases are under freewheeling conduction. Current freewheels through phases A and C upper switches and diodes and phase B bottom switches and diodes. The transformer output voltages are all zero, thus causing the output filter inductor current to decrease with the slope of —$V_{out}/L_f$. The duration for this mode is $$\Delta t = \frac{60° - \alpha}{360°} T.$$

Mode 2($t_2$~$t_3$): During this mode, phases A and B continue in freewheeling mode. However, leg $c_1$ upper switch turns off and the bottom switch turns on, applying a negative voltage, $-V_{dc}$, to the phase C transformer primary. Voltage n·$V_{dc}$ is applied to the output filter inductor and causes the current to increase with a slope of $$\frac{n \cdot V_{dc} - V_{out}}{L_f}.$$

This current also flows through phase C transformer secondary winding in the negative direction and is reflected to the primary side. This mode lasts for $$\Delta t = \frac{\alpha}{360°} T.$$

Mode 3($t_3$~$t_4$): At the beginning of this mode, leg $c_2$ upper switch turns off and bottom device turns on, driving phase C into freewheeling mode. Since phase A and B continue in freewheeling mode, there is no voltage output to the transformer secondary side, causing the output filter inductor current to decrease with the slope of —$V_{out}/L_f$. The duration for this mode is $$\Delta t = \frac{60° - \alpha}{360°} T.$$

The steady-state operation analysis for modes 4~11 are similar to those for the above modes 0~3, but with current flowing through different phases.

In this case, at most one phase transfers DC bus voltage to the output side. Thus, the ideal maximum voltage transferred to the output is n $V_{dc}$, and minimum voltage is 0. Hence, the averaged output voltage is $$\overline{V_{out}} = \frac{\alpha}{60°} \cdot n \cdot V_{dc}.$$

Figure 6A:
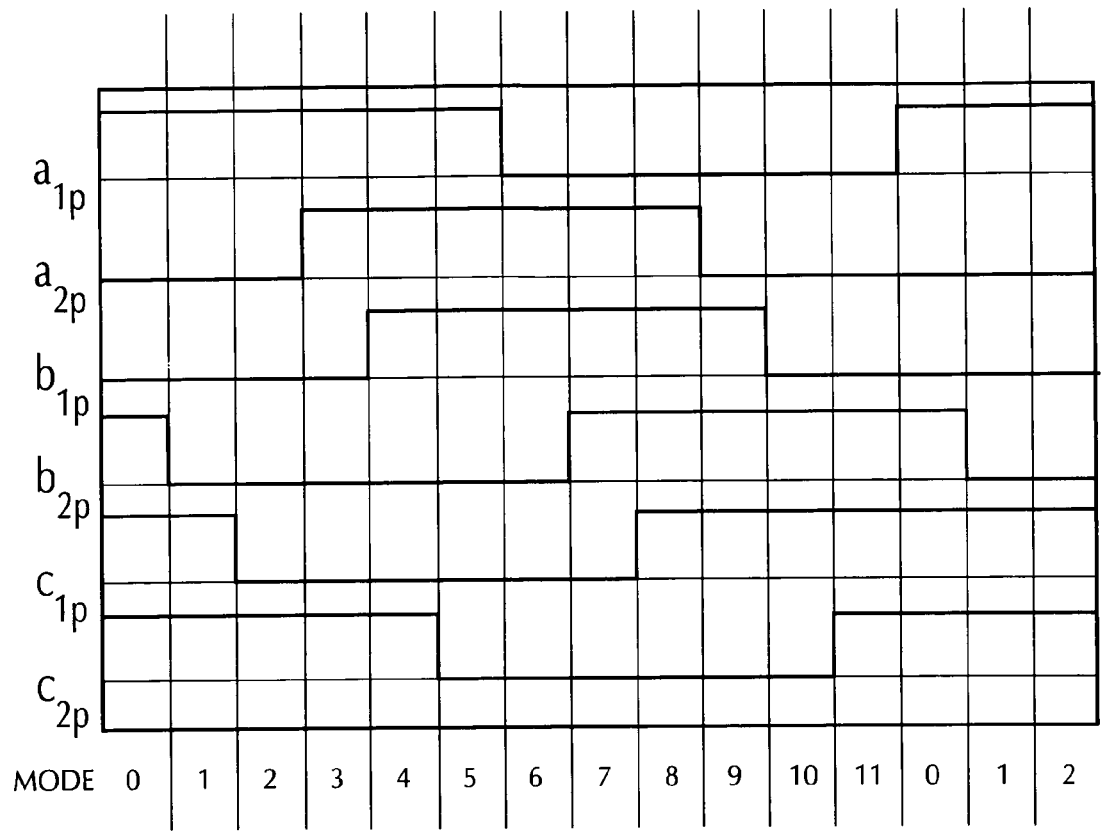
FIG. 6a is a diagram indicating upper-switch gate signals for case 2.
Figure 6B:
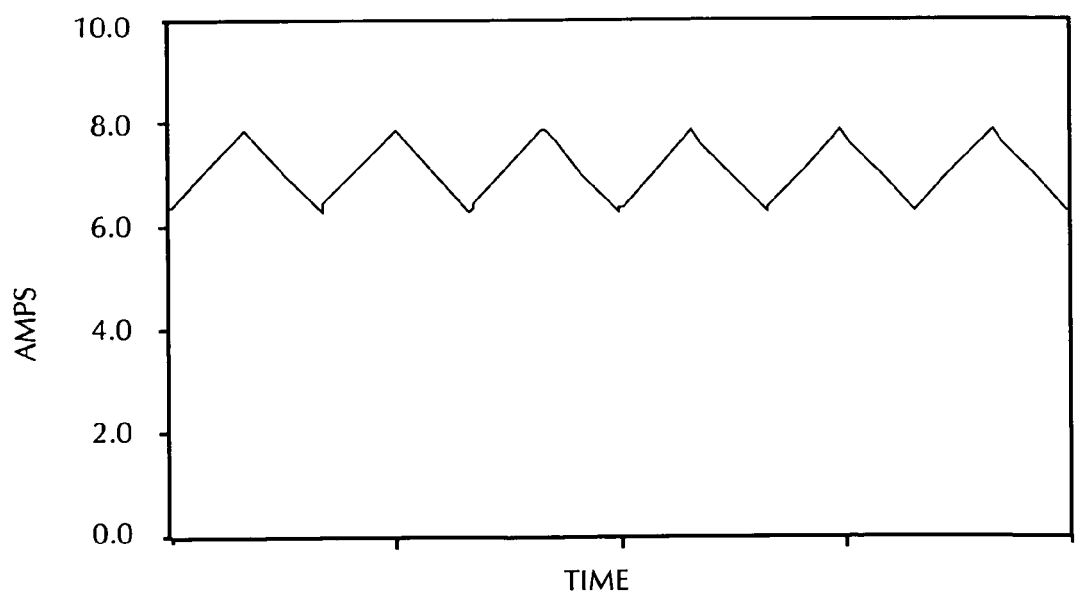
FIG. 6b is a diagram indicating filter inductor current waveforms for case 2.
Figure 6C:
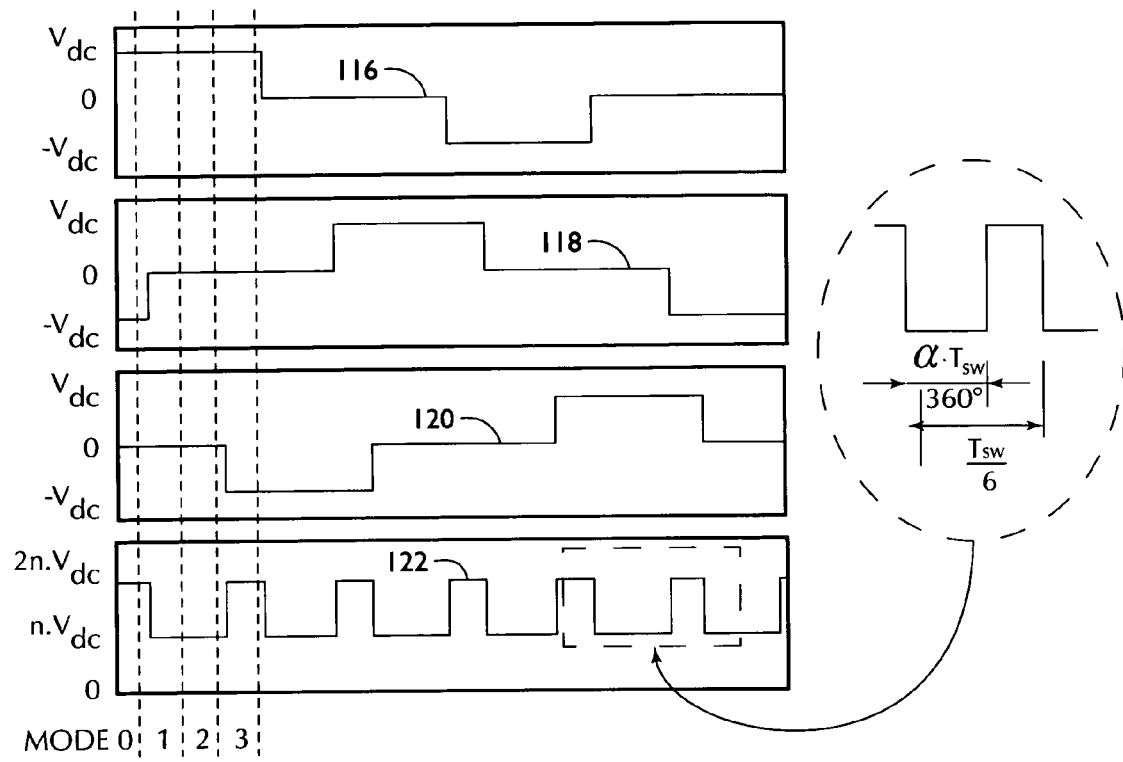
FIG. 6c is a diagram depicting transformer primary voltages and rectifier output for case 2.

Case 2: 60°<α<120°. In case 2, at least one phase and at most two phases will transfer DC bus voltage to the output. FIGS. 6a-6c show the top-switch gate signals and inductor current waveforms for case 2. The voltage across each transformer primary and the resulting voltage at the output of the rectifier are shown in FIG. 6c. FIG. 6a shows the case 2 switch signals, and FIG. 6c shows the transformer primary voltages and rectifier output for case 2.

In this case, at least one phase and at most two phases transfer dc bus voltage to the output side. Thus, the ideal maximum voltage transferred to the output is 2n·$V_{dc}$, and the minimum voltage is n·$V_{dc}$. Through similar analysis as in case 1, the durations for this mode are $$\Delta t = \frac{\alpha - 60°}{60°} T$$

and $$\Delta t = \frac{120° - \alpha}{60°} T,$$

respectively. In other words, the output voltage is 2n·$V_{dc}$ for $$\Delta t = \frac{\alpha - 60°}{60°} T$$

and n·$V_{dc}$ for $$\Delta t = \frac{120° - \alpha}{60°} T.$$

Therefore, the averaged output voltage can be derived as $$\overline{V_{out}} = n \cdot V_{dc} + \frac{\alpha - 60°}{60°} \cdot n \cdot V_{dc}.$$

Alternatively, the averaged output voltage can be calculated as:

$$\overline{V_{out}} = \frac{\alpha - 60°}{60°} \cdot 2n \cdot V_{dc} + \frac{120° - \alpha}{60°} n \cdot V_{dc} = \frac{\alpha}{60°} \cdot n \cdot V_{dc}.$$

Figure 7A:
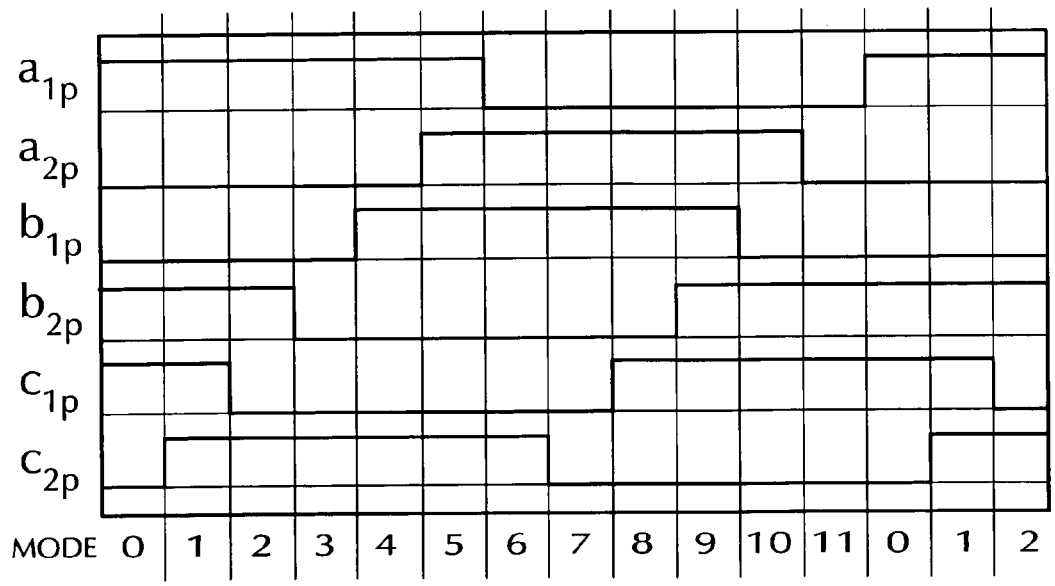
FIG. 7a is a diagram for case 3 depicting upper-switch gate signals.
Figure 7B:
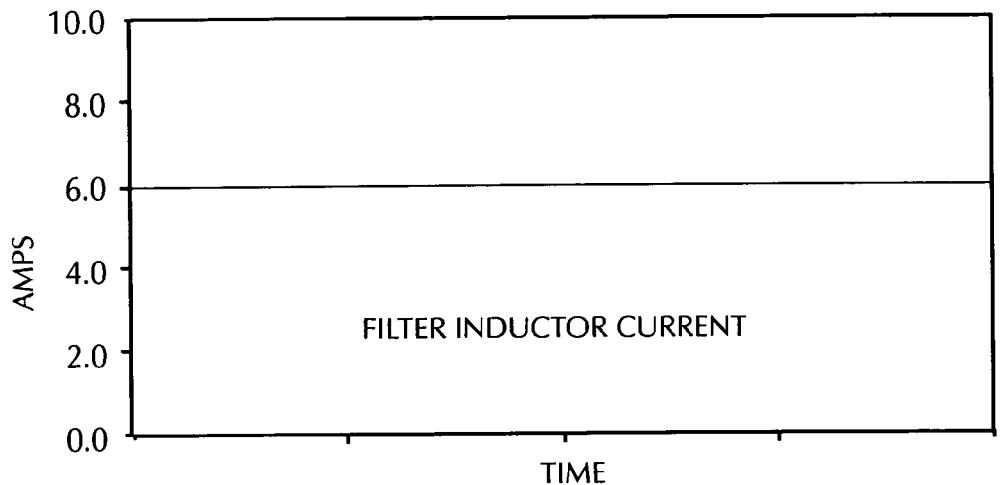
FIG. 7b is a diagram for case 3 depicting filter inductor current waveforms.
Figure 7C:
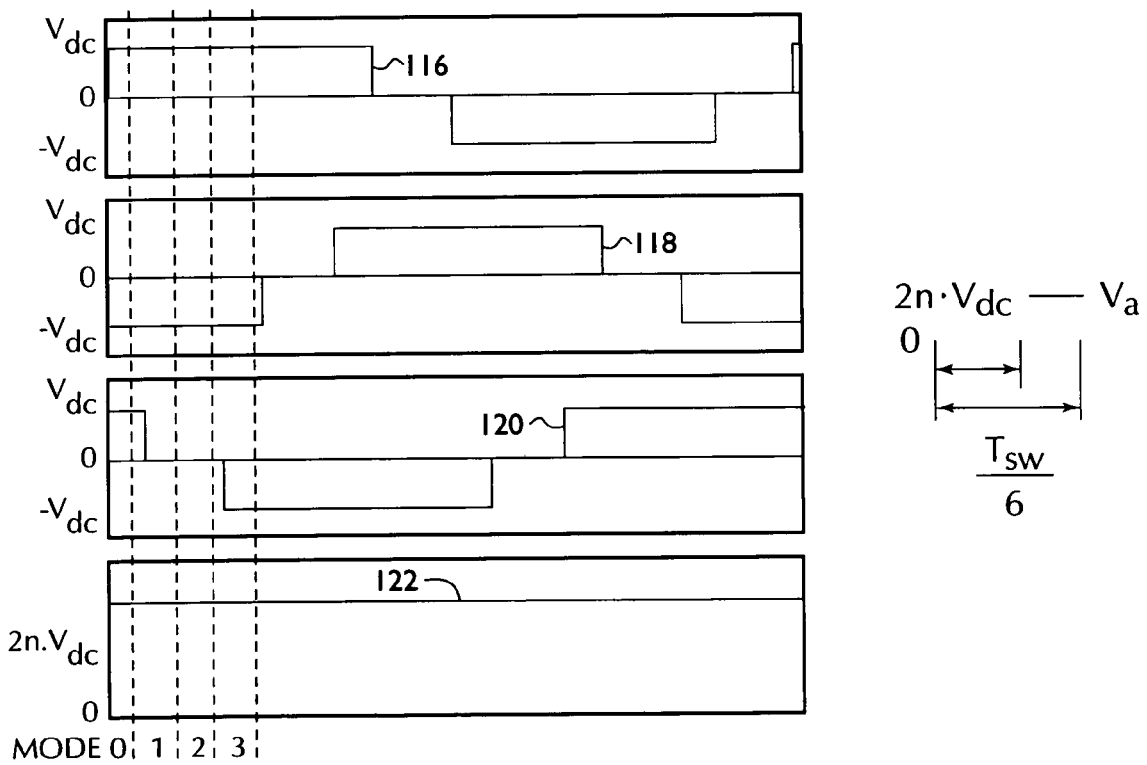
FIG. 7c is a diagram depicting transformer primary voltages and rectifier output for case 3.

Case 3: 120°<α<180°. In case 3, the output voltages of each phase overlap. FIGS. 7a-7c shows the upper-switch gate signals and inductor current waveforms for case 3. FIG. 7a shows the switch gate signals for case 3, and FIG. 7c shows the phase output voltages and rectifier output voltage. The voltage across each transformer primary and the resulting voltage at the output of the rectifier are shown in FIG. 7c. Notice how the voltage at the output of the rectifier is constant.

In this case, at least two phases and at most three phases transfer DC bus voltage to the output side. The output voltage overlaps, thus the ideal voltage transferred to the output is $2n \cdot V_{dc}$ at any time, independent of the phase-shift angle α. This also accounts for the filter inductor current being constant for the ideal case. Therefore, the averaged output voltage is uncontrollable and is always equal to $\overline{V}_{out} = 2n \cdot V_{dc}$.

Figure 8:
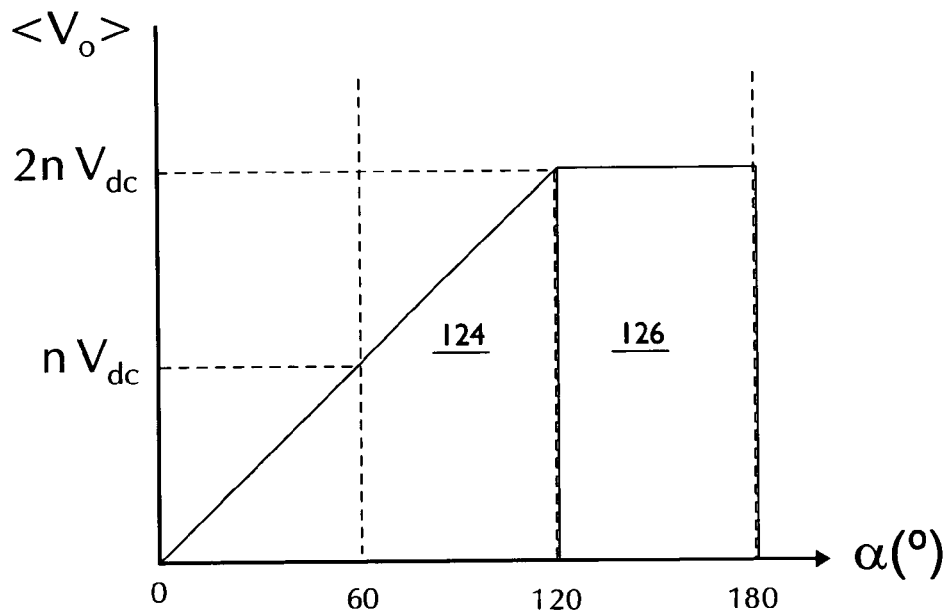
FIG. 8 is a diagram depicting voltage conversion ratio during the three phases.

Since the voltage conversion ratio is fixed, the converter behaves like a transformer, but with DC input/output voltage. Therefore, this mode is defined as the DC/DC transformer mode. From the above analysis of all three cases, the voltage conversion ratio as a function of phase-shift modulation angle (α) can be illustrated as in FIG. 8 where the regulated converter mode 124 and the DC/DC transformer mode 126 are shown.

Similar to a single-phase phase-shift converter, the proposed multiphase converter can easily achieve ZVS turn-on for the lagging leg switches in each phase. For the leading leg, during its switching transition, the phase current is affected by the other two phases. The distribution of the current heavily depends on the phase inductance, which consists of the transformer leakage inductance and any other stray inductances in each phase. If the phase inductance is large enough, the switches should be able to turn on with fairy low current or nearly ZCS.

Figure 9:
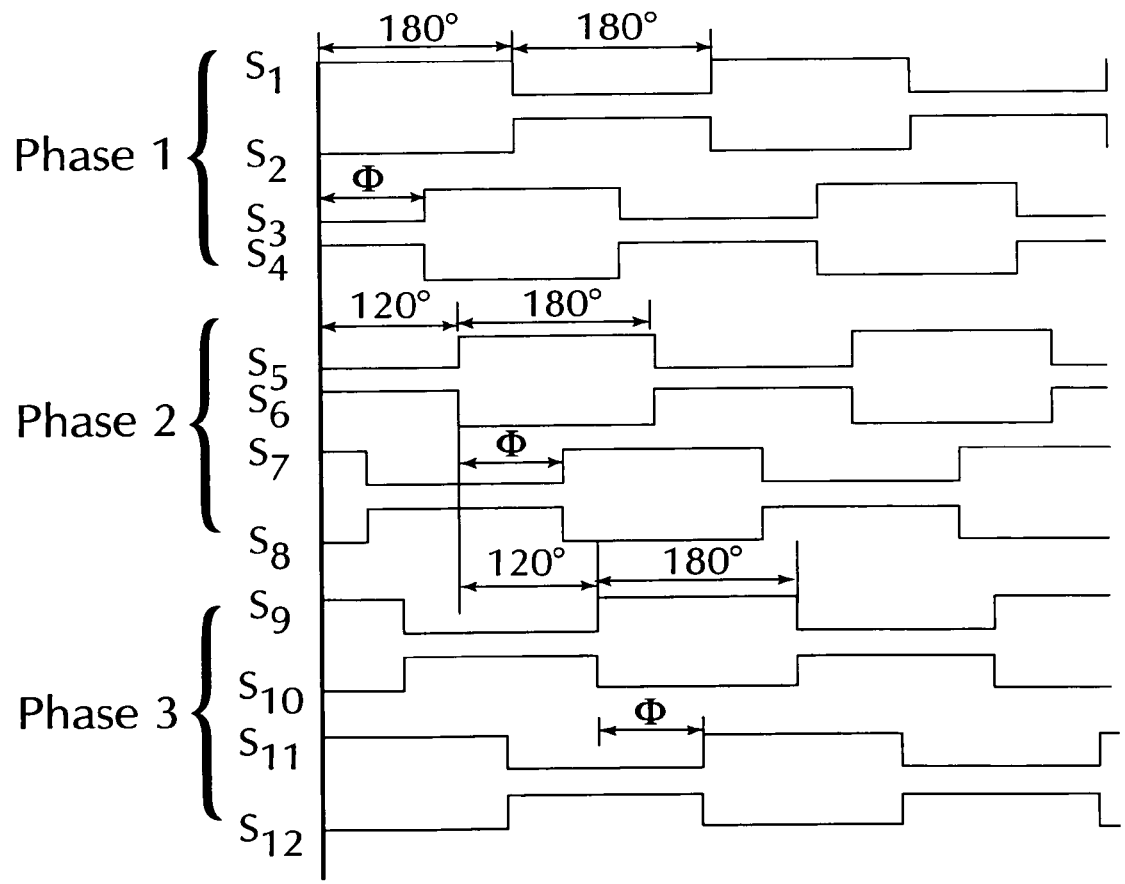
FIG. 9 depicts a control signal for the embodiment of FIG. 1.

With reference to the embodiment depicted in FIG. 1, a control signal for each switch is shown in FIG. 9. For the first phase switches $S_1$-$S_4$ the control signals are marked by the switch identifier $S_1$-$S_4$, as shown, and indicated in Phase 1. For the second phase switches $S_5$-$S_8$, the control signals are marked as indicated in Phase 2. For the third phase switches $S_9$-$S_{12}$, the control signals are also marked as indicated in Phase 3.

Each switch conducts 180° and turns off 180°. Taking the first leg $a_1$ of phase 1 switches and switch $S_1$ which operates according to a switch $S_1$ control signal as an example, the switch's ($S_1$) complementary switch $S_2$ control signal turns off when the switch $S_1$ control signal is turned on, and thus switch $S_2$ control signal is also conducting at 180° per cycle. The second leg $a_2$ of phase I switches is controlled by switch $S_3$ and switch $S_4$ control signals. There is a phase shift angle φ between the first leg and the second leg. This angle controls the duty cycle output. The larger φ, the larger output duty cycle. The phase shift angle φ can be varied between 0 and 180°. At 180°, the duty cycle is 1, and at 0°, the duty cycle is 0. Phase 2 and Phase 3 have the same switching pattern as that of Phase 1. However Phase 2 is lagging Phase 1 by 120° and Phase 3 is lagging Phase 2 by another 120°. Such a control signal arrangement allows (1) all switches to turn on at zero-voltage condition and (2) output voltage overlap and passive ripple cancellation.

Although the use of a passive energy storage component solution is straightforward and effective, it will largely increase system volume and cost for a reasonably acceptable ripple. The better solution is to use active control and to avoid any penalty. Since there is an active power switching network between LV and HV sides, it provides a mean to process energy with high frequency switching operation. A properly designed control loop may limit or prevent HV load side ripple current from entering LV source side fuel cell when the power stage switching frequency is much higher than the frequency of load side ripple current.

It should be noticed that to control the ripple current, a single voltage loop does not track the current directly. Considering the basic DC/DC operation, by controlling the DC/DC converter output inductor current with an additional current loop, it is possible to reduce the ripple current. For a phase-shift controlled DC/DC converter with both voltage and current loops included, the control block diagram can be illustrated in FIG. 10 and the converter system structure can be shown in FIG. 11.

Figure 10:
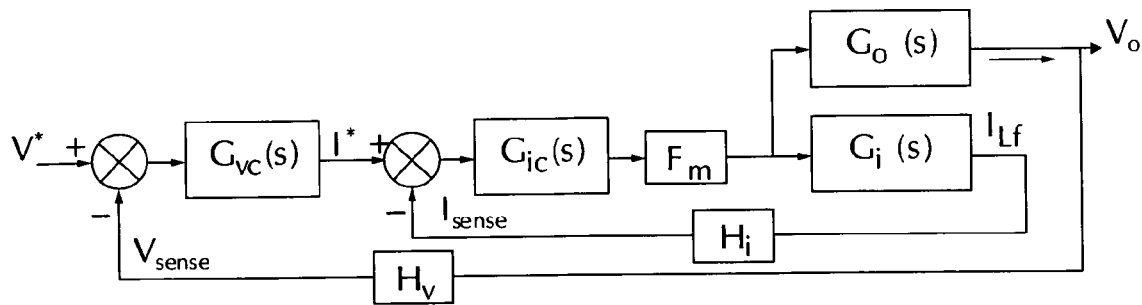
FIG. 10 is a block diagram of the ripple control system of the present invention.

An optional advanced ripple reduction method with active control may be used with the present converter to maximize fuel cell utility. Alternatively, the advanced ripple reduction method of the present invention may be used with other converters, including prior art converters. The ripple reduction method may also be utilized adjacent other converter topologies, as described hereinafter. FIG. 10 shows the proposed active control system block diagram. Where α is the control variable in the system, it can be a control angle in a phase-shift controlled converter or duty cycle for a PWM converter.

There are two control loops: a voltage $V_{sense}$ loop and a current $I_{sense}$ loop. The voltage $V_{sense}$ loop is placed in the outer loop, and current $I_{sense}$ loop is placed in the inner one. Each control loop has a control-to-output transfer functions. $G_{o\alpha}(s)$ represents the control-to-output voltage transfer function, and $G_{i\alpha}(s)$ represents the control-to-output current transfer function. $G_{vc}(s)$ is the outer voltage loop compensator and $G_{ic}(s)$ is the inner current loop compensator. $H_v$ is the gain of voltage loop feedback circuit and $H_i$ is the gain of current loop feedback circuit. $F_m$ is the modulation index of PWM regulator. The inner loop $I_{sense}$ regulates the current to flow the output filter inductor, and is a part of the outer loop control. For the outer loop, a reference $v_{ref}$ or V* is given to control converter output voltage, and the compensator $G_{vc}$ output is used as current command for the inner loop.

The inner current loop compensator can be obtained with its associated operational amplifier (op amp) circuit parameters.

$$G_{ic}(s) = \frac{1}{R_{i1} \cdot (C_{i1} + C_{i2})} \cdot \frac{1 + s \cdot R_{i2} \cdot C_{i1}}{s \cdot \left(1 + s \cdot R_{i2} \cdot \frac{C_{i1} \cdot C_{i1}}{C_{i1} + C_{i2}}\right)}$$

The loop gain of the inner current loop can be expressed as:

$$T_i(s) = G_{ic}(s) \cdot F_m \cdot G_{i\alpha}(s) \cdot H_i$$

where $F_m$ is the converter modulation index and $H_i$ is the current feedback sensor gain. $G_{i\alpha}$ is the transfer function of output filter inductor current to control angle, α. For a 3-phase phase-shift controlled DC/DC converter, the control to current output transfer function can be derived as follows.

$$G_{i\alpha}(s) = \frac{I_L(s)}{\alpha(s)} = \frac{1 + s \cdot R_L \cdot C_f}{R_L \cdot \left(1 + s \cdot \frac{L}{R_L} + s^2 \cdot L \cdot C_f\right)} \cdot \frac{n}{60} \cdot V_{dc}$$

For the outer voltage loop, the compensator gain can be obtained from its associated op amp circuit parameters.

$$G_{vc}(s) = \frac{1}{R_{v1} \cdot (C_{v1} + C_{v2})} \cdot \frac{1 + s \cdot R_{v2} \cdot C_{v1}}{s \cdot \left(1 + s \cdot R_{v2} \cdot \frac{C_{v1} \cdot C_{v1}}{C_{v1} + C_{v2}}\right)}$$

With the inner current loop closed, the outer voltage loop gain can be expressed as a function of inner current loop gain and associated compensators. The outer voltage loop loop-gain can be derived as $$T_v(s) = G_{vc}(s) \cdot \frac{G_{ic}(s) \cdot F_m}{1 + G_{ic}(s) \cdot F_m \cdot G_{i\alpha}(s) \cdot H_i} \cdot G_{o\alpha}(s) \cdot H_v$$

The compensators can be designed with conventional proportional-integral (PI) controllers. By combing the power stage and the controllers, the system can be illustrated in FIG. 11. Here voltage loop is the outer loop and current loop is the inner one. A reference voltage $V_{ref}$ is given to the outer loop to control converter output voltage, and the voltage loop compensator $G_{vc}$ generates a reference signal for the inner current loop.

The power stage transfer function can be expressed as $$G_{i\alpha}(s) = \frac{I_L(s)}{\alpha(s)} = \frac{1 + s \cdot R_L \cdot C_f}{1 + s \cdot \frac{L}{R_L} + s^2 \cdot L \cdot C_f} \cdot \frac{nV_{dc}}{R_L},$$

and $$G_{o\alpha}(s) = \frac{V_o(s)}{\alpha(s)} \approx \frac{1}{1 + s \cdot \frac{2n^2 \cdot L_{lk} + L_f}{R_L} + s^2 \cdot (2n^2 \cdot L_{lk} + L_f) \cdot C_f} \cdot n \cdot V_{dc}$$

The design guideline for outer voltage loop 128 can be given as: 1. place the first pole at the origin to eliminate the steady-state error, 2. place the second pole at the power stage equivalent series resistance related frequency, typically a high frequency, 3. place zero around the power stage zero to compensate voltage loop pole caused by the inductor current loop, and 4. select a gain for the appropriate cross-over frequency. The design guideline for inner current loop 130 can be given as: 1. place the first inner loop pole at the origin to eliminate the steady-state error, 2. place the second inner loop pole at about half of the switching frequency to attenuate switch ripple and high frequency noise, 3. place zero at or below the power stage resonant frequency to damp the overshoot, and 4. select a gain for the appropriate cross-over frequency.

The inner current loop should have a fast dynamics, therefore it requires high bandwidth. The bandwidth for the outer voltage loop can be relatively low. Because the 120 Hz current ripple is of the most concern, to avoid the interaction, the crossover frequencies of both loops should be well separated from this 120 Hz. At least a half decade of separation is recommended. Therefore, a preferred current-loop crossover frequency is above 600 Hz and the voltage loop crossover frequency should be lower than 24 Hz. Further separation for voltage loop is preferred. This current loop is to regulate the inductor current to produce a pure DC so that there is no ripple propagating back to the fuel cell.

Figure 11:
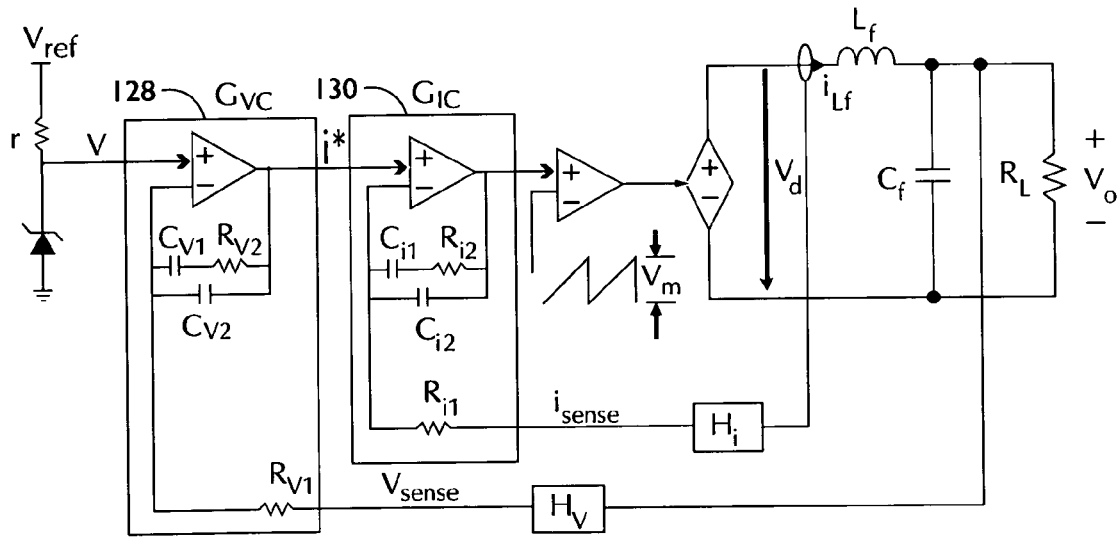
FIG. 11 is a circuit diagram of a DC/DC converter with dual loop ripple control.

To verify the average model of the converter, a controller is designed and simulation is performed for load transients, assuming a resistive load. A relatively low crossover frequency is used to avoid interactions between systems. One decade of separation between the cross-over frequency of the DC/DC converter and that of an inverter load should be sufficient to avoid system control interaction. A 1-zero 2-pole PI compensator is employed here, as illustrated in FIG. 11.

Figure 12:
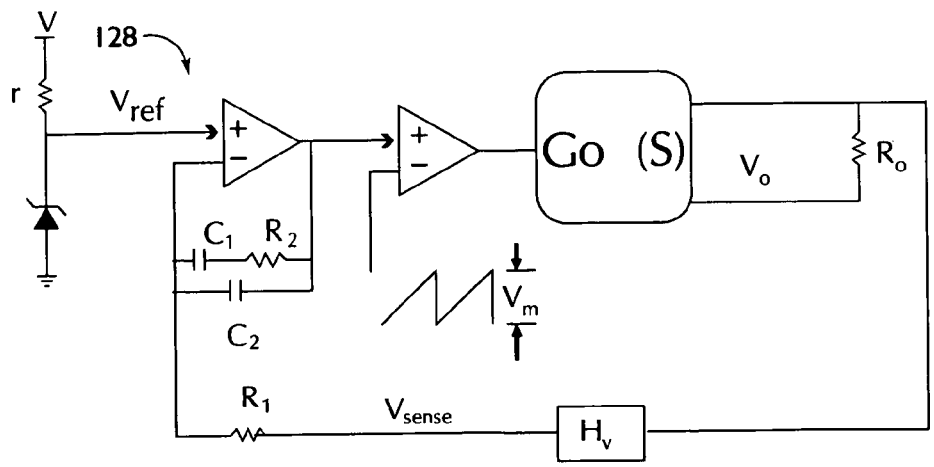
FIG. 12 is a circuit diagram depicting the voltage loop of the dual loop ripple control of FIG. 11.

FIG. 12 is a diagram depicting PID controller structure for the voltage loop alone, which has been widely used in the conventional DC/DC converters. The following relationship applies to the voltage loop alone:

$$G_c(S) = G_c(0) \frac{1 + \frac{s}{\omega_z}}{s \cdot \left(1 + \frac{s}{\omega_p}\right)}.$$

The controller parameters for the voltage loop alone are determined based on the following guidelines: first, place the first pole at the origin to eliminate the steady-state error, second, place the second pole at the power stage equivalent series resistance (ESR) related frequency, typically a high frequency, third, place zero below the power stage resonant frequency to damp the overshoot, and fourth, select a gain for the appropriate cross-over frequency.

The ripple reduction control circuit, as shown in FIG. 11, has a reference voltage $V_{ref}$ and a reference current $I_{ref}$. A ripple reduction control circuit for the voltage reference $V_{ref}$ has a first resistor $R_{v1}$ in series with one side of a second resistor $R_{v2}$ which is in series with a first capacitor $C_{v1}$, both the second resistor $R_{v2}$ is connected in parallel to a second capacitor $C_{v2}$. A ripple reduction control circuit for the current reference $I_{ref}$ has a third resistor $R_{i1}$ in series with one side of a fourth resistor $R_{i2}$ which is in series with a third capacitor $C_{i1}$, both the fourth resistor $R_{i2}$ is connected in parallel to a fourth capacitor $C_{i2}$.

A sample of the multiphase soft-switching converter according to the embodiment of FIG. 1 has been assembled and tested to compare with the conventional hard-switching and single-phase full-bridge soft-switching converter. Test waveforms were compared side-by-side with the conventional technologies to show superiorities of the proposed converter. Three major features were found in the system level test with the proposed soft-switching DC/DC converter: (a) Elimination of voltage overshoot and ringing on $V_{ds}$, (b) Elimination of output voltage and current ripples, $V_d$ and $Vi_L$, and (c) Elimination of output electromagnetic interference (EMI).

Figure 13A:
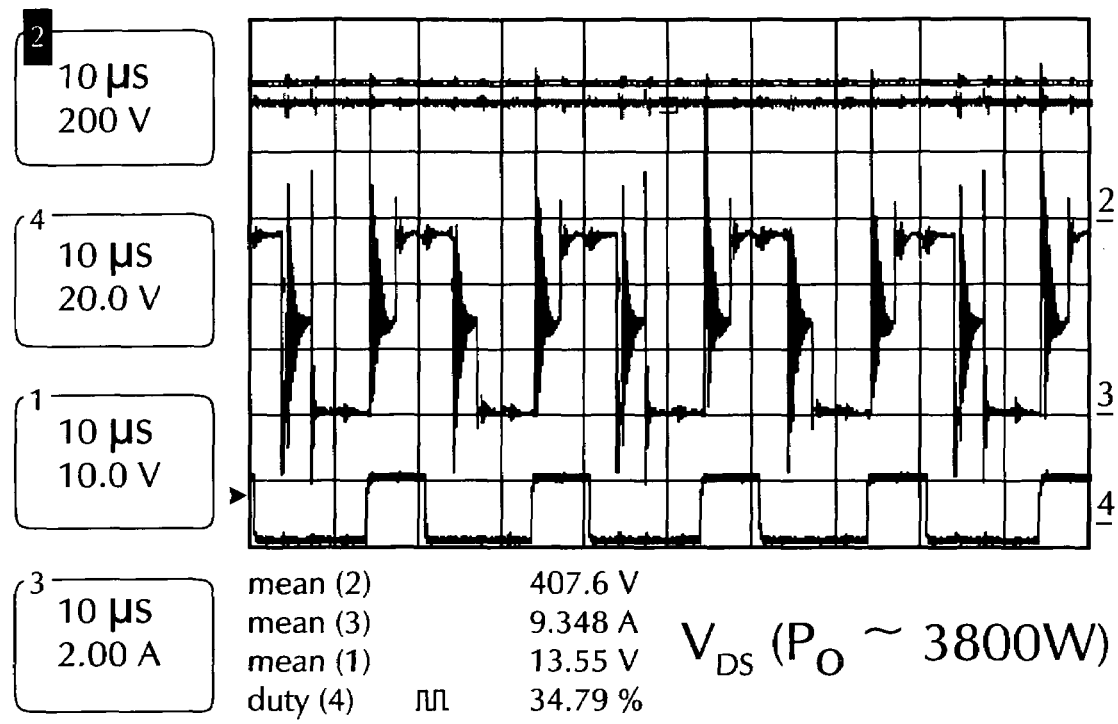
FIG. 13a is an experimental result graph depicting voltage overshoot and ringing during device turn-off of a conventional hard-switching device.
Figure 13B:
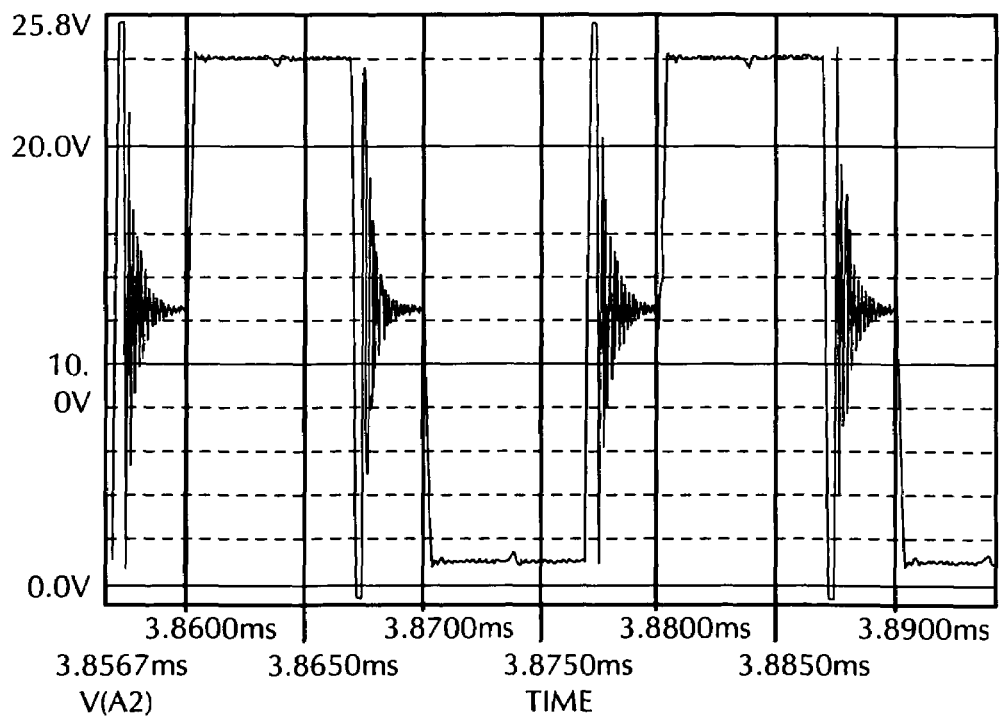
FIG. 13b is a simulation result graph depicting voltage overshoot and ringing during device turn-off of a conventional hard-switching device.

The elimination of voltage overshoot and ringing on $V_{ds}$, during device turn-off, is a major feature of the present invention. A typical hard-switching converter introduces significant voltage overshoot, and therefore, requires higher voltage rating devices to operate which is a major cost penalty. The evidence can be seen in FIG. 13a. With input voltage of 28 V, the device voltage shoots up to 52 V. This simply implies that device voltage rating needs to be twice the fuel cell voltage plus some safety margins. The voltage overshoot and ringing can also be seen from computer simulation results, as shown in FIG. 13b.

Figure 14A:
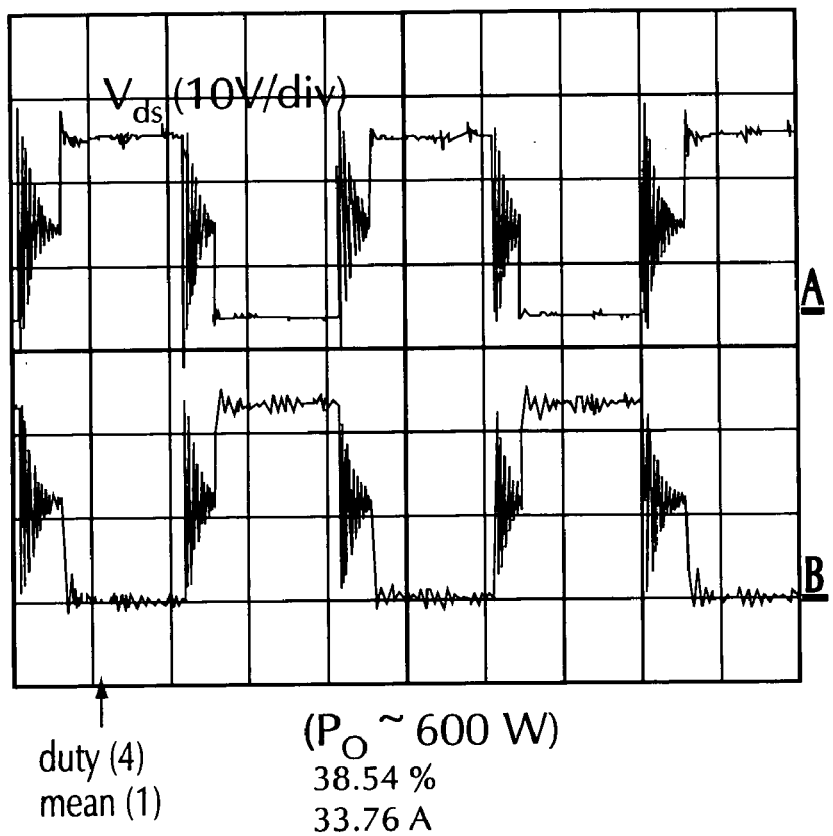
FIG. 14a is a graph depicting voltage spike involving a conventional hard switched converter.
Figure 14B:
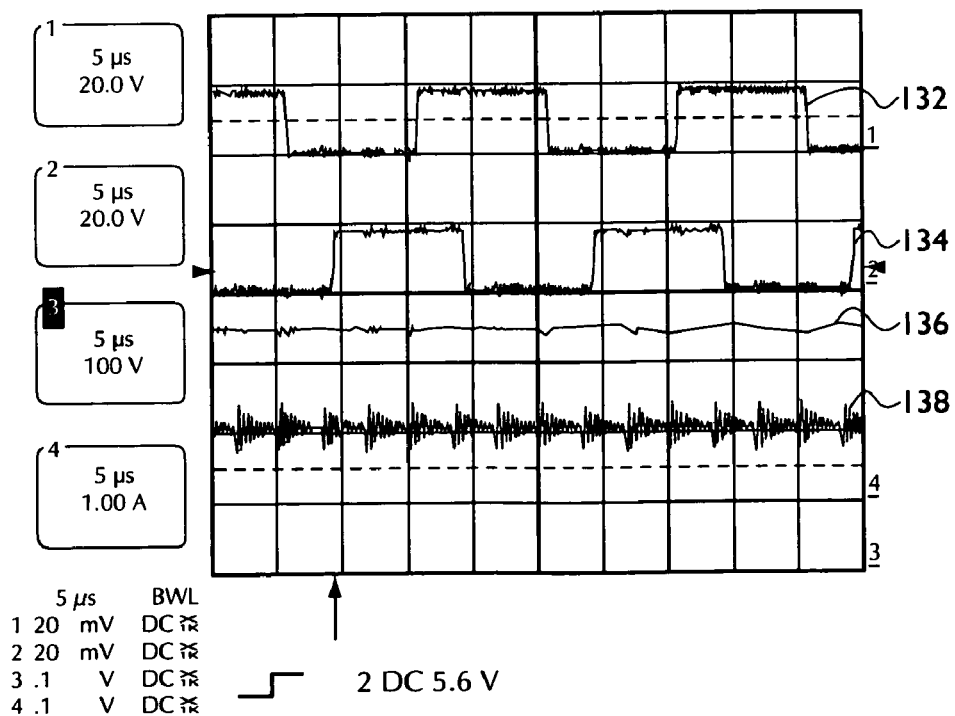
FIG. 14b is a graph depicting voltage spike reduction, output voltage and current ripple elimination, and an experimental waveform at α=150° of a multiphase converter of an embodiment of the present invention.

FIGS. 14a and 14b compare the voltage across the device, $V_{ds}$. The voltage spike is nearly double when the power is pushed to 3.8 kW. Even with light load condition, the device voltage also presents overshoot and significant ringing under device turn-off and other phase turn-on conditions. As shown in FIG. 14a, the voltage overshoot and ringing problems prevail even at 12% load condition. This problem is completely eliminated when the devices are running under zero-voltage soft-switching condition. FIG. 14b indicates that both phase a and phase b device voltages do not see any overshoot and ringing under turn-off condition.

Figure 15:
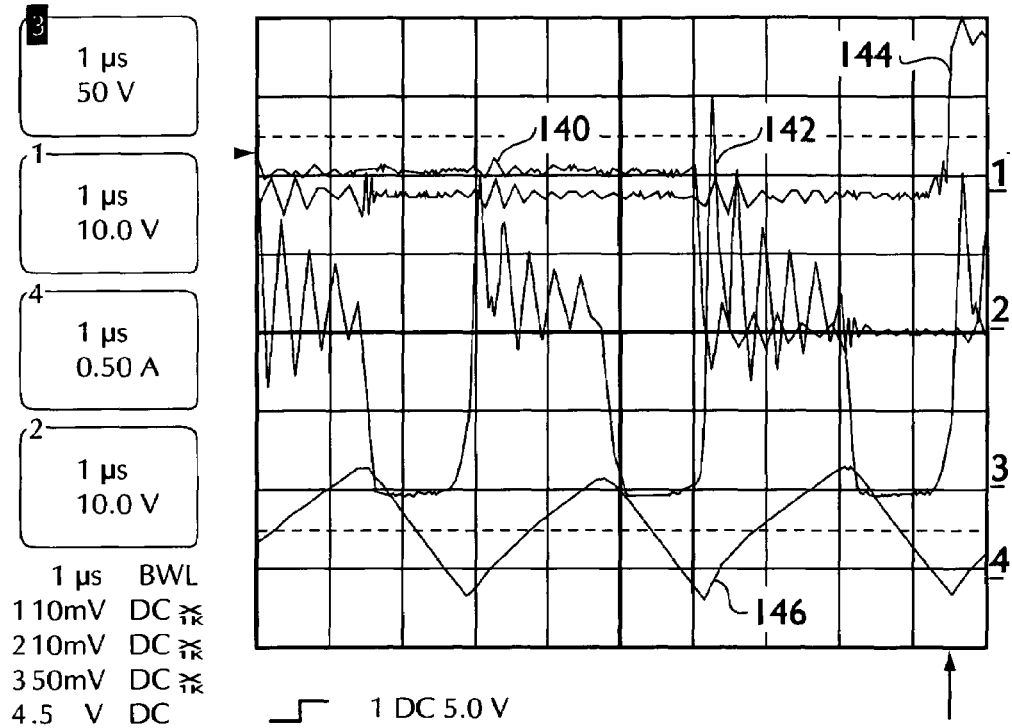
FIG. 15 is a graph depicting the output voltage and current ripple of a conventional single-phase full-bridge converter.

FIG. 14b shows the experimental results of the proposed multiphase converter with zero inductor current ripples, and continuous voltage output waveform. Specifically, the waveforms in FIG. 14b show the phase a device voltage $V_{ds}$ (20V/div) designated 132, phase b device voltage $V_{ds}$ designated 134, the inductor current 136, and the voltage before LC filter $V_d$ designated 138. The voltage before LC filter, $V_d$, does not drop to zero. It has high frequency ripples due to parasitic ringing, but can be filtered with a much smaller inductor. As compared to the conventional full-bridge filter, this inductor size is only a fractional size. The waveforms in FIG. 15 show device voltage designated 140, voltage before LC filter 142, $V_d$, other phase device voltage 144, $V_{ds}$ and inductor current 146 $i_L$. Comparison between full-bridge and the present invention converters of FIGS. 15 and 14b respectively indicated that the secondary inductor current is ripple-less in the converter of the present invention. In principle, no DC link inductor is needed with the present topology. The secondary voltage swing is eliminated using the converter of the present invention with less than 40% voltage overshoot as compared to 250% with the full bridge converter.

Experimental results are shown in FIG. 14b for the DC/DC transformer mode. The device voltages are very clean, resulting in low voltage stress. The inductor current ripple is not noticeable. This implies that the inductor size can be further reduced. The rectifier output voltage, the voltage before LC filter, is continuous. It would have a clean DC output if there is no parasitic ringing. However, the high-frequency ringing on the rectifier voltage is less than 50V for a 200V output; thus, no voltage clamp is needed. The input current between switching devices and the low-side DC bus capacitor is not shown because it is not accessible with the printed circuit board as the interconnection. However, the evidence of a flat output inductor current implies clearly that the input ripple current is also canceled with interleaved operation. With reduction on the major passive components including both output filter inductor and the input DC bus capacitor, a significant cost reduction can also be expected. The diagram of FIG. 14b depicts an experimental waveform at α=150°.

It should be noticed that the power level was intentionally run at a lower level because a zero-voltage condition is tougher to achieve under lower power condition. In our case, soft switching can be achieved in a wide load range because the non-switching phases provide additional current paths to allow the device output capacitance to be discharged, and thus achieving zero-voltage switching.

With elimination of voltage overshoot, the proposed converter is a candidate for fuel cell converter. In general fuel cell voltage under no-load condition is 50% higher than under full-load condition. By using the above test results as the example, the hard-switched converter needs at least 75V device to avoid over-voltage breakdown. With the proposed soft-switching converter, only 60V device is needed. This represents both efficiency improvement and cost reduction with the use of the same amount of silicon.

The conventional full-bridge converter output voltage is discontinuous due to the nature of the simple buck-type converter circuit. A well-known Cuk converter circuit allows ripple current reduction through the use of a bulky high-frequency capacitor, which is not practical in a high power isolated DC/DC converter. The multiphase converter of the present invention has overlapped output voltages that cancel the voltage discontinuity and thus eliminate the current ripple. FIGS. 15 and 14b compare the test results between the conventional full-bridge converter and the proposed multiphase converter. FIG. 15 indicates that the converter output voltage seen before the output filter, $V_d$, not only is discontinuous, but also has significant voltage spike due to parasitic ringing. The inductor current rises when $V_d$ is positive and falls when $V_d$ is zero, and the current waveform looks like a saw tooth wave. Although the ripple current can be smoothed with a large inductor, the size and cost of the inductor is objectionable.

Figure 16A:
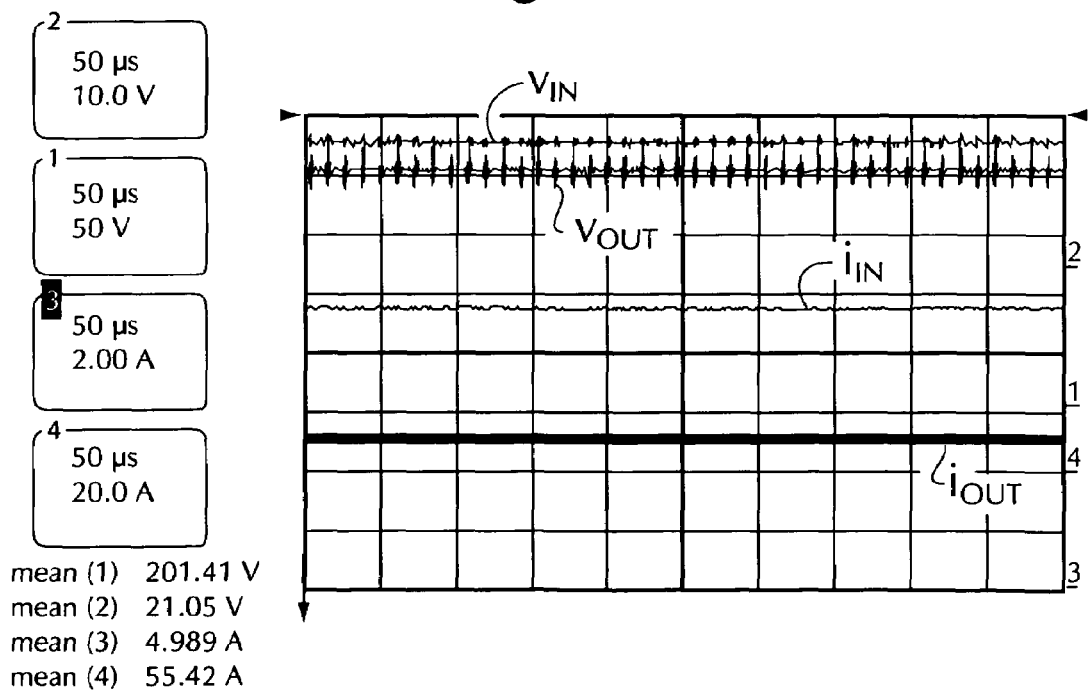
FIG. 16a is a graph demonstrating the EMI of a single-phase full-bridge converter.
Figure 16B:
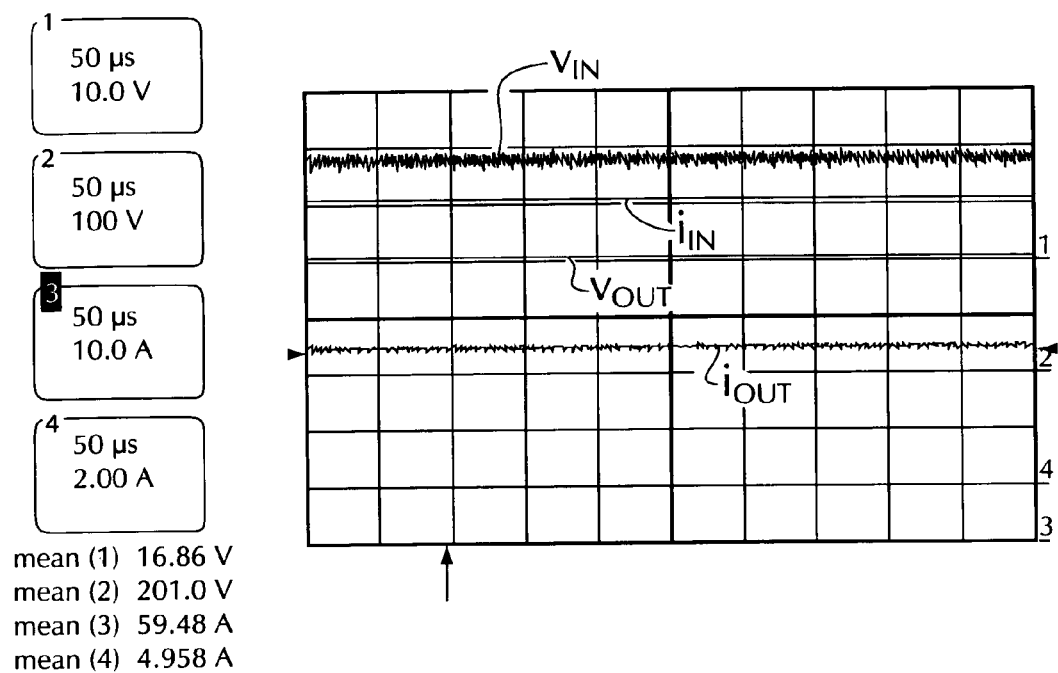
FIG. 16b is a graph demonstrating the EMI elimination of the multiphase converter of an embodiment of the present invention.

FIGS. 16a and 16b depict the input and output voltages and currents at 1 kW output conditions. The voltage overshoot and parasitic ringing seen before LC filter, $V_d$, tend to create high frequency EMI noise at the output capacitor. As seen in FIG. 16a, the output voltage $V_O$ has high frequency ripple that cannot be filtered by the electrolytic capacitor because the resonant frequency of the electrolytic capacitor is much lower than the EMI frequency. Conventional approach of alleviating such high frequency EMI is to add a voltage clamping circuit with high frequency capacitor to absorb the voltage ringing energy.

With the proposed multiphase approach, the results depicted in FIG. 16b, the voltage before LC filter is continuous, and the high-frequency ripple is blocked by the filter inductor, thus the output voltage $V_a$ is very clean. Without the need to add voltage clamping or snubber circuits, the proposed multiphase interleave structure naturally eliminates the EMI noise. This feature not only saves the cost and reduce the size, but also improves the efficiency. The multiphase converter of the present invention depicted of FIG. 16b has significant improvement with less EMI and a better efficiency (97% versus 87% after calibration).

Figure 17:
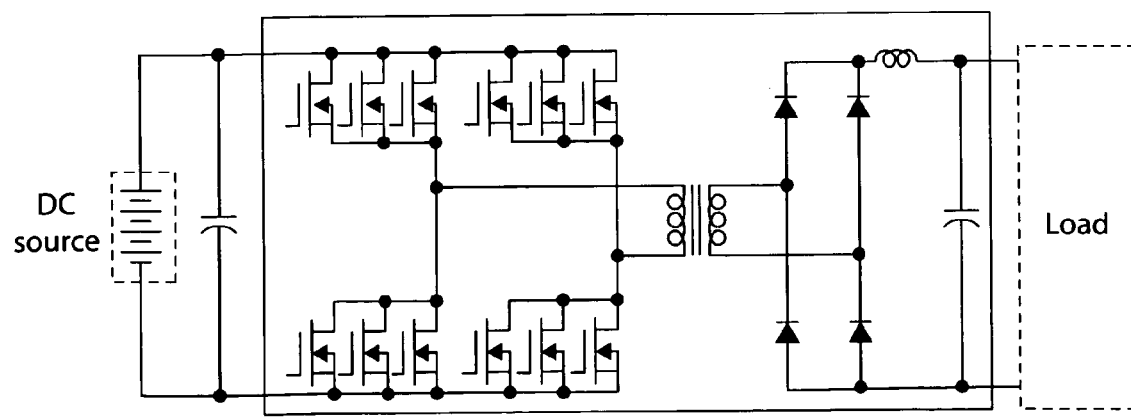
FIG. 17 is a circuit diagram showing a prior art conventional single phase full bridge converter.

FIG. 17 shows a conventional existing single-phase full-bridge converter which may be the source of the conventional comparison data for FIGS. 13a-16b. In order to achieve high efficiency power conversion each switch set may parallel multiple switches. In this circuit diagram, three switches are connected in parallel. The total number of the switches is the same as in the present invention however this conventional circuit does not have ripple cancellation characteristics. One leg of the bridge circuit cannot achieve zero-voltage turn-on at light load because the energy stored in the transformer leakage inductance is not enough to discharge the device output capacitance. This conventional single phase full bridge converter may be combined with the active current ripple control to yield an alternative embodiment of the present invention but is discussed here relative to the multiphase soft switched DC/DC converter of yet another embodiment, which lacks active current ripple control, of the present invention.

The proposed converter is simulated for the three operating cases mentioned above under the following conditions: 25V input DC voltage, resistive 30Ω output load, 50 kHz switching frequency and 500 ns dead-time control for each leg. Other circuit parameters are: 23 nH leakage inductance on the primary side of each phase, 70 μH filter inductor and 2.2 mF filter capacitor. For the phase-shift modulation angle, 400 is used for case 1, 80° is used for case 2, and 150° is used for case 3.

Figure 18A:
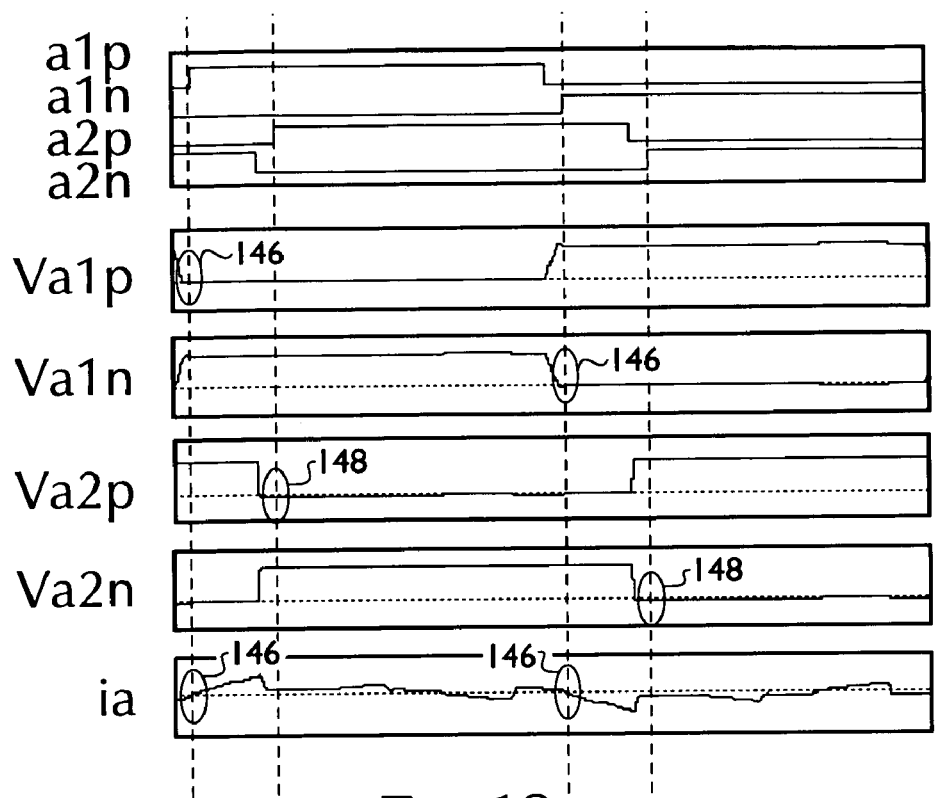
FIGS. 18a-18c are a diagrams depicting soft-switching operations for each phase.
Figure 18B:
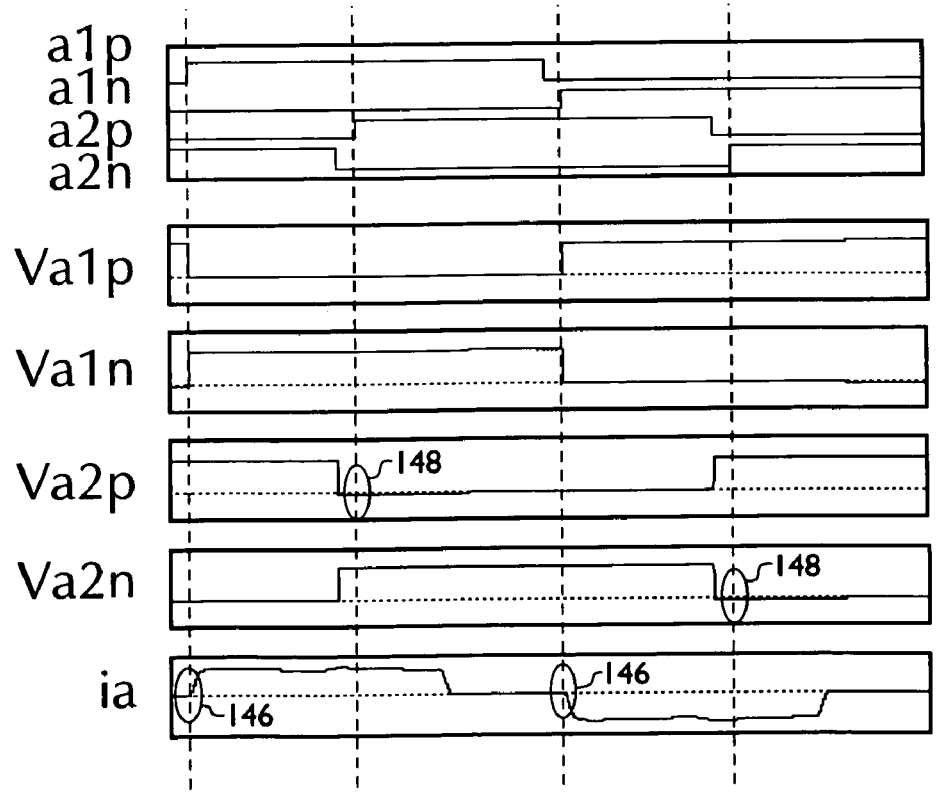
Figure 18C:
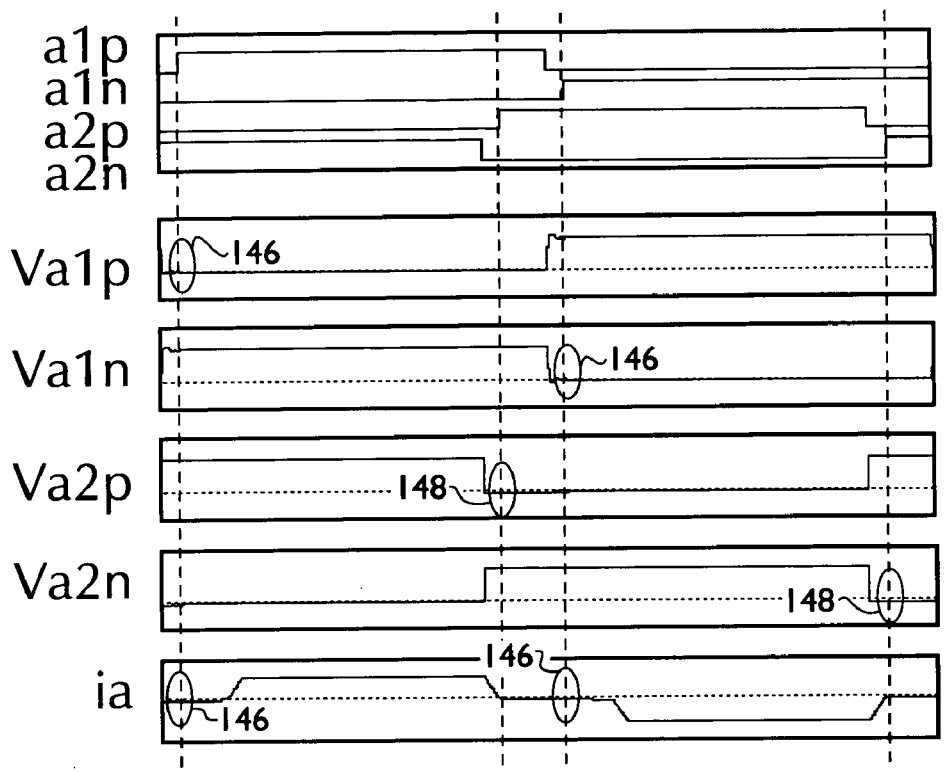

Since phases A, B and C are identical except for the 120° phase displacement from each other, the resulting waveforms are similar. Therefore, only phase A waveforms are shown in FIGS. 18a-18c. In FIGS. 18a-18c, leg $a_1$ ZVS turns on at 146 and leg a2 ZVS turns on at 148. The phase current and device drain-to-source voltages are recorded. Simulation results verify that the lagging leg switches are operating under ZVS condition. Also, from the simulation results we can see that, for all three cases, the leading leg $a_1$ switches are turned on under zero-current condition. When $a_{1p}$ and $a_{2p}$ or $a_{1n}$ and $a_{2n}$ are conducting simultaneously, the phase current $i_a$ would have been continuously flowing in the conventional full-bridge converter. With a three-phase structure, this current is reset by the other two phases, and the zero-current switching condition for the leading leg is naturally created without additional resetting circuitry.

In case 1 and case 2, to get the same output voltage, a larger phase-shift modulation angle is needed at heavy loads due to component voltage drop. Therefore, the above simulation results imply that the converter operates under soft-switching for a wide load range with closed-loop regulation. Another simulation comparison has been done by varying load resistance to get a 400V output, with the same phase-shift modulation angles as stated in the above cases. The simulation results also confirm that the ZVZCS soft-switching operation can be achieved.

To verify this new topology, a prototype unit was built and tested. It consisted of three major parts: a six-leg converter power board, a set of three transformers, and an output rectifier/filter board. In this test unit, three full-bridge single-phase converters are synchronized by an external clock signal and are controlled by the same reference signal. Thus, with well-tuned ramp signals, the phase-shift modulation angles between two legs for each phase are identical. This timing is desirable because, if it is slightly unmatched, it may cause large circulating energy among the transformer primary sides.

Figure 19:
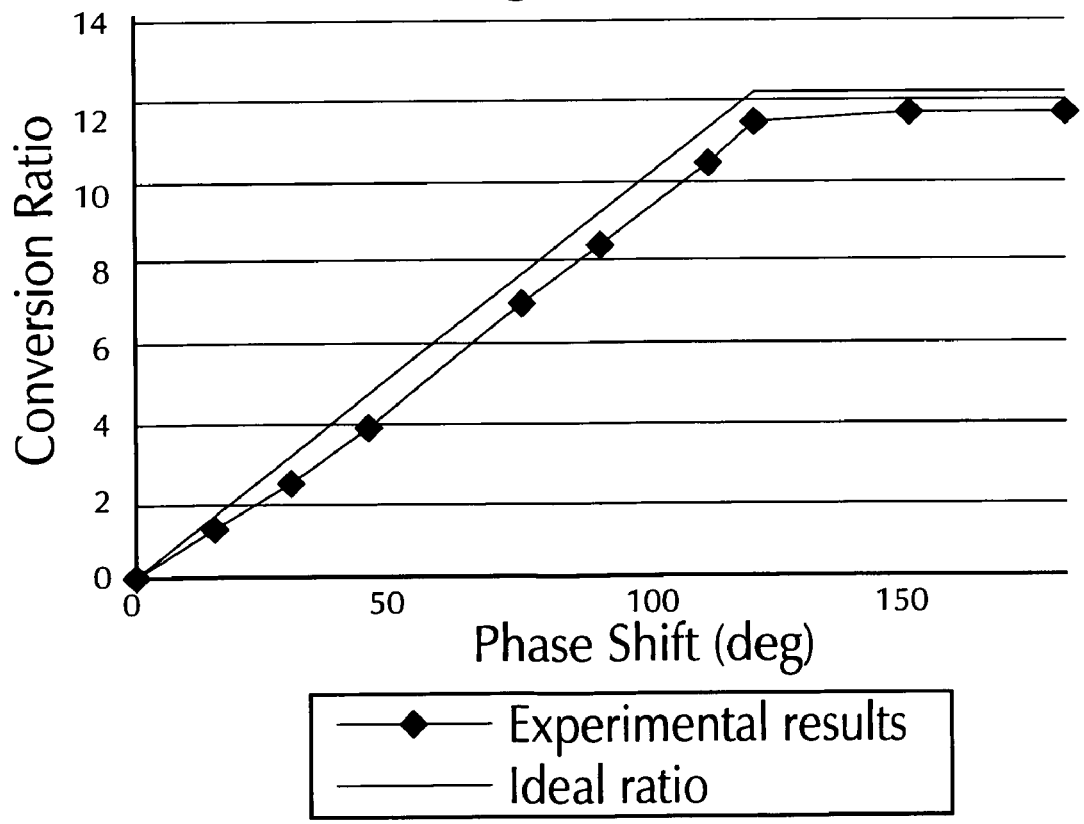
FIG. 19 is a graph depicting the conversion ratio versus phase shift of a prototype converter.
Figure 20A:
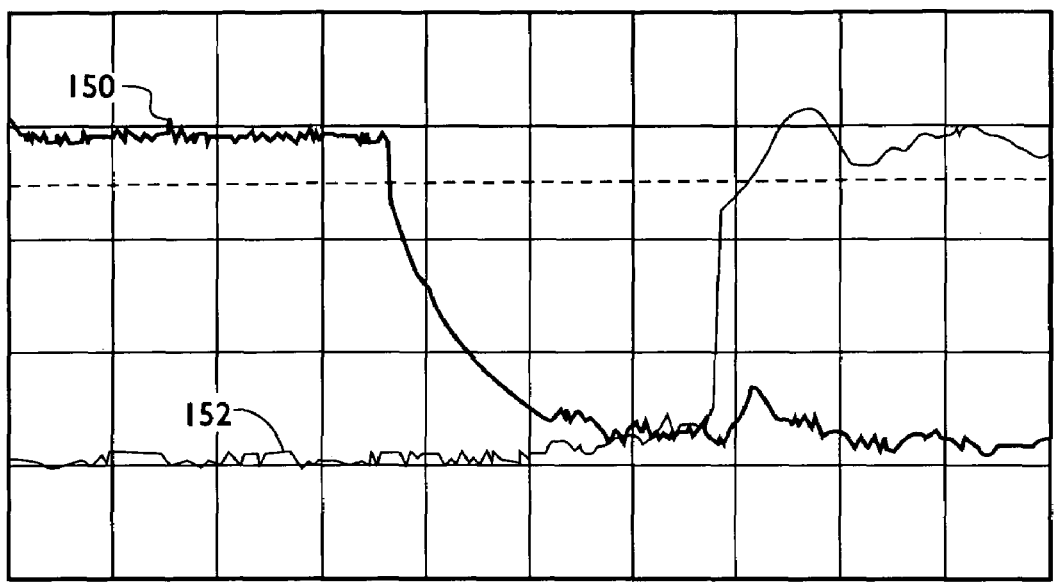
FIGS. 20a-20c are graphs depicting device switching waveforms: (a) Device ZVS Turn-off Waveforms; (b) Leading Leg Device Turn-on Switching Waveforms with 10% Load; and (c) Lagging Leg Device Turn-on Switching Waveforms with 10% Load.
Figure 20B:
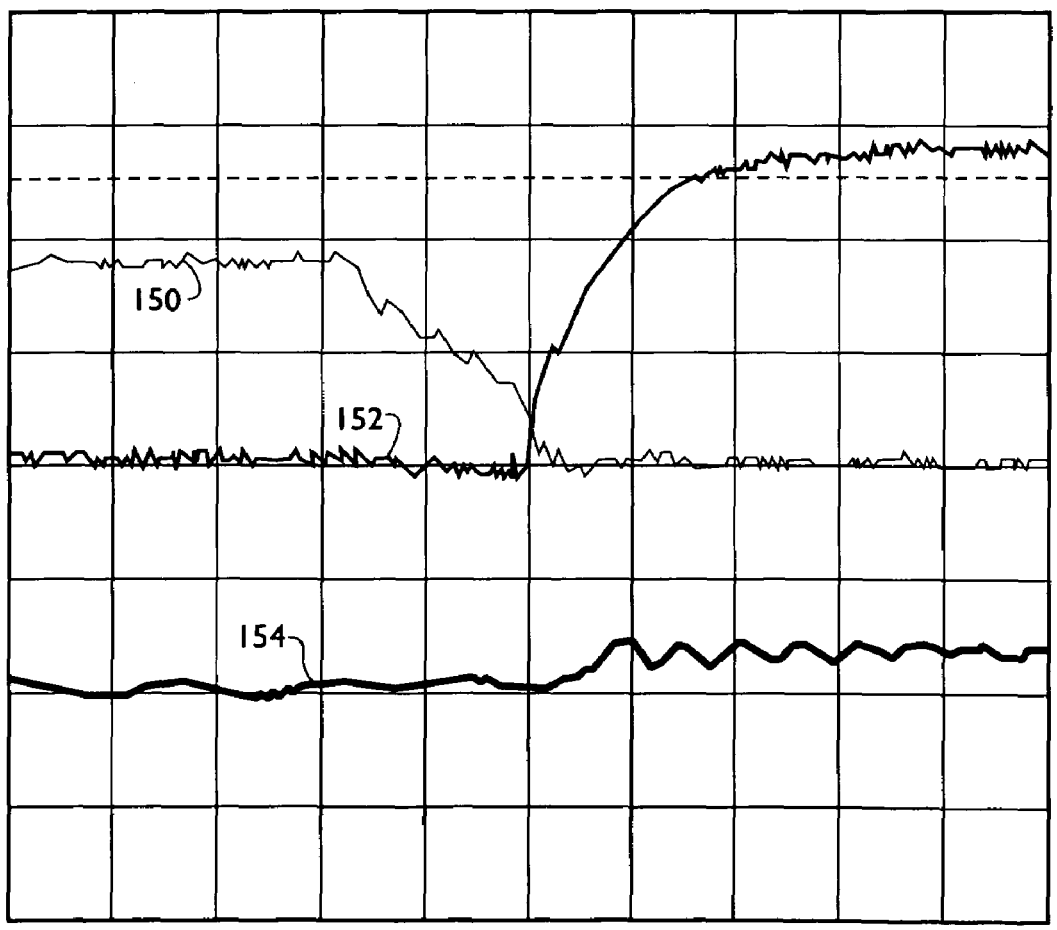
Figure 20C:
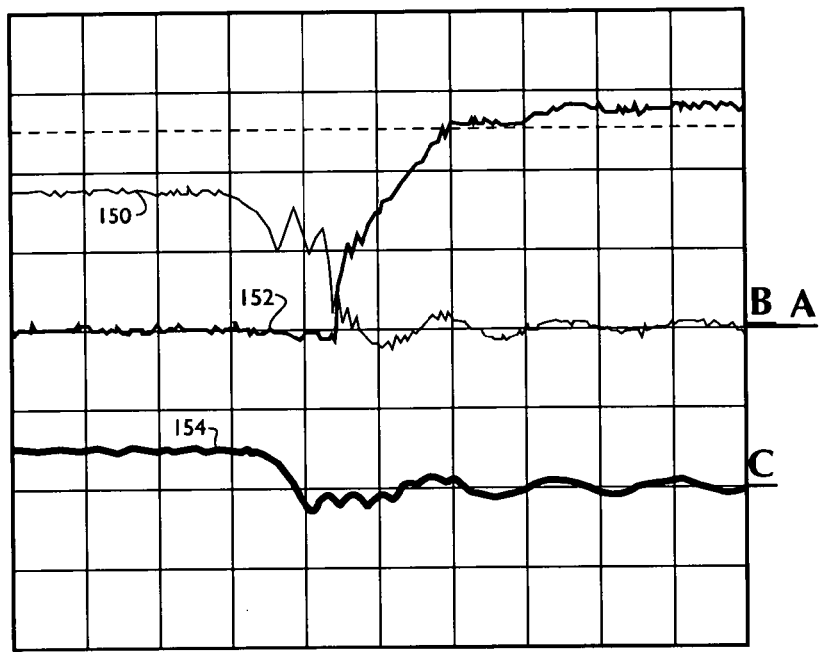

The actual conversion ratio for the prototype is shown in FIG. 19. As can be seen, the experimental results match very closely with the ideal ratio. The discrepancy is the power loss in the circuit, caused by the impact of dead-time control in the leg switches and duty-cycle loss caused by circuit inductance. The experimental results also verify the converter soft-switching operation. Device switching waveforms are shown in FIGS. 20a-20c, with the device voltage designated 150, gate signal 152, and phase current 154. With current circuit parameters, all the devices turn-off with ZVS, as illustrated in FIG. 20a. FIG. 20b shows the turn-on switching waveforms for the leading leg devices; the lagging leg devices turn-on waveforms are shown in FIG. 20c. It should be noticed that these turn-on waveforms are acquired with only 10% load condition, and the ZCZVS operation is apparent. An increased load helps to achieve device ZCZVS operation, confirmed by tests not presented here.

Figure 21:
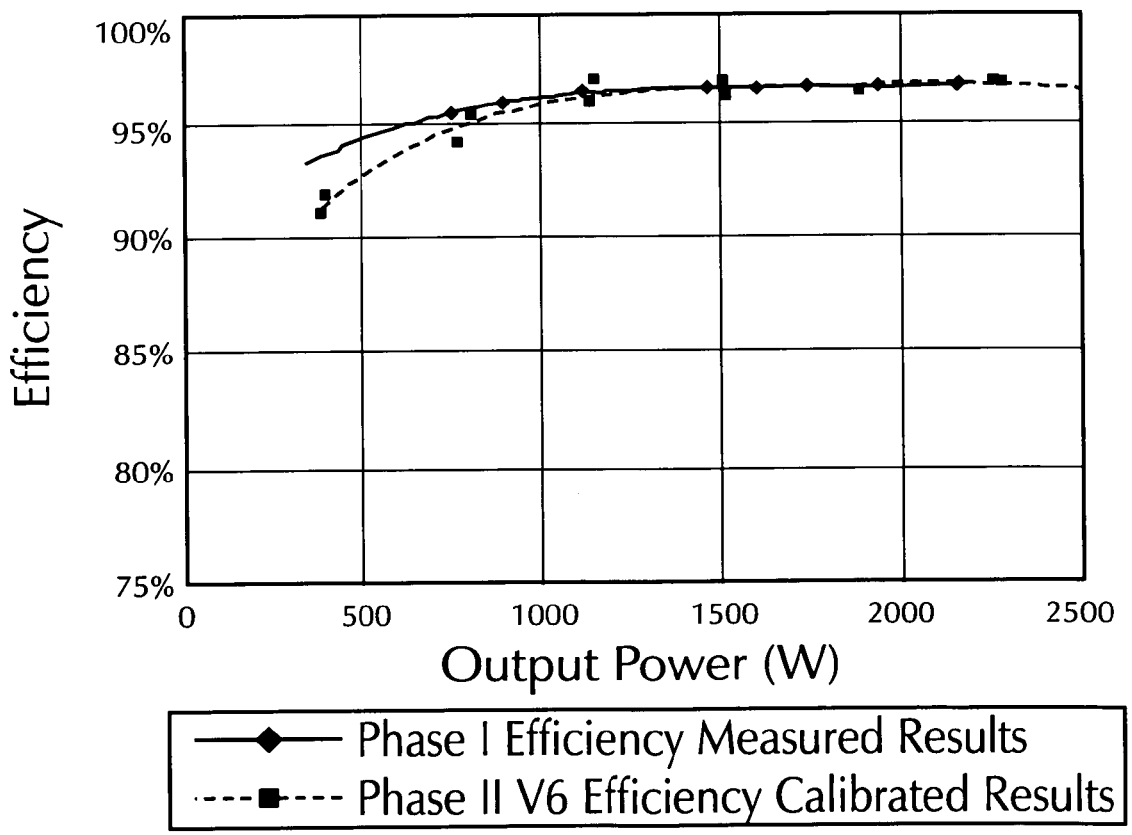
FIG. 21 is a graph depicting experimental data and trendline results for converter efficiency at α=150° showing the experimental data measured results for Phase I and calibrated results for Phase II.

The soft-switching operation discussed above improves system efficiency. The curve in FIG. 21 shows the measured and calibrated system efficiency for different loads, with a margin of error of ±1%. The heatsink temperature rise was less than 20° C. at the 2 kW condition with natural convection. The efficiency measurement results for of FIG. 21 show an experimental data and trend line. The measurement error was within 1%. The heat sink temperature rise was less than 20° C. at 2 kW with natural convection. Both measured and calibrated efficiency results are depicted in FIG. 21.

Figure 22A:
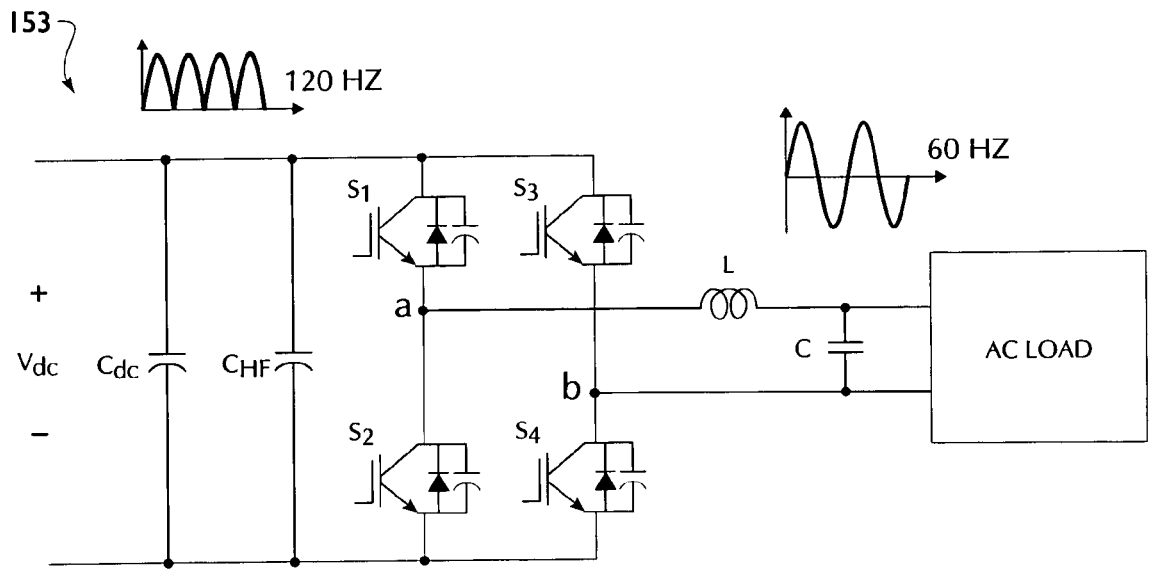
FIG. 22a is a circuit diagram of a single phase full bridge inverter which generates a low frequency ripple current.

An equivalent ripple circuit model was derived. FIG. 22a shows a single-phase full-bridge DC/AC inverter circuit 153. The inverter is implemented with a sinusoidal pulse width modulation (PWM) method at 20 kHz to ensure a clean output voltage. With a linear load, the output current has the same 60 Hz frequency and sinusoidal waveshape as the output voltage. The inverter input voltage and current are DC, but current contains high frequency switching noises and a low frequency ripple component. The ripple component is considered the rectification effect through the inverter switches, and thus it appears to be a 120 Hz pulsating current. The PWM switching noise is filtered with a high-frequency dc bus capacitor, $C_{HF}$, but the energy of the 120 Hz ripple is too high to be absorbed. A bulky DC bus capacitor $C_{dc}$ can then be used to smooth the 120-Hz ripple, but a significant part of the 120-Hz ripple remains and continues to propagate through the entire DC/DC converter and back to the fuel cell.

To study the ripple propagation, the entire converter is simplified in an AC equivalent circuit model. This ripple propagation model and passive solution can be understood with reference to the model depicted in FIG. 22b which derives a DC model 156 and an AC ripple model 158 from the original model 155, as shown. The inverter looking into from $C_{HF}$ together with its load is substituted by a 120 Hz pulsating current source, $I_{load}$, and the fuel cell is replaced with a voltage source $V_{fc}$ along with internal impedance $R_s$. The filter inductor $L_f$, DC bus capacitor $C_{dc}$, and the input capacitor $C_{in}$ represent the impedances on the propagating path. The electrolytic capacitor equivalent series resistors (ESRs) $R_{Cf}$ and $R_{Cin}$ are included.

Figure 22B:
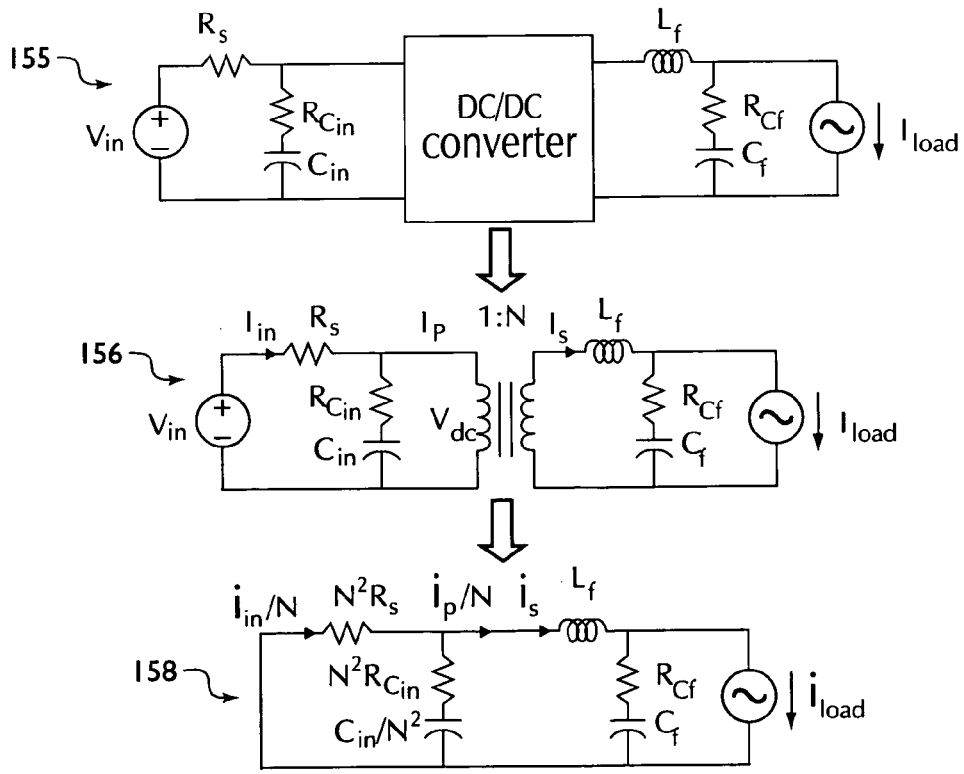

When the DC/DC converter switching frequency is much higher than the ripple frequency, the DC/DC converter can be treated as an ideal DC/DC transformer. The DC model in FIG. 22b shows the use of a DC transformer to replace the entire DC/DC converter. Since only ripple components are of interest in the study, the DC voltage source can be shorted, and the primary circuit impedances can be converted to the secondary quantity. Thus a simplified AC ripple model can be represented with only the ripple current source and impedances on the propagating path. Here the DC/DC converter can be represented with a simple resistor $R_{dc}$.

the input ripple current from voltage source can be expressed in the following formula:

$$i_{fc} = \frac{1 + sb_1 + s^2 b_2}{1 + sa_1 + s^2 a_2 + s^3 a_3} n i_{load}$$

where n is the voltage conversion ratio between output ac peak voltage and low-side fuel cell voltage, and $a_1 = (R_{dc} + R_{Cdc})C_f + R_{Cin}C_{in} + R_s C_{in} + n^2 R_s C_{dc}$ $a_2 = (R_{Cin} + R_s)C_{in}(R_{dc} + R_{Cdc})C_{dc} + C_{dc}L_f + n^2 R_s C_{dc} R_{Cin} C_{in}$ $a_3 = (R_{Cin} + R_s)L_f C_{dc} C_{in}$ $b_1 = R_{Cin} C_{in} + R_{Cf} C_{dc}$ $b_2 = R_{Cin} C_{in} (R_{dc} + R_{Cf}) C_{dc}$ The equation above provides the insight of the relationship between the input current ripple and load current ripple with all critical circuit parameters. In the expression, the source impedance $R_s$ is determined by the fuel cell characteristic and is one of the major dominant factors in the equation because the whole ripple expression is based on the current branching through different impedance paths.

Figure 22C:
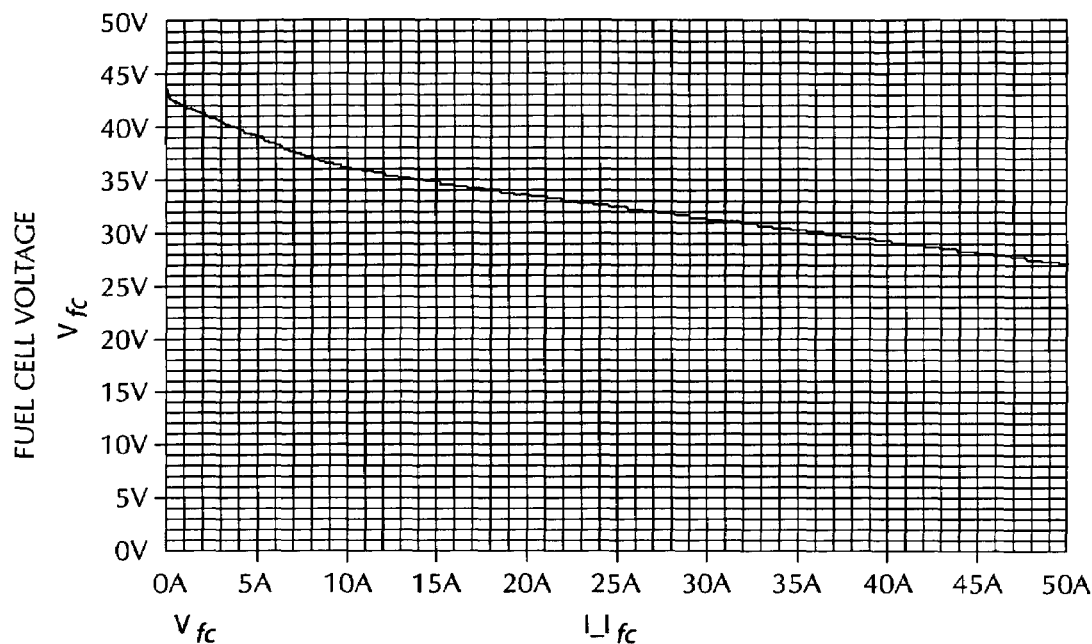
FIG. 22c is a graph of the results of a Nexa PEM fuel cell polarization characteristics plotting fuel cell current versus fuel cell voltage.

In order to verify the validity of (1), the source impedance of the Nexa PEM fuel cell is obtained from its polarization characteristic, as shown in FIG. 22c. In most load conditions, the source impedance is 0.2Ω. Under the light load condition, this value needs to be increased according to the slope of the VI characteristic.

Figure 22D:
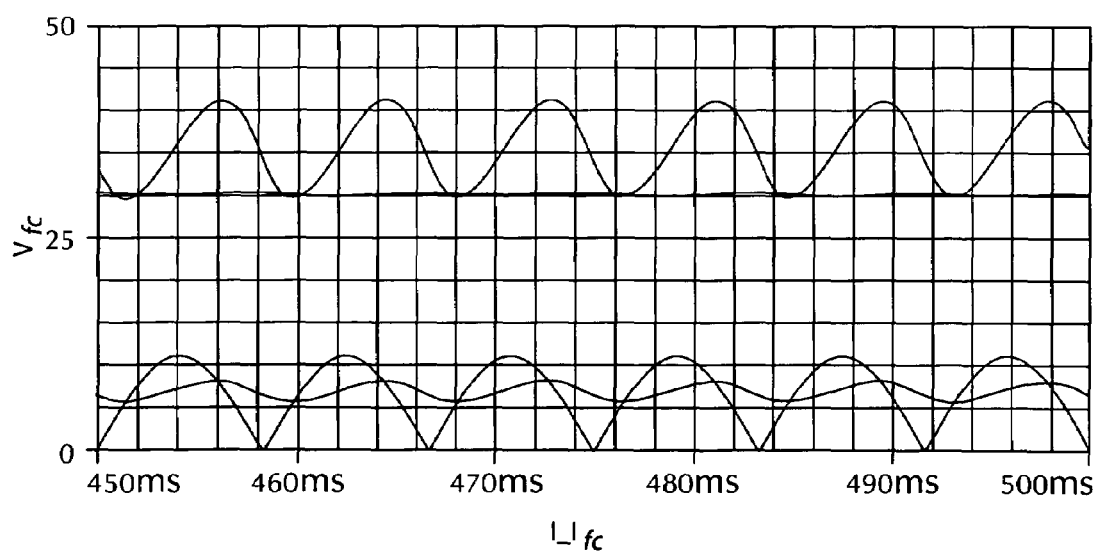
FIG. 22d is a graph depicting simulation results of the equivalent ripple circuit to verify experimental results.

Using the actual hardware system with $C_{in}$=10 mF (with 5 of 2 mF in parallel), $R_s$=0.2Ω, $L_f$=100 µH, $C_{dc}$=680 F, n=5, and ESR=50 mΩ for each electrolytic capacitor, the derived ripple equivalent circuit shown in FIG. 22b is simulated with PSICE, and the results are shown in FIG. 22d. In this simulation, the load current $i_{Load}$ represents the current between $C_{HF}$ and $C_{DC}$ and is swinging from zero to peak, or 100% ripple. The equivalent fuel cell current $i_{fc}/n$ is smoothed out, and shows nearly the same average value as $i_{Load}$. With scaling factor n is multiplied back, the $i_{fc}$ curve clearly indicates 34% peak-to-peak or 17% ripple. The fuel cell is operating at 30V, 35 A steady state condition in this case.

The DC/DC converter can be simplified to a DC transformer with conversion ratio 1:N, and the ripple model can be derived as FIG. 22b. Based on this model, the input ripple current, $i_{in}$, from voltage source can be derived as a function of the load current, $i_{Load}$. The magnitude of the input ripple varies with capacitor values, and the dynamic is associated with the capacitor equivalent series resistors (ESRs).

Both low-voltage (LV) and high-voltage (HV) capacitors, $C_{in}$ and $C_f$ have strong effects when the capacitances are low. The HV side capacitor $C_f$ tends to have more influence than the LV side capacitor $C_{in}$ does because it is directly shunting the ripple current. To reduce input current ripple with passive energy storage components, large capacitors are needed, and the HV side capacitor has larger impacts than the LV capacitor does. Furthermore, low ESR capacitor is always preferred, especially on HV side.

A stationary fuel cell power plant typically consists of a DC/DC converter and a DC/AC inverter. For single-phase output load, the alternating current ripple reflects back from inverter through DC/DC converter and flows back to the fuel cell. Thus the fuel cell may see large low-frequency current ripple, which may harm fuel cell and degrade fuel cell life time, as well as limit fuel cell deliverable power capability.

Figure 23:
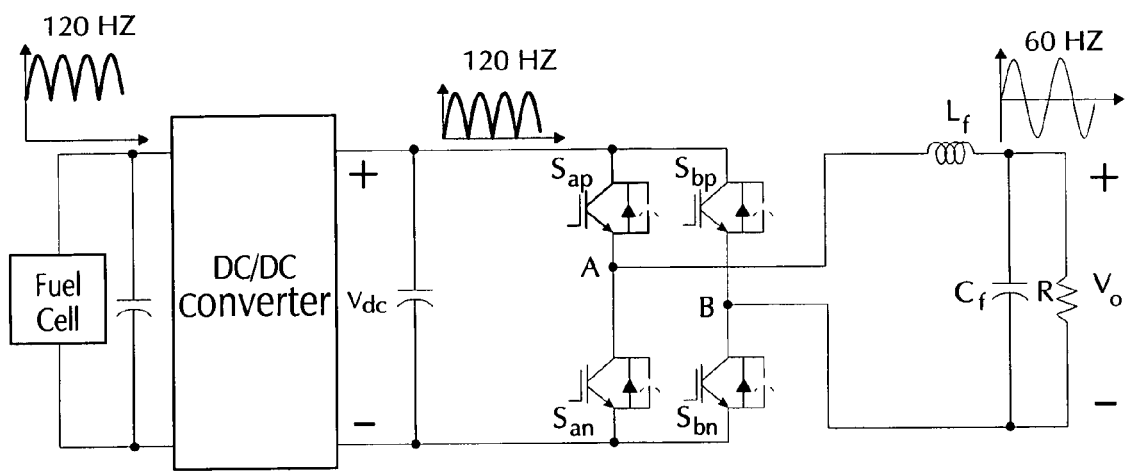
FIG. 23 is a prior art circuit diagram demonstrating current ripple issues with a DC/AC inverter load.

FIG. 23 demonstrates current ripple issues with DC/AC inverter load. The current ripple propagates from AC load back to DC side. With rectification, ripple frequency is 120 Hz for 60 Hz systems. Low frequency ripple is difficult to be filtered unless capacitor is large enough. AC current ripple problems include inverter AC current ripple propagates back to the fuel cell. Fuel cell requires a higher current handling capability which results in a cost penalty to fuel stack. Ripple current can cause hysteresis losses and subsequently more fuel consumption resulting in cost penalty to fuel consumption. State of the art solutions involve adding more capacitors or adding an external active filter(s) which results in size and cost penalty. A most preferred embodiment of the present invention combines the V6 converter with active ripple cancellation technique to eliminate the ripple resulting in no penalty.

Figure 24A:
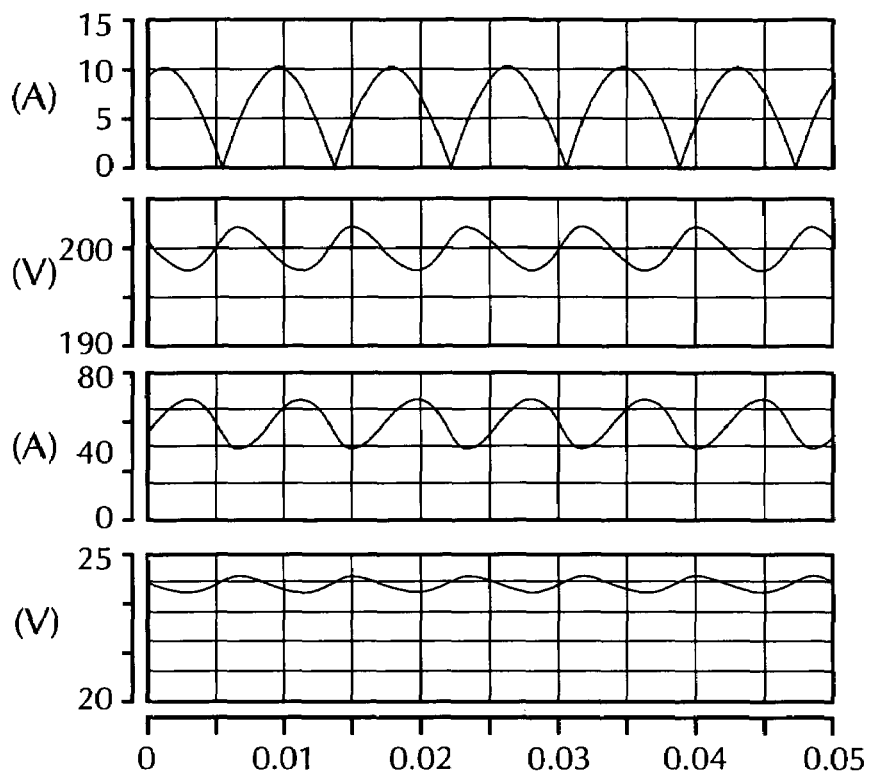
FIGS. 24a and 24b are graphs demonstrating that an input capacitor has very little effect on current ripple reduction wherein the simulation results depict input DC capacitors for 2.2 mF and 4.4 mF respectfully. These graphs appear identical.
Figure 24B:
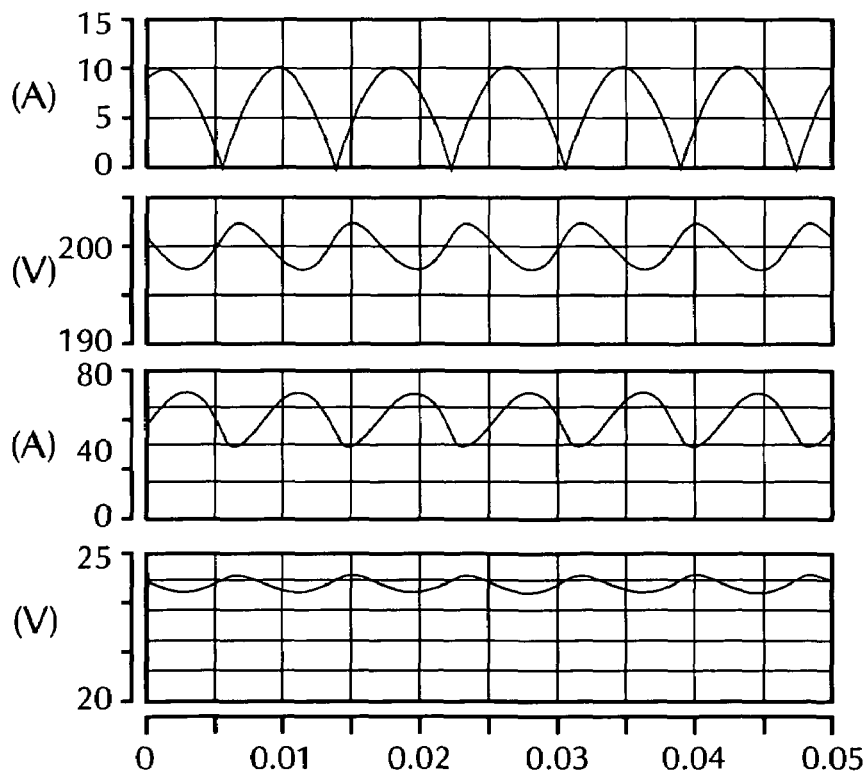
Figure 25A:
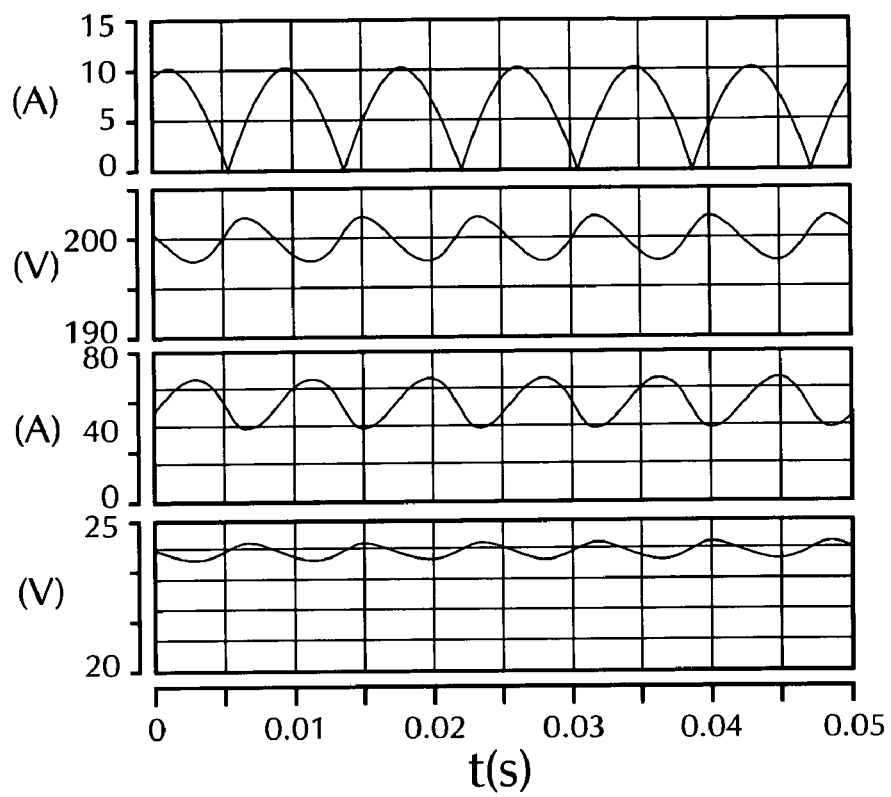
FIGS. 25a and 25b are graphs demonstrating that an output capacitor can be used as passive solution to current ripple reduction.
Figure 25B:
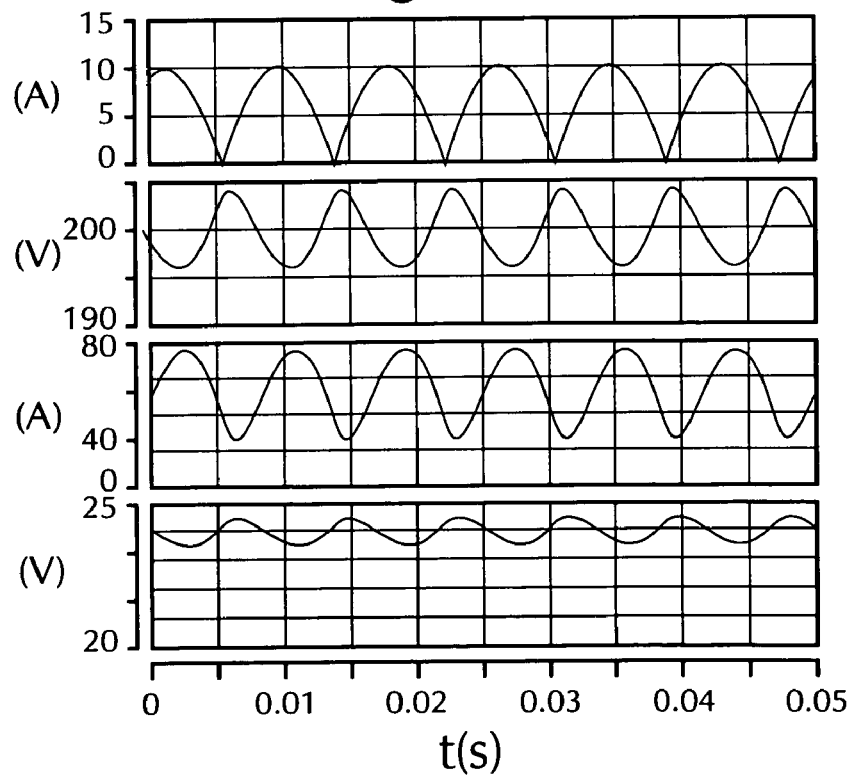

FIG. 23 shows a circuit model for AC current ripple. DC/DC converter parameters for ripple study: input voltage 25V, output voltage 200V, input DC capacitor 6 mF, output DC capacitor 2.2 mF, filter inductor 84 mH, inverter modulation index 0.86 and inverter load resistor 16.7Ω. FIGS. 24a and 24b compare the simulation results with input DC capacitor between 6 mF and 13.6 mF and demonstrate that an input capacitor has very little effect on current ripple reduction. FIGS. 25a and 25b compare the simulation results with output DC capacitor between 2.2 mF and 4.4 mF and demonstrate that the output capacitor can be used as passive solution to current ripple reduction; however, cost is a concern.

Figure 26A:
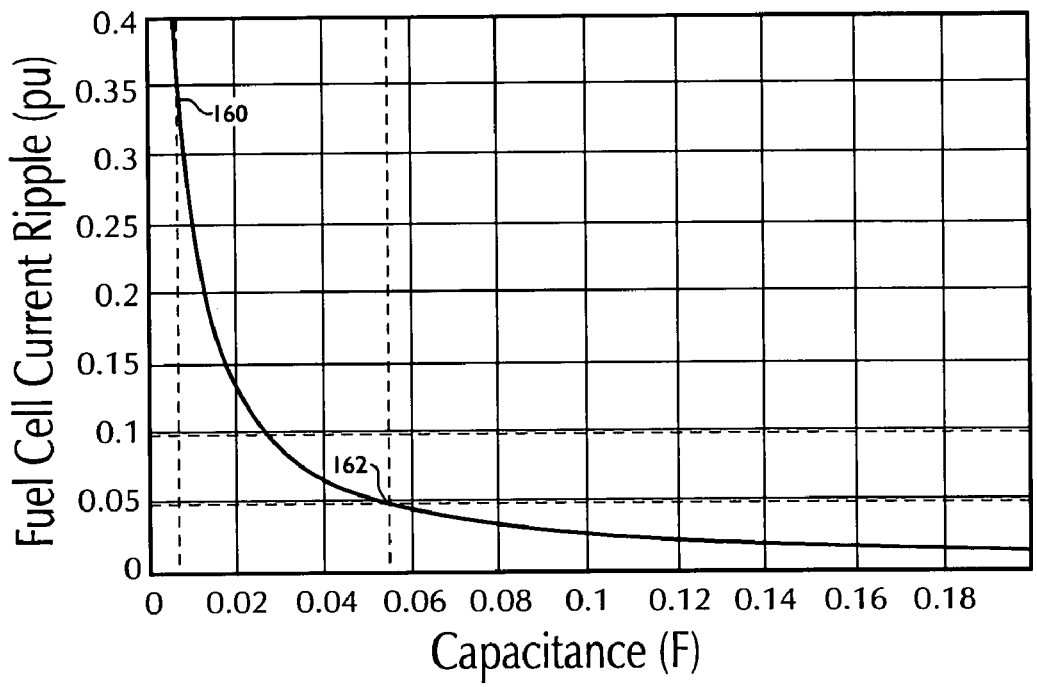
FIG. 26a is a graph demonstrating current ripple reduction with a high side energy storage capacitor.
Figure 26B:
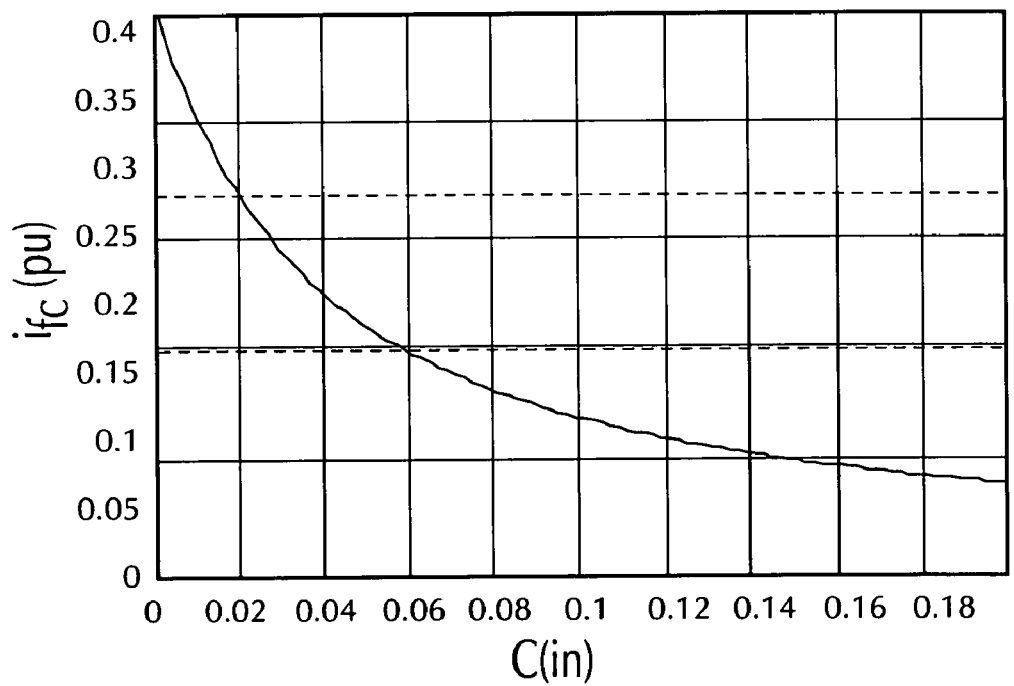
FIG. 26b is a graph demonstrating input current ripple as a function of a low voltage capacitor; $C_{in}$.
Figure 26C:
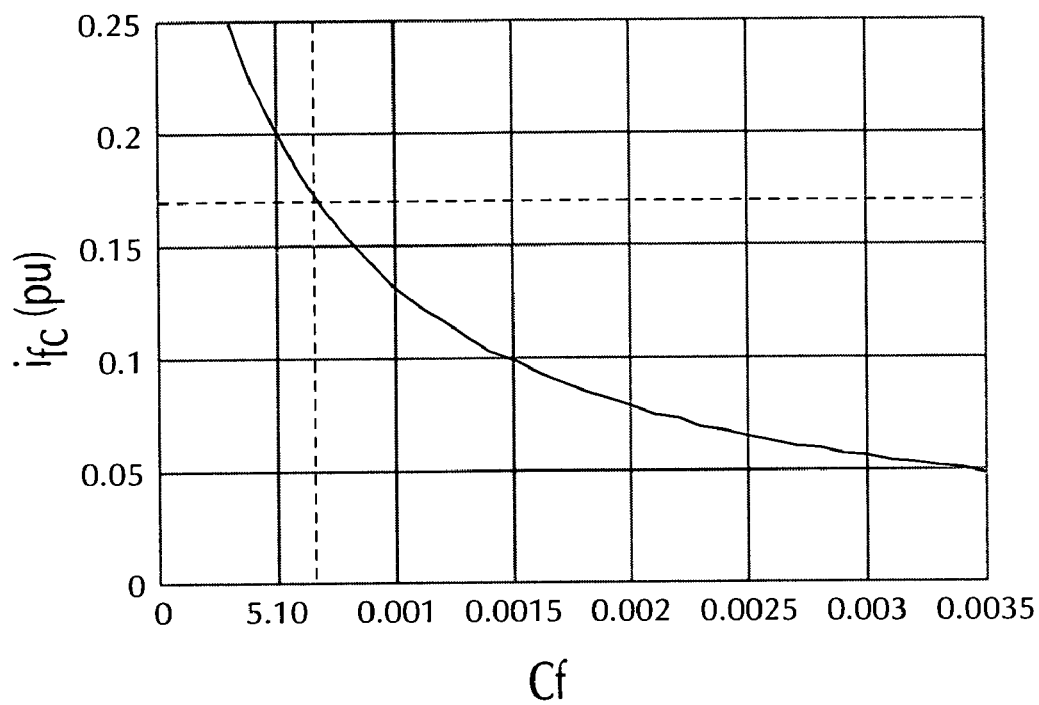
FIG. 26c is a graph demonstrating input current ripple as a function of a high voltage capacitor $C_{dc}$.

FIG. 26a demonstrates current ripple reduction with a high-side energy storage capacitor and indicates that ten times capacitor is needed to drop ripple current under 5%. The numeral 160 demonstrates standard design and 162 designates adding a 55 mF capacitor. There are some freedoms to vary the circuit parameters for parametric study. The major components that can be played with are the two energy storage capacitors: the low-voltage (LV) capacitor $C_{in}$, and high-voltage (HV) capacitor $C_{dc}$. Given load current ripple rms value $i_{load}$=1 per unit (pu), the input current ripple amplitude as a function of $C_{in}$ and $C_{dc}$ can be plotted in FIGS. 26b and 26c. These parametric studies not only allow the component selection to match ripple requirement, but also further prove the validity of the equivalent ripple circuit model. In either case, the nominal conditions with $C_{in}$=10 mF and $C_{dc}$=680 μF are highlighted to indicate that the calculated 17% current ripple agrees both simulation and experimental results.

It can be seen that both LV/HV capacitors have strong effects on ripple reduction, but the increase of $C_{dc}$ tends to have higher impact than that of $C_{in}$. The LV capacitor requires approximately $x^2$ amount of capacitance to achieve x amount of ripple reduction. For example, to reduce ripple from 17% to 10%, $C_{in}$ needs to be increased from 10 mF to 29 mF. The HV capacitor, however, requires approximately $x^{1.5}$ amount of capacitance to achieve x amount of ripple reduction. For example, to reduce ripple from 17% to 10%, $C_{dc}$ needs to be increased from 680 μF to 1.5 mF. This can be explained that the stored energy is higher with the HV capacitors.

Figure 27:
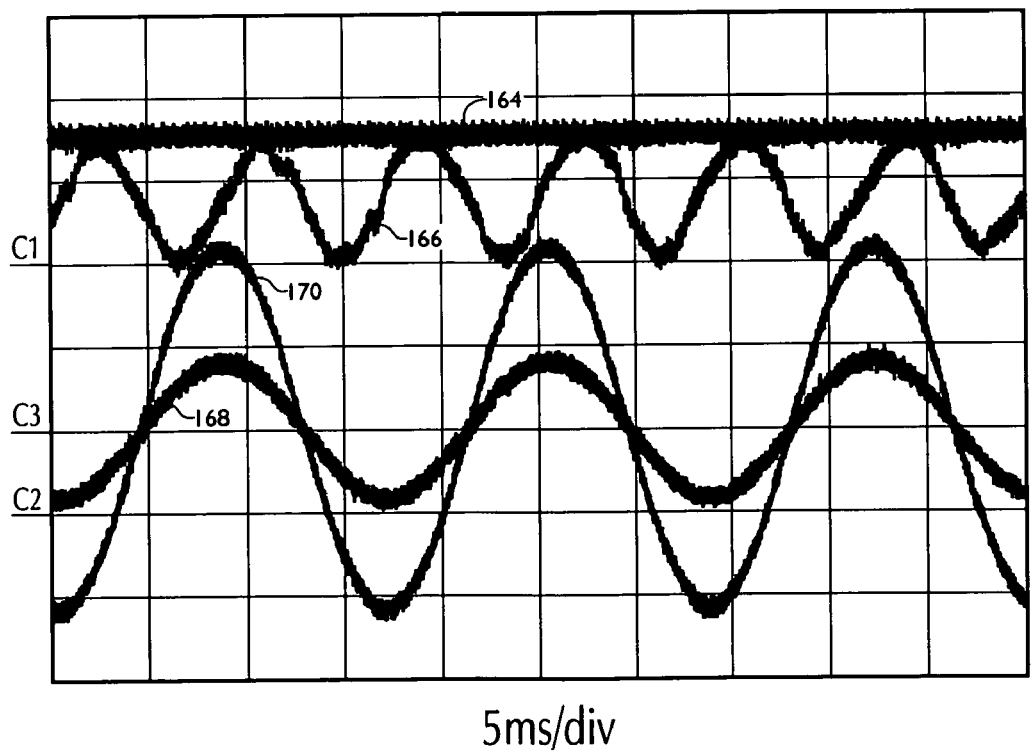
FIG. 27 is a graph depicting experimental current ripples without adding capacitors or controls which results in more than 35% ripple current at the input.

FIG. 27 is a graph of steady-state test results of a fuel cell power system showing current ripple components agreeing with its simulated condition. This graph depicts experimental current ripples without adding capacitors or controls results in more than 35% ripple current at the input. The graph lines indicate input voltage (20V/div) 164, input current (10 A/div) 166, AC load voltage (200V/div) 168, and AC current load current (5 A/div) 170. For the graphs, the designation for fuel cell voltage (10 V/div) is 172, fuel cell current (10 A/div) is 174, DC link current (25 A/div) is 176, AC load current (10 A/div) is 178, DC bus current (10 A/div) is 180, DC bus voltage (a00V/div) is 182, input voltage is 184, input current is 186, output current is 188, output voltage is 190. Results shown in FIG. 27 demonstrate the experimental verification for the above simulation condition using a full-bridge converter as the dc-dc converter and a full-bridge inverter as the dc-ac inverter. The inverter output is a resistive load with a voltage and current condition at 110V rms and 8 A rms. Notice that the simulation injected current $i_{Load}$ is the rectified result from the actual load current. The fuel cell operating condition is 30V, 35 A. All circuit parameters are the same as those used in the simulation. The results indicate that both simulation and experimental results match very well, the peak-to-peak ripple is the same as that obtained in simulation at 34%. The proposed ac ripple circuit model is thus proven to be valid.

Figure 28:
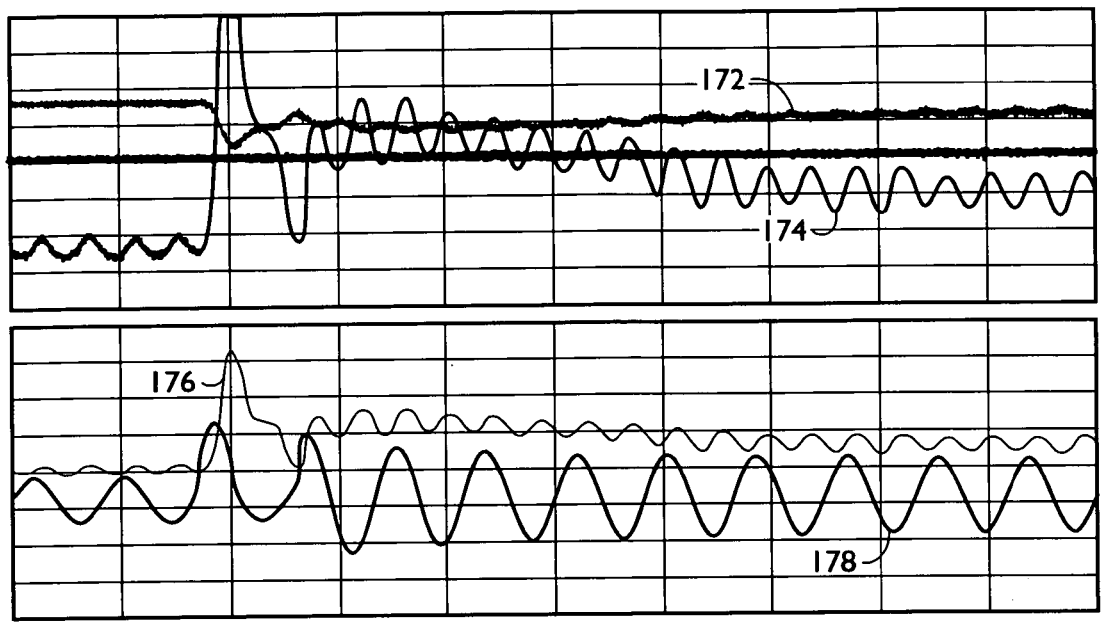
FIG. 28 is a graph demonstrating current ripple under dynamic conditions without adding capacitors resulting in fuel cell current ripple with a 35% plus overshoot.
Figure 29:
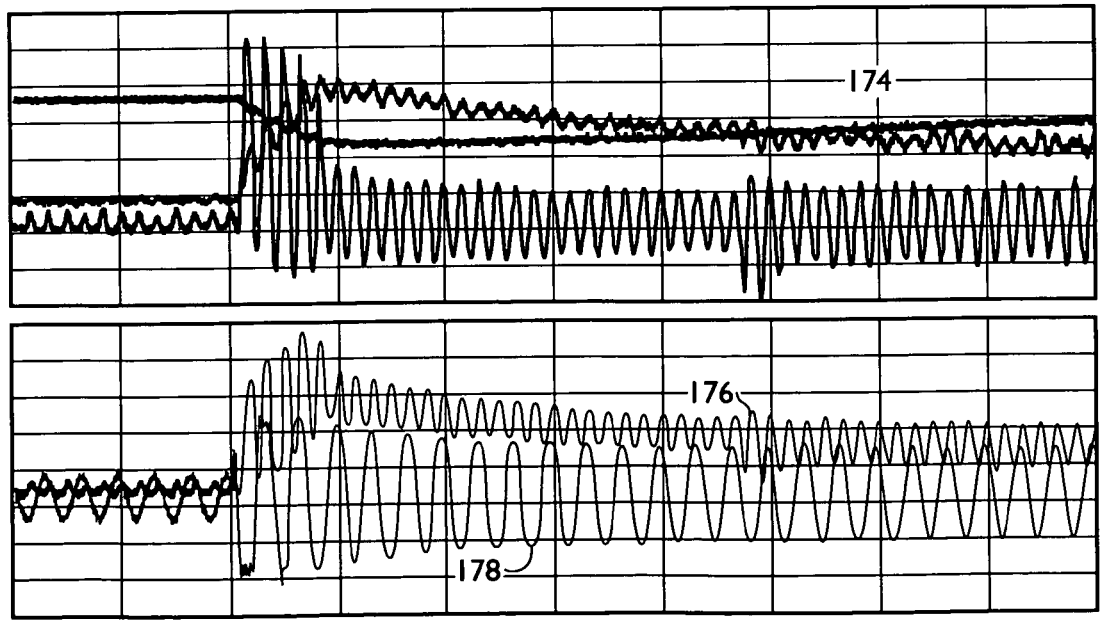
FIG. 29 is a graph demonstrating AC load transient response for a fuel cell with 53 mF added capacitors which results in fuel cell current ripple is 5% plus overshoot.

FIG. 28 demonstrates current ripple under dynamic condition without adding capacitors which results in fuel cell current ripple is 35% plus overshoot. FIG. 29 demonstrates AC load transient response for fuel cell with 53 mF added capacitors which results in fuel cell current ripple is 5% plus overshoot.

Figure 30A:
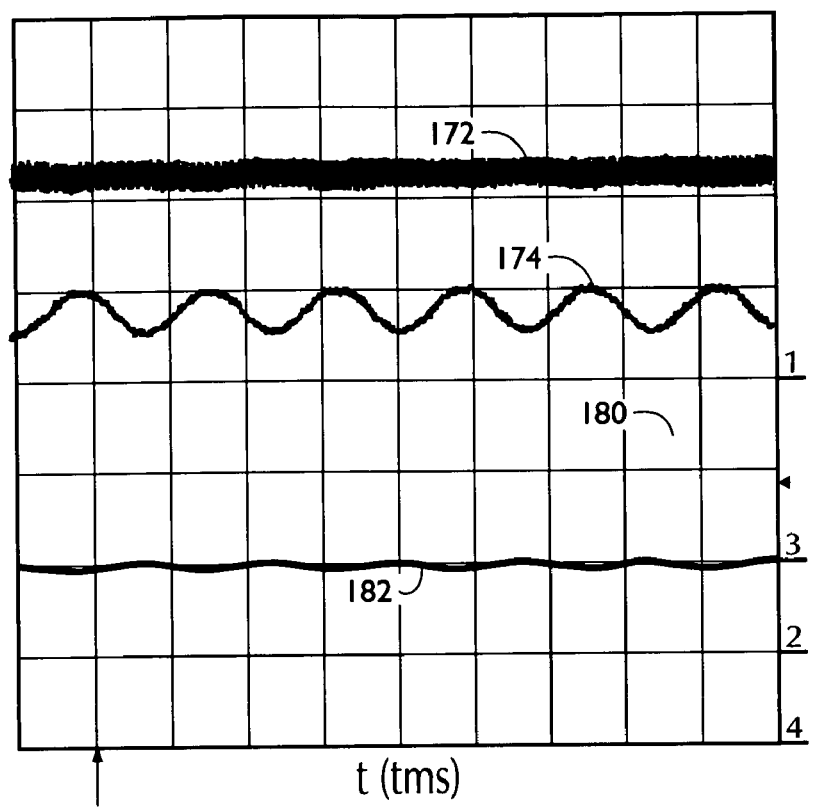
FIGS. 30a and 30b are graphs demonstrating experimental results (a) with open-loop and (b) with voltage loop control respectively.
Figure 30B:
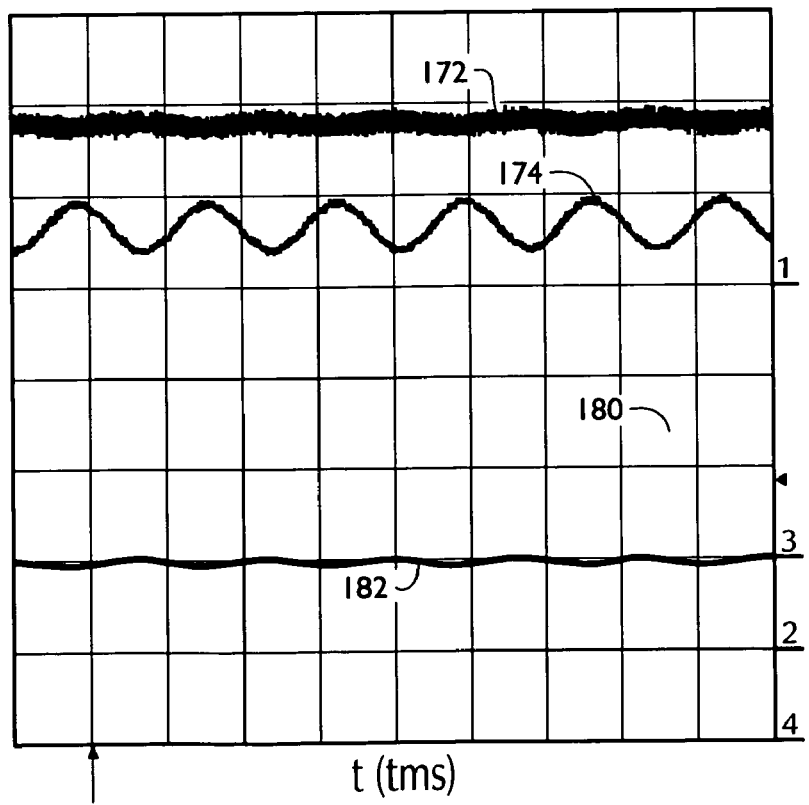

FIGS. 30a and 30b demonstrate experimental results with open-loop and with voltage loop control. FIG. 30a demonstrates open loop and FIG. 30b demonstrates voltage loop control. The effectiveness of ripple reduction with the proposed current-loop control has been verified by both simulation and experiment. A 3-phase 6-leg dc-dc converter, a full-bridge DC/AC inverter, together with Ballard Nexa 1.2 kW PEM fuel cell are used to form a fuel cell power conditioning system for the study. This converter has an HV-side capacitance (2.2 mF) and a LV-side capacitance (6.6 mF). It is designed for a higher power system.

Before performing dual loop test, the circuit was tested under open-loop and voltage-loop closed conditions. FIG. 30b shows the experimental results with DC/DC converter operating under open-loop condition. The DC bus voltage is 200V, and the output current switching from 2 to 14 A, or near 75% ripple. The input side measurement indicates a voltage of 18V and an average current of 94 A, which has a ripple current of 12.5%.

As compared with the open-loop test results shown in FIG. 30b, the closed-loop control with only voltage loop closed does not help current ripple reduction, and a 12.5% ripple is observed in FIG. 30a. The test condition for DC/DC converter load output is 200V, 8 A.

FIGS. 23 and 27 show the ripple propagation in a typical inverter-based power plant. When a single phase inverter supplies low frequency, 60-Hz sinusoidal voltage to the load, the sinusoidal load current appears on the high voltage DC side as a 120-Hz pulsating direct current. Part of the pulsating current is drawn from the high voltage side bulky DC capacitor; the other part will be drawn from upstream DC/DC converter. The DC-DC converter absorbs partial ripple components, and the remainder will reach the fuel cell. Test results using a 1.2 kHz PEM fuel cell and a commercial fuel cell inverter indicate that the peak-to-peak ripple component is as high as 35% of the fuel cell average current. In other words, the fuel cell current propagation from inverter load to fuel cell of FIG. 23 with test results of FIG. 27 showing 35% of 120-Hz ripple current component produced by the 60-Hz AC load.

Such a high ripple current content requires that fuel cell stack gross power generation capability be about 20% higher than the net output rating. Past research also suggested that such a ripple current may harm the fuel cell and consume more fuels due to a hysteresis effect. The fuel cell stack will be larger and more costly to generate such greater gross power. Prior to this work, engineering trade-off analyses optimize the fuel cell stack, hence cost, compared to adding passive energy storage/ripple filtering capacitors, and the other is to add an external active filter circuit to absorb the ripple at the high-side capacitor. Test results presented herein show that 10 times the capacitance is needed to cut the ripple content down to 5%. The prior art passive solutions need substantial extra parts that are bulky and costly and adversely impact the overall fuel cell power plant cost and fuel efficiency.

Figure 31:
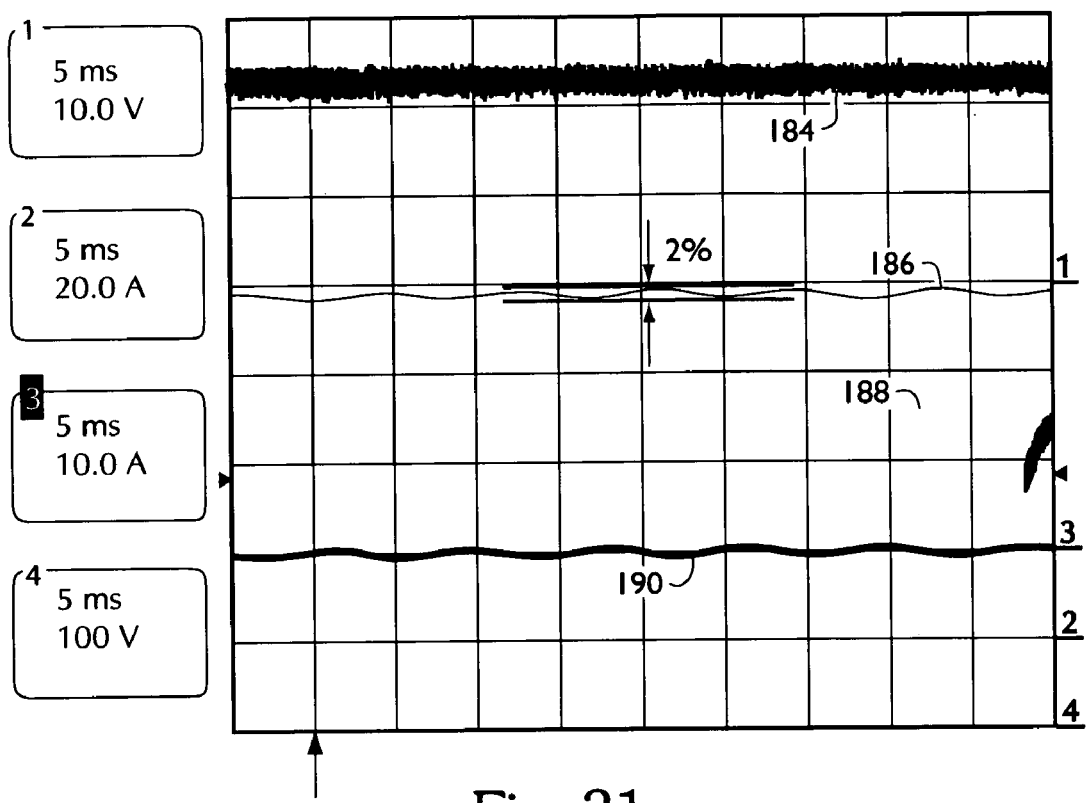
FIG. 31 is a graph depicting experimental results for dual loop case.

FIG. 11 demonstrates the solution to ripple reduction of the present invention by adding a current loop to regulate the output current. The active current control technique eliminates the current ripple via intelligent control of the DC/DC converter. FIG. 31 demonstrates the fuel cell current ripple reduction with the proposed active control technique in which fuel cell current ripple is reduced to less than 2%. This development can benefit other distributive generation power generation technologies such as solar wind and microturbines. The intelligent active ripple cancellation technique utilizing a current loop inside the voltage control loop and experimental results showing ripple current to the fuel cell stack is nearly eliminated. The present V6 DC/DC converter prototype demonstrates a high efficiency with a wide-range soft switching of 97%. Cost reduction results by cutting down passive components which results in six times the output inductor filter reduction with three-phase interleaved control, six times in input high frequency capacitor reduction, and ten times output capacitor reduction with active ripple reduction. Furthermore, the V6 DC-DC converter prototype of the present invention results in reliability enhancement because no devices are in parallel, soft-start control to limit output voltage overshoot, and current loop control to limit fuel cell inrush currents. Significance to SECA program and SOFC design involves a 20% stack size reduction by efficient power conversion and ripple reduction, and inrush current reduction for reliability enhancement.

Figure 32A:
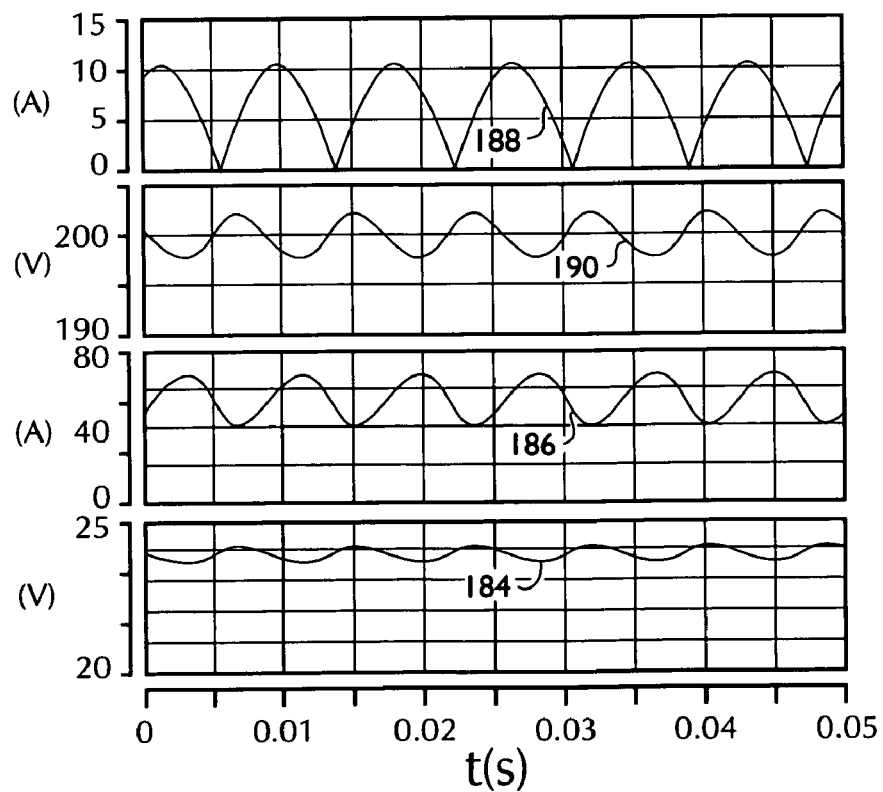
FIGS. 32a-32c are graphs depicting computer simulating ripple reduction for (a) open-loop case, (b) dual-loop case and (c) single voltage loop case.

With the same load condition and current loop control added, the simulation and experimental results, shown in FIG. 32a, clearly indicate a significant reduction on current ripple. The upper trace in FIG. 31 is the input voltage, which stays flat without any ripple component that is seen in FIG. 32a where the input fuel cell voltage has a noticeable ripple due to the current ripple. The second trace in FIG. 31 is the input current, which has a peak-to-peak ripple less than 2%. The third trace in FIG. 31 is the output current of the DC/DC converter, which has a ripple switching from 2 A to a peak of 14 A. The bottom trace in FIG. 31 is the output DC bus voltage, which has a small ripple on top of 200V.

With further reference to FIG. 11, an averaged model for a three-phase transformer isolated phase shift DC/DC converter according to the present invention was designed, simulated and verified with a 3 kW converter prototype and a commercial 1.2 kW fuel cell. The experimental results match the simulation results on both fuel cell source dynamic and step load transient responses. The 3 kW prototype is tested with a closed-loop control to verify the model and control design. These experimental results agree with the simulation results on both fuel cell source dynamic and step load transient responses, verifying the converter model and validating the control design.

Figure 32B:
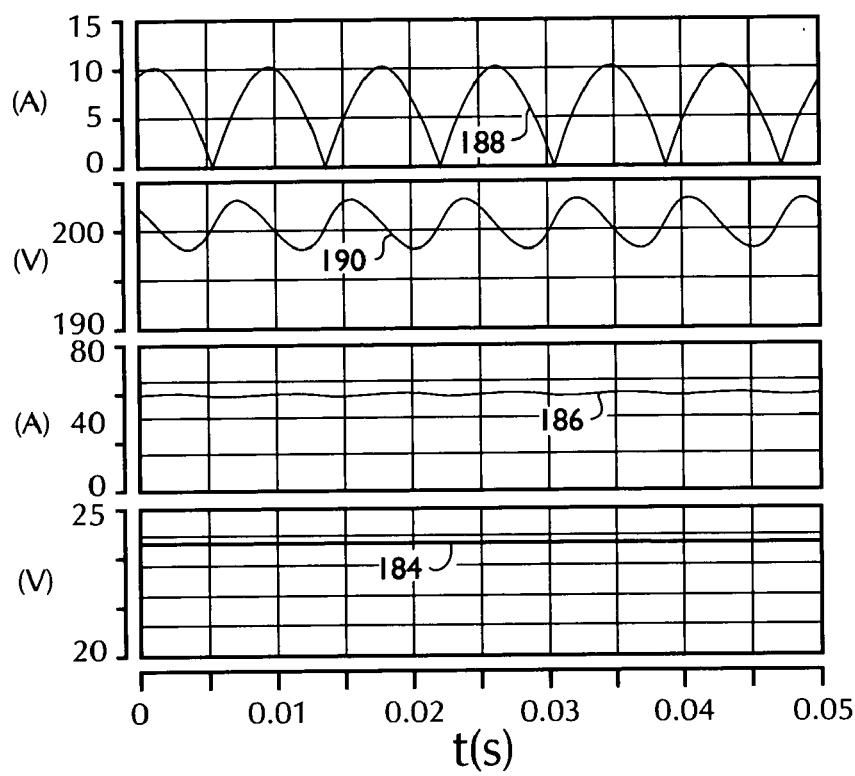
Figure 32C:
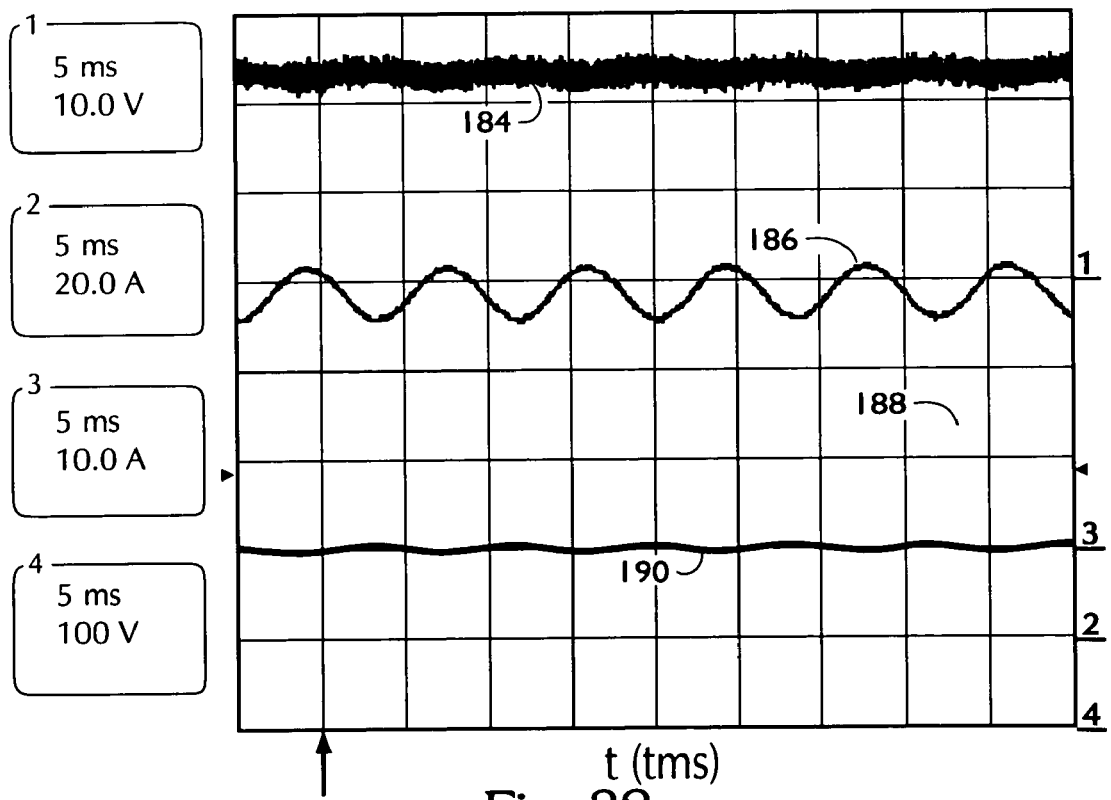

Both simulation and experimental results show improvement on ripple mitigation. The improvement for ripple reduction resulting from the present invention has been proven with both computer simulation and hardware experiments, as shown in FIGS. 32a-32c, 30b, and 31, respectively. FIGS. 32b and 31 indicate that after applying the proposed active control, only small portion of the ripple component remains on the DC/DC converter input side. The improvement for ripple reduction is obvious from both the simulated waveform in FIGS. 32a and 32b and experimental waveforms in FIG. 30b, 32c, and 31. After applying the proposed active control, only small portion of ripple components remain on the input side of the DC/DC converter.

With the proposed smart controller, the results clearly indicate that the present invention effectively eliminates the ripple current feeding back to the source, which is very objectionable in fuel cell type sources. Compared with the passive method, this active control avoids additional bulky and expensive energy storage components, thus reducing the size and cost of the overall system.

Figure 33:
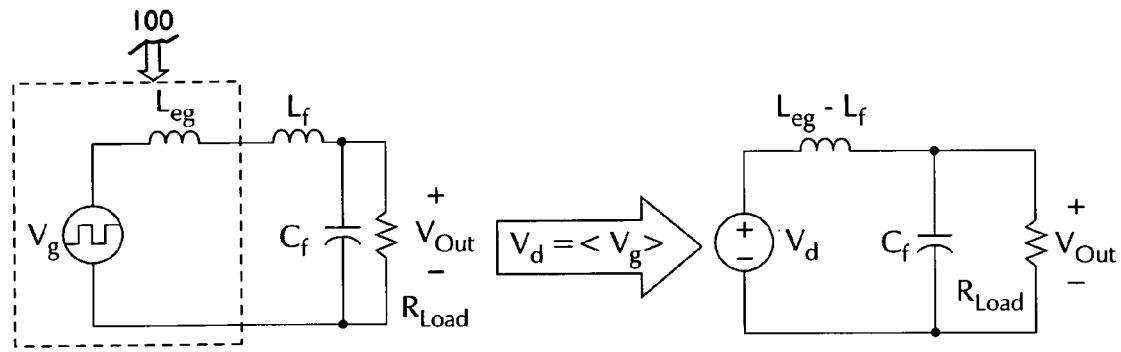
FIG. 33 is a circuit diagram depicting an equivalent pulse source $V_g$ substituted for the proposed converter topology of FIG. 3; specifically, the deducted average model for the switch power stage, together with the transformers and rectifier in analysis.

In the proposed converter topology, the switch power stage, together with the transformers and rectifier, can be substituted with an equivalent pulse source $V_g$, as illustrated in FIG. 33. This pulsating source can be averaged to a constant DC source $V_d$. The average model can then be derived with an equivalent Buck converter topology having an equivalent switching frequency of 6 $f_{sw}$.

Based on the above analysis, the equivalent voltage source in the averaged model would be:

$$V_d = f(\alpha, n, V_{dc}) = \begin{cases} \dfrac{\alpha}{60°} \cdot n \cdot V_{dc} & (0° < \alpha < 60°) \\ \dfrac{\alpha}{60°} \cdot n \cdot V_{dc} & (60° < \alpha < 120°) \\ 2 \cdot n \cdot V_{dc} & (120° < \alpha < 180°) \end{cases}$$

And the equivalent circuit inductance would be:

$$L = L_{eq} + L_f =$$

$$\begin{cases} 1.5\ n^2 \cdot L_{lk} + L_f & (0° < \alpha < 60°) \\ 2\ n^2 \cdot L_{lk} + L_f & (60° < \alpha < 120°)\ ; \text{where } L_{lk} = L_a = L_b = L_c. \\ 1.5\ n^2 \cdot L_{lk} + L_f & (120° < \alpha < 180°) \end{cases}$$

Using the phase-shift control angle, $\alpha$, as the control variable, the phase-shift angle to output voltage, $V_{out}$, transfer function becomes:

$$G_{\alpha\alpha}(s) = \frac{V_{out}(s)}{V_d(s)} \cdot \frac{V_d(s)}{\alpha(s)} = G_{od}(s) \cdot \frac{V_d(s)}{\alpha(s)}.$$

For 0°<α<60°:

$$G_{o\alpha}(s) = \frac{1}{1 + s \cdot \frac{1.5\, n^2 L_{lk} + L_f}{R} + s^2 \cdot (1.5\, n^2 \cdot L_{lk} + L_f)C_f} \cdot \frac{1}{60°} \cdot nV_{dc}$$

For 60°<α<120°:

$$G_{o\alpha}(s) = \frac{1}{1 + s \cdot \frac{2\, n^2 L_{lk} + L_f}{R} + s^2 \cdot (2\, n^2 L_{lk} + L_f)C_f} \cdot \frac{1}{60°} \cdot nV_{dc}$$

For 120°<α≦180°: Since $V_{out}$ is independent of α, $G_{o\alpha}$(s)=1.

Figure 34:
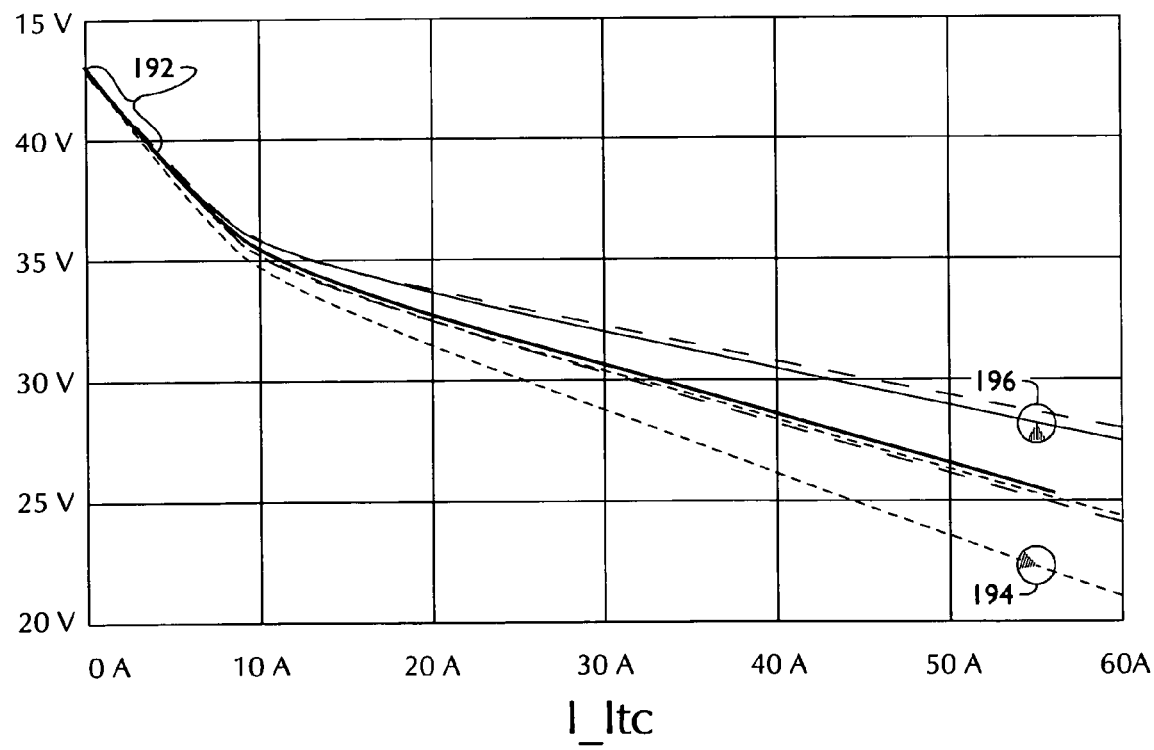
FIG. 34 is a graph indicating the fuel cell polarization curve indicating the polarization curves with different compressor speeds.

Testing was performed on a DC/DC converter with a PEM fuel cell. Fuel cell polarization curve is depicted if FIG. 34 which indicates the polarization curves with different compressor speeds. The first curve 192 indicates when fuel cell runs at parasitic load conditions results when compressor is running at low speed. The second curve 194, when fuel cell is fully loaded, the compressor is not immediately responding to load step resulting in voltage dips. The third curve 196 when the compressor speeds up results fuel cell voltage picks up.

Figure 35A:
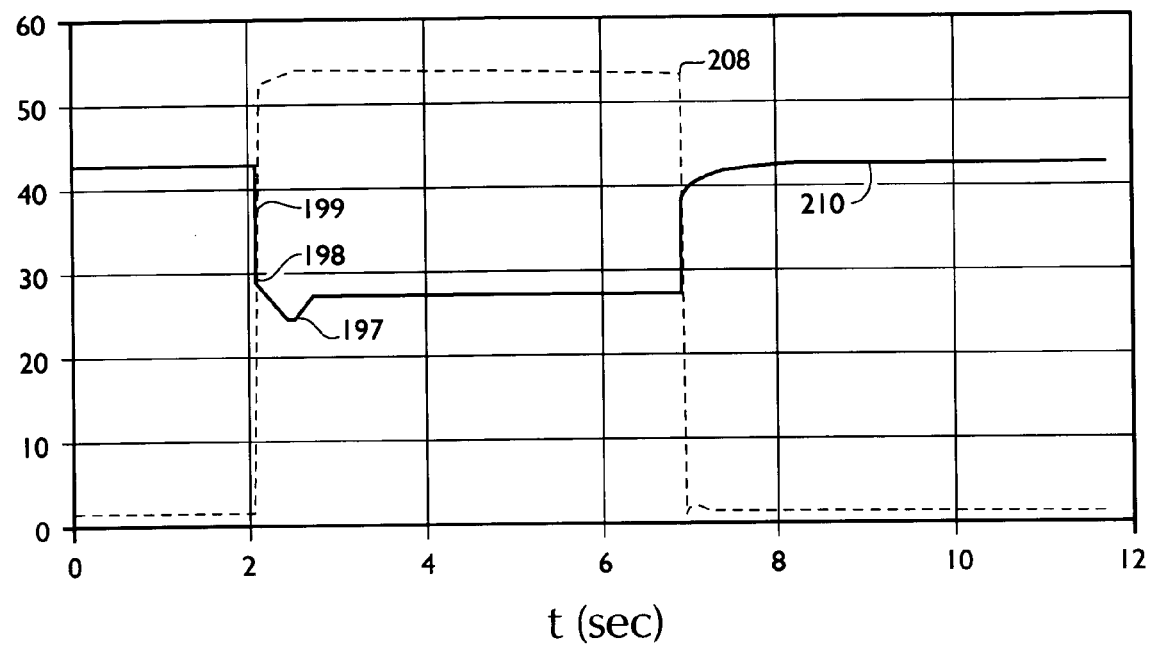
FIGS. 35a and 35b are diagrams (a) showing load-step response of Nexa 1.2 kW fuel cell and (b) showing voltage undershoot due to compressor delay and power overshoot.
Figure 35B:
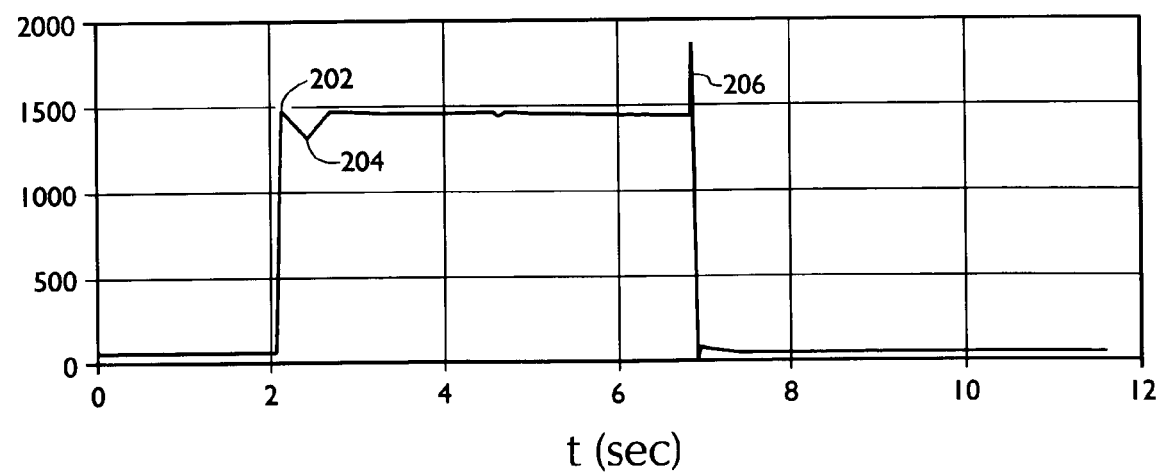
Figure 36:
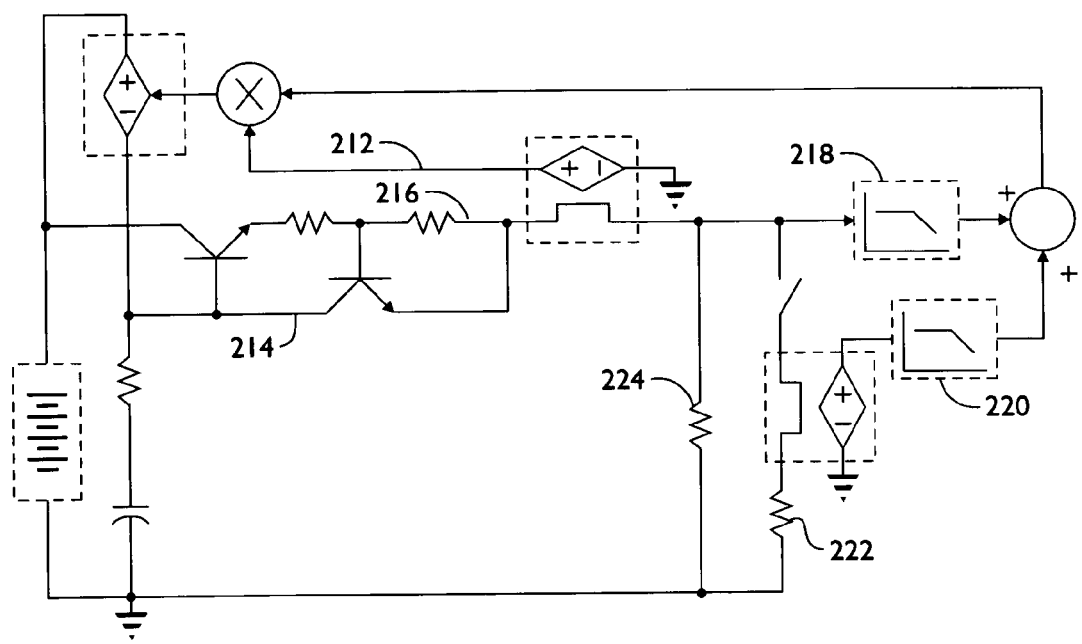
FIG. 36 is a circuit diagram depicting dynamic fuel cell model in an electrical circuit.

Dynamic fuel cell voltage and cured output. Fuel cell dynamics are depicted in FIGS. 35a and 35b showing voltage undershoot 198 (2.5V) due to compressor delay and power overshoot. The output current 208 and output voltage 210 respond to the stack response 199 and a dip is caused by air compressor delay 197, as shown in FIG. 35a. the first time constant 202 and second time constant 204 are shown in FIG. 35b exhibiting a 150 W dip. There is also a 300 W power overshoot 206 at indicated. The step load was 1.47 kW and the parasitic power was 70 W for the FIG. 35b. A dynamic fuel cell model in electrical circuit is shown in FIG. 36 wherein multiplying ratio 212, low current branch 216, high current branch 214, parasitic load 224, transient load 222, first time constant 220 and second time constant 218 are as indicated. When there is a high load current there is high voltage drop, when there is low output voltage there is a low voltage drop.

For topology testing and control verification purpose, a 3 kW prototype unit was built. It consists of three major parts: a six-leg converter board, a set of three single-phase transformers, and an output rectifier/filter board. In this prototype unit, three full-bridge single-phase converters are synchronized by an external clock and are controlled by the same reference signal. Thus, with well-tuned ramp signals, the phase-shift modulation angles between two legs for each phase are identical.

Figure 37A:
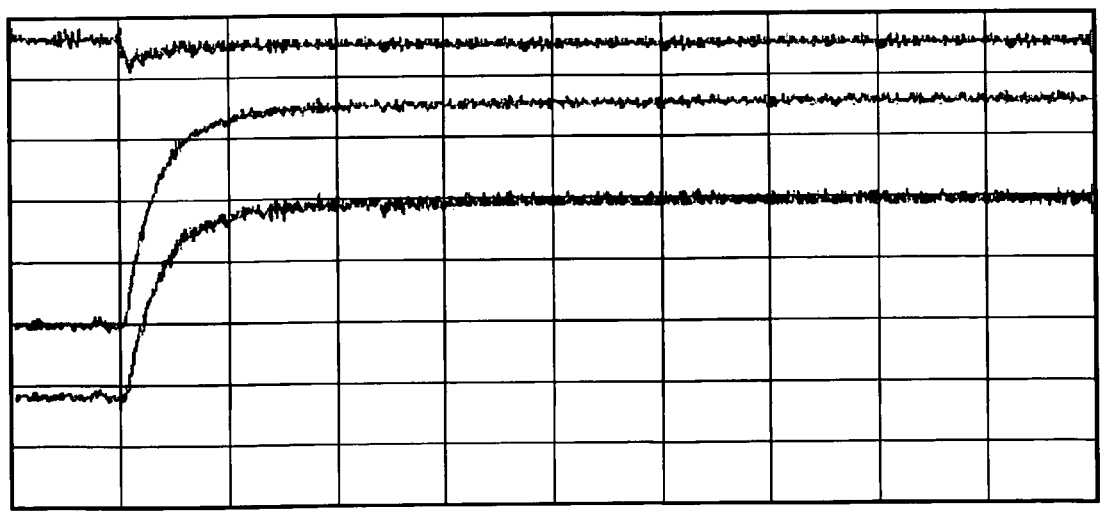
FIG. 37a is a graph showing test results of the Nexa fuel cell without DC/DC converter and any add-on capacitor for a load step from 185 W to 800 W.
Figure 39:
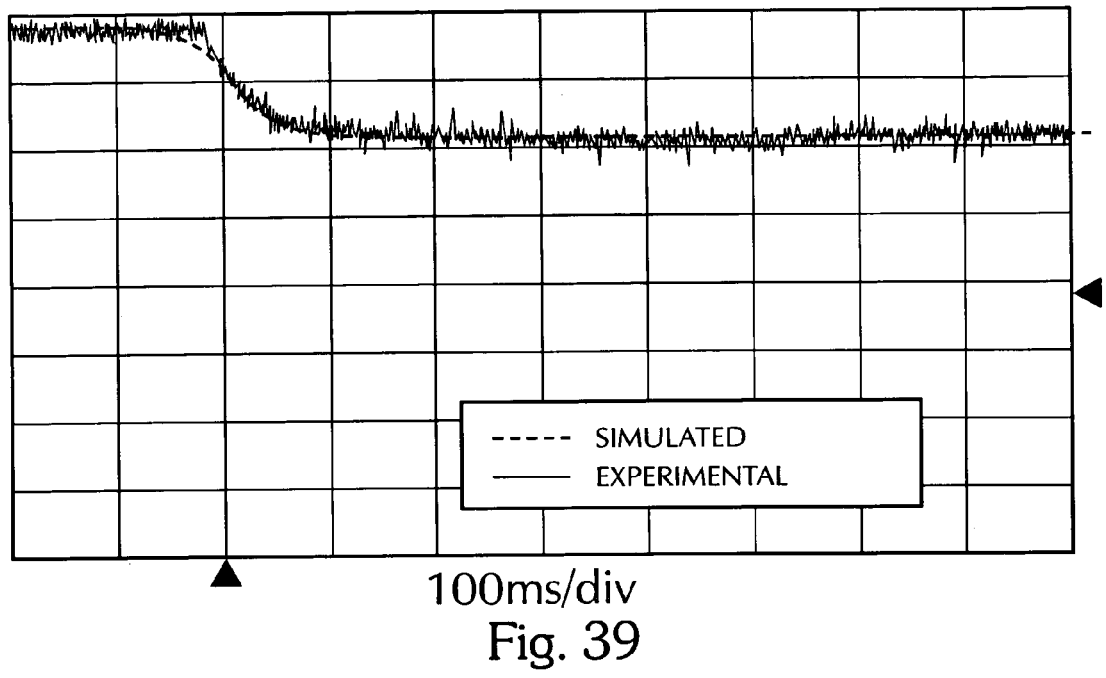
FIG. 39 is a graph which indicates that the fuel cell output responding to a step load change from 400 W to 1100 W with a 50 ms time constant, or four orders of magnitude higher than the fuel cell stack response.

Fuel cell and converter interaction. As mentioned before, the fuel cell stack reacts to load changes in microsecond range. However, the addition of input bulk capacitor slows down the fuel cell output dynamic dramatically. FIG. 37a shows test results of the Nexa fuel cell without DC/DC converter and any add-on capacitor for a load step from 185 W to 800 W. Results indicating the fuel cell output voltage $V_{fc}$ (10V/div) the fuel cell output current $I_{fc}$(5 A/div) and fuel cell output power $P_{fc}$ (200 W/div) are shown. A time constant of less than 5 μs can be observed on the fuel cell output power. Since the hydration level is maintained well with a step load less than half the fuel cell power rating, the fuel cell voltage returns to the steady state in less than 5 μs. This fast fuel cell stack dynamic, however, is largely slowed down by the bulk capacitors of the DC/DC converter, especially on the input side. FIG. 39 indicates that the fuel cell output responding to a step load change from 400 W to 1100 W with a 50 ms time constant, or four orders of magnitude higher than the fuel cell stack response. The voltage dip that was found, without running the DC/DC converter, no longer exists because of the bulk input capacitors. In order to verify such a fuel cell converter interaction, we created a static fuel cell model that matches the fuel cell polarization curve to run with the dc/dc converter that has 30 mF input capacitor. The simulation results match the experimental results as well, as indicated in FIG. 39. FIG. 37a demonstrates a fuel cell system response on step load transient without output add-on capacitor. FIG. 39 demonstrates a fuel cell system response on step load transient with 30 mF output add-on capacitor.

Figure 40A:
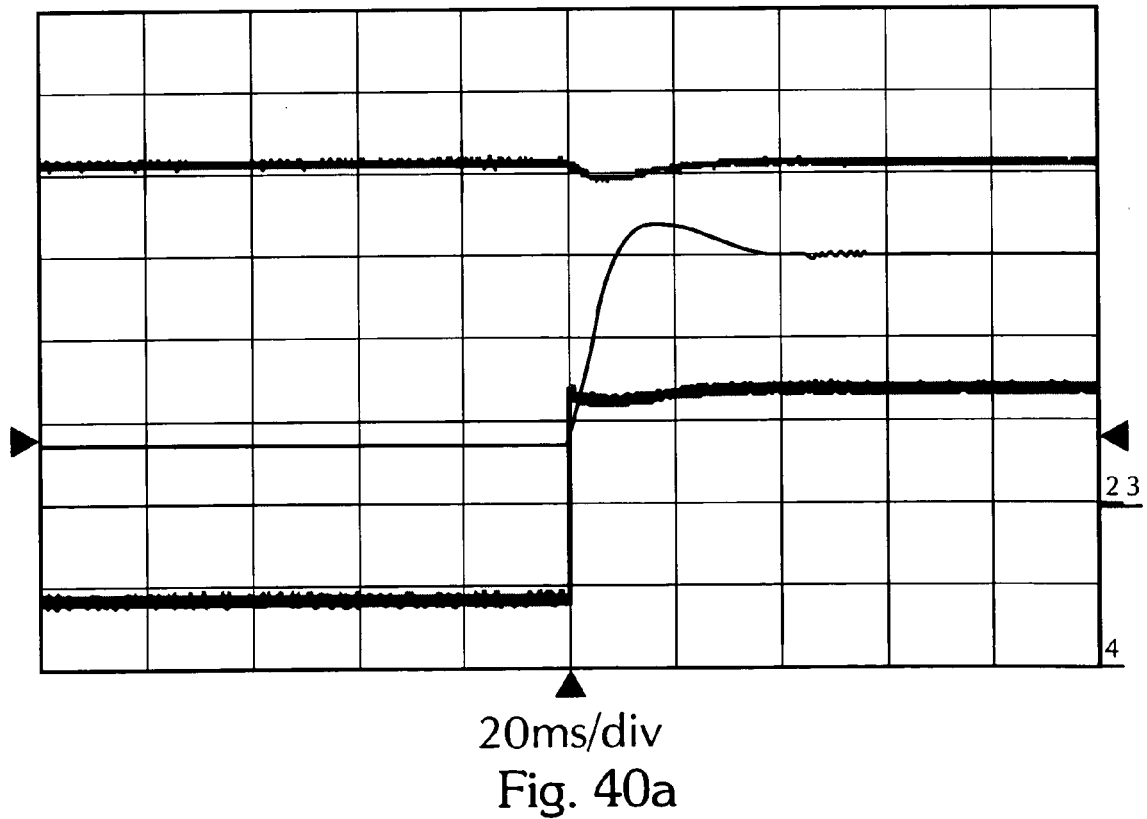
FIGS. 40a and 40b are graphs depicting the v6 converter output under load step and the V6 converter output under load dump.
Figure 40B:
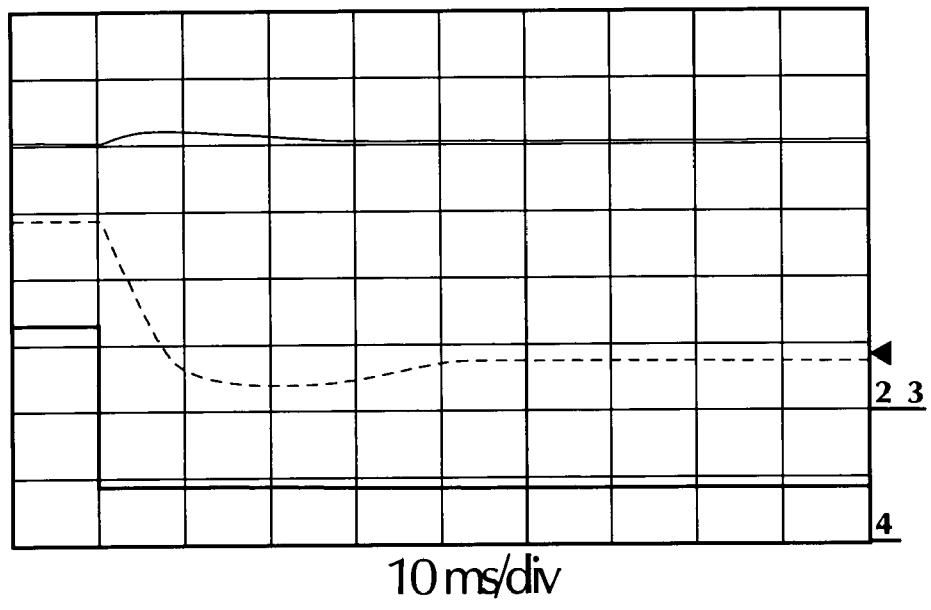

Converter response to output load transient. FIGS. 40a and 40b shows the load transient testing waveforms between 400 V and 1.2 kW loads. The results show that the output voltage is well regulated and the system is stable with the controller of the present invention. The experimental results match the previously mentioned simulation results well, thus validating the system modeling and control design. FIGS. 40a and 40b demonstrate experimental step load transient waveforms. FIG. 40a represents load step-up and FIG. 40b represents load dump.

Figure 37B:
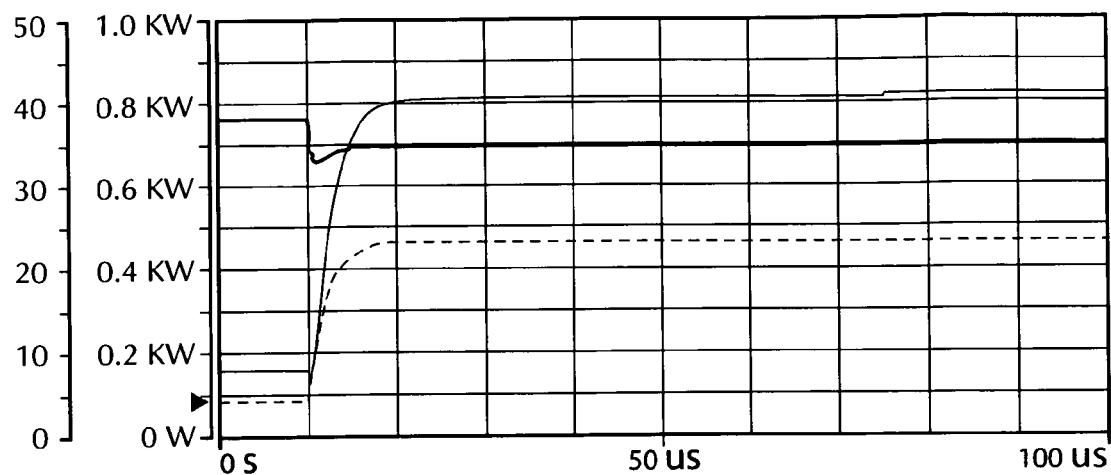
Figure 38:
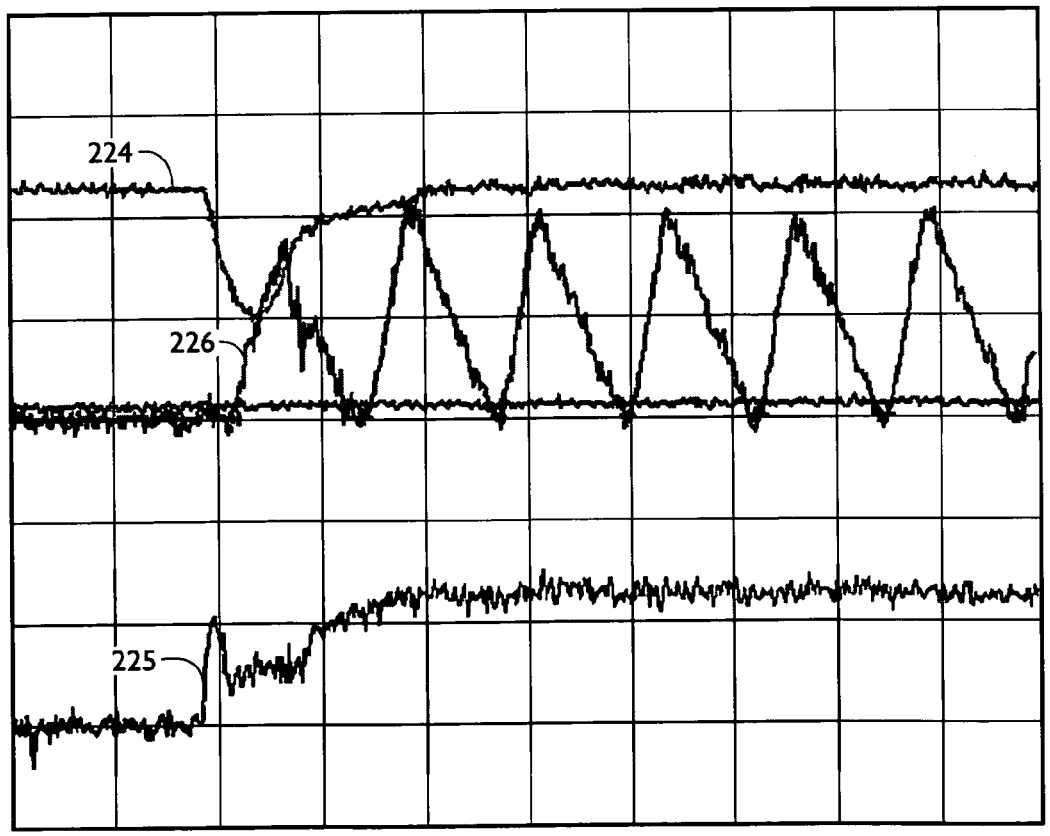
FIG. 38 is a graph demonstrating test load transient with a slow power supply.

Verification of fuel cell model with resistive load transient was carried out. Model verification comparison with slow time constant power supply test is shown in FIGS. 37a and 37b. FIG. 37a demonstrates experimental results, and FIG. 37b demonstrates the simulation results. The simulation results and the experimental results are consistent. Test load transient with a slow power supply is depicted in FIG. 38. The apparatus maintains constant voltage after transient voltage dip the voltage returns to original level. The voltage is indicated at 224, the inductor current at 226 and the load current at 228. A response corresponding to the voltage dip was found.

FIG. 39 depicts fuel cell voltage dynamic with the V6 converter load transient. The simulated and experimental results overlap. Significantly slower time constants of about 50 ms due to 30 mF V6 converter input capacitor and a long cable. FIG. 40a depicts the v6 converter output under load step. With voltage control loop bandwidth designed at 20 Hz, settling time is about 40 ms under load step. FIG. 40b depicts the V6 converter output under load dump. With voltage control loop bandwidth design at 20 Hz, settling time is about 40 ms under load dump.

The findings of fuel cell modeling and converter test results were determined. The fuel cell stack shows very fast dynamic nearly instantly without time constant. Perception of slow fuel cell time constant is related to ancillary system not fuel cell stack. Output voltage dynamic is dominated by the converter interface capacitor and cable inductor. Output current dynamic is dominated by the load.

Figure 41A:
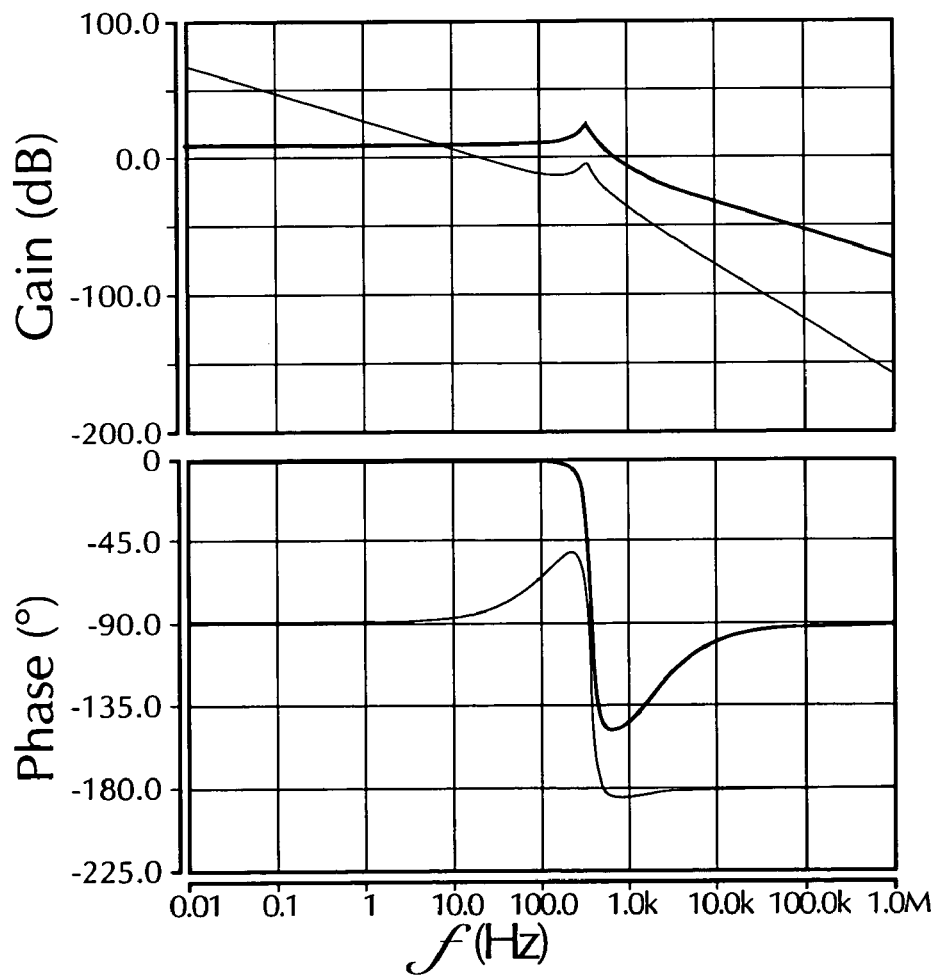
FIG. 41a is a domain plot that illustrates the gain/phase for open-loop and closed-loop cases.
Figure 41B:
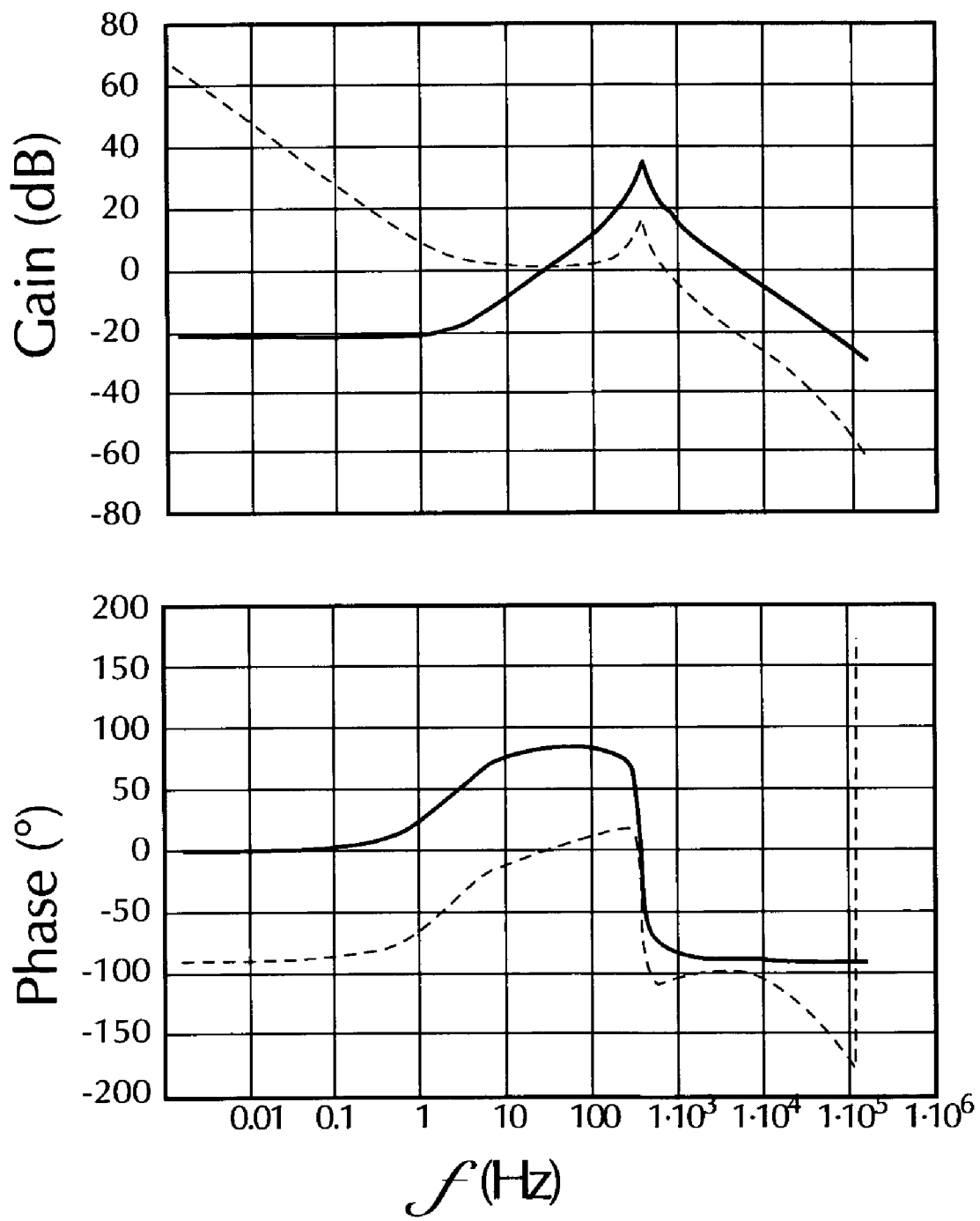
FIG. 41b is a current-loop frequency domain plot that illustrates the gain/phase for open-loop and closed-loop cases.
Figure 41C:
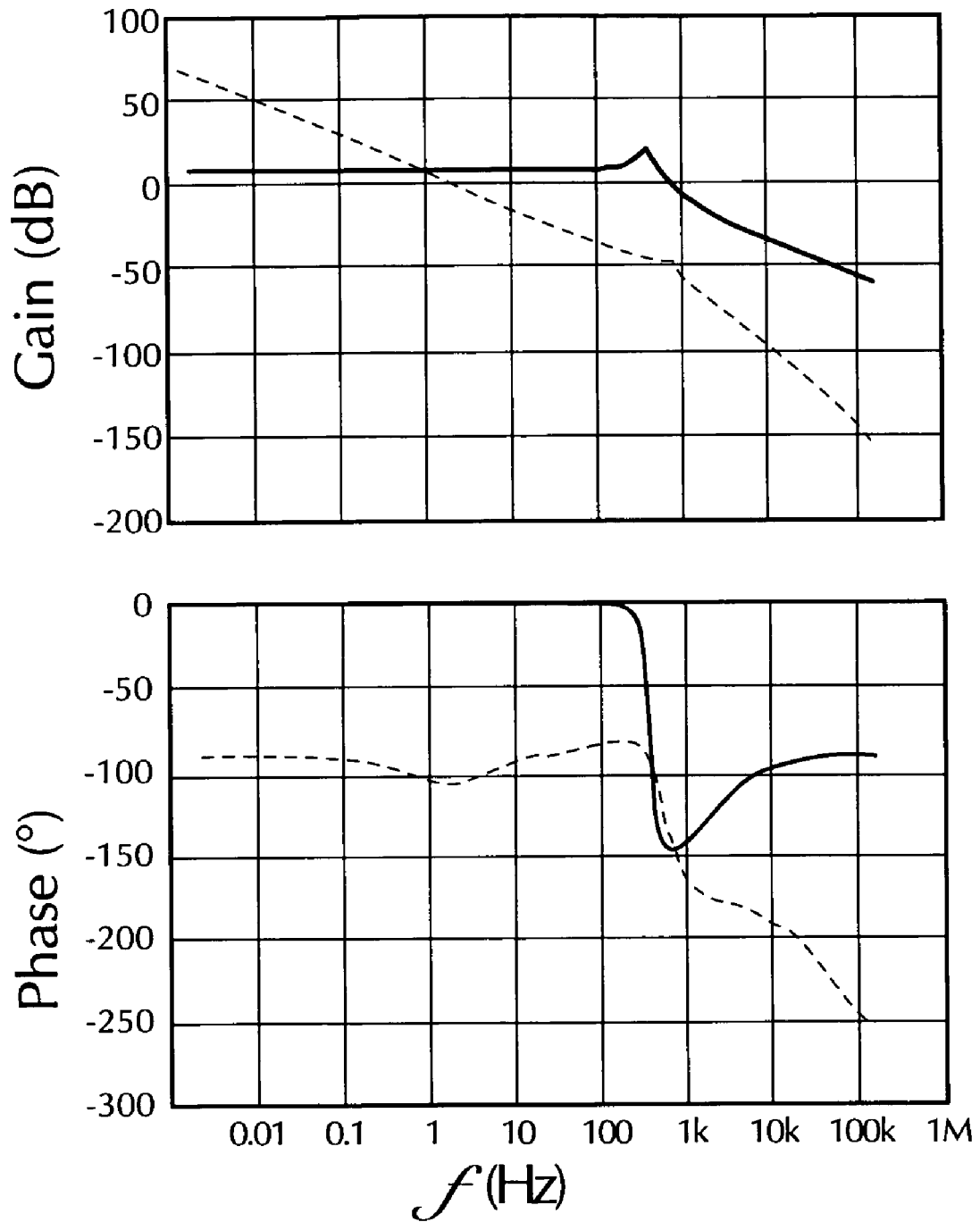
FIG. 41c is a voltage-loop frequency domain plot that illustrates the gain/phase for open-loop transfer function and closed-loop gain.

With reference to FIG. 12, the compensator was designed for the nominal output of 3 kW. Using the following circuit parameters: $V_{in}$=25V, $V_{out}$=200V, $L_{lk}$=23nH, $L_f$=84 μH, and $C_f$=2.2 mF, the compensator parameters are: $\omega_2$=185 Hz, $\omega_p$=1.607 kHz, and $G_c(0)$=78.635. This design results in a phase margin of approximately 95° and gain margin greater than 20 dB, with the cross-over frequency around 20 Hz. FIG. 41a, 41b and 41c illustrate gain/phase plots for open-loop and close-loop cases.

Due to the specific purpose of ripple reduction, one more constrain should be taken into account in determining loop gain crossover frequency besides the stability margins. The designed loop gain curve should be able to provide sufficient attenuation for the ripple frequency that needs to be mitigated, i.e., 120 Hz in this application. Although at least half decade of separation between 120 Hz and crossover is recommended, this simple rule may not give satisfactory result on the ripple attenuation. A better design rule is to monitor the loop gain at 120 Hz to make sure that enough attenuation can be obtained. In general, a 20 dB or higher attenuation is recommended. The calculated current loop open-loop transfer function and closed-loop gain are plotted in FIG. 41b. The top graph shows the current loop magnitude, and bottom graph shows the phase plot.

Following the above design guidelines, the current loop compensator is designed to have a zero at 370 Hz and a pole at 20 kHz, with dc gain of 552. This compensator gives a phase margin more than 70° and a gain margin larger than 50 dB, with a crossover frequency at 667 Hz for the current loop. For the voltage loop, a compensator with a zero at 2.15 Hz and poles at origin and 48 kHz can be adopted. With these zeros and poles, loop gain crossover frequency must be lower than 12 Hz in order to get more than 20 dB attenuation at 120 Hz. Here a 2-Hz crossover frequency is selected in the design since it provides 37 dB attenuation at 120 Hz, which should be sufficient to suppress ripple from load side. This design also provides more than 70° phase margin and more than 50 dB gain margin for the current loop. Based on the selected crossover frequency, the voltage loop dc gain can be calculated in FIG. 41c, where the top part shows the magnitude plot, and the bottom part shows the phase plot.

Figure 42A:
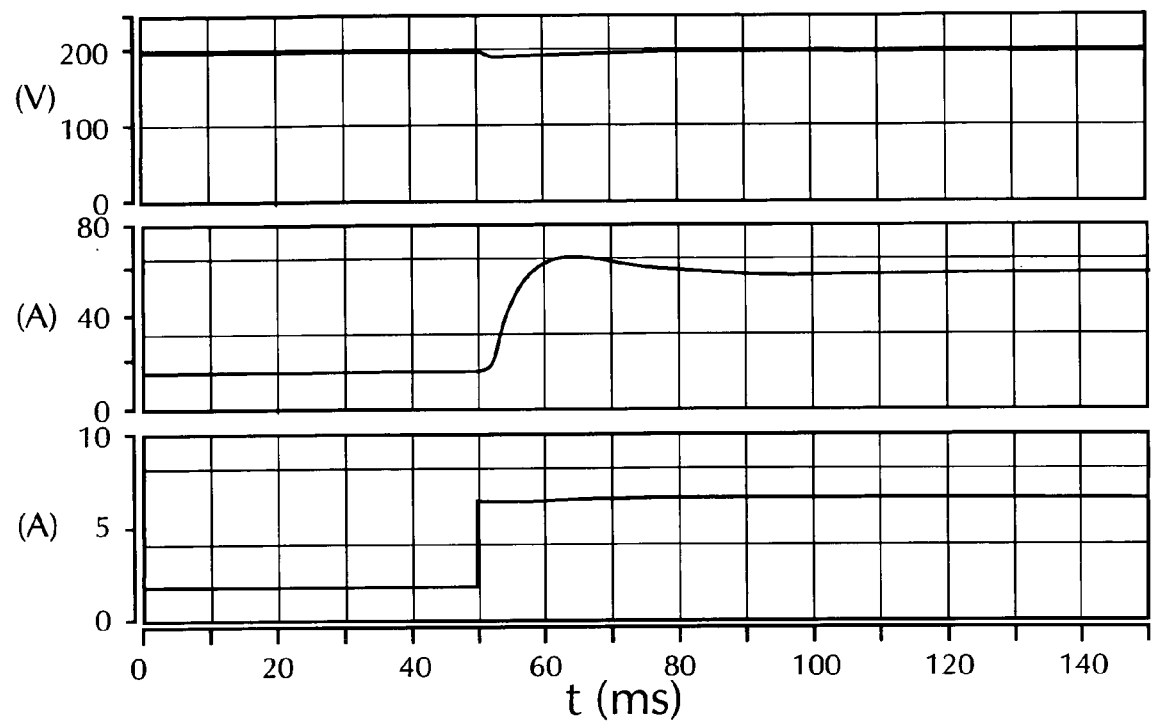
FIGS. 42a and 42b are graphs showing simulation results on step load transient: load step-up and load step-down respectively.
Figure 42B:
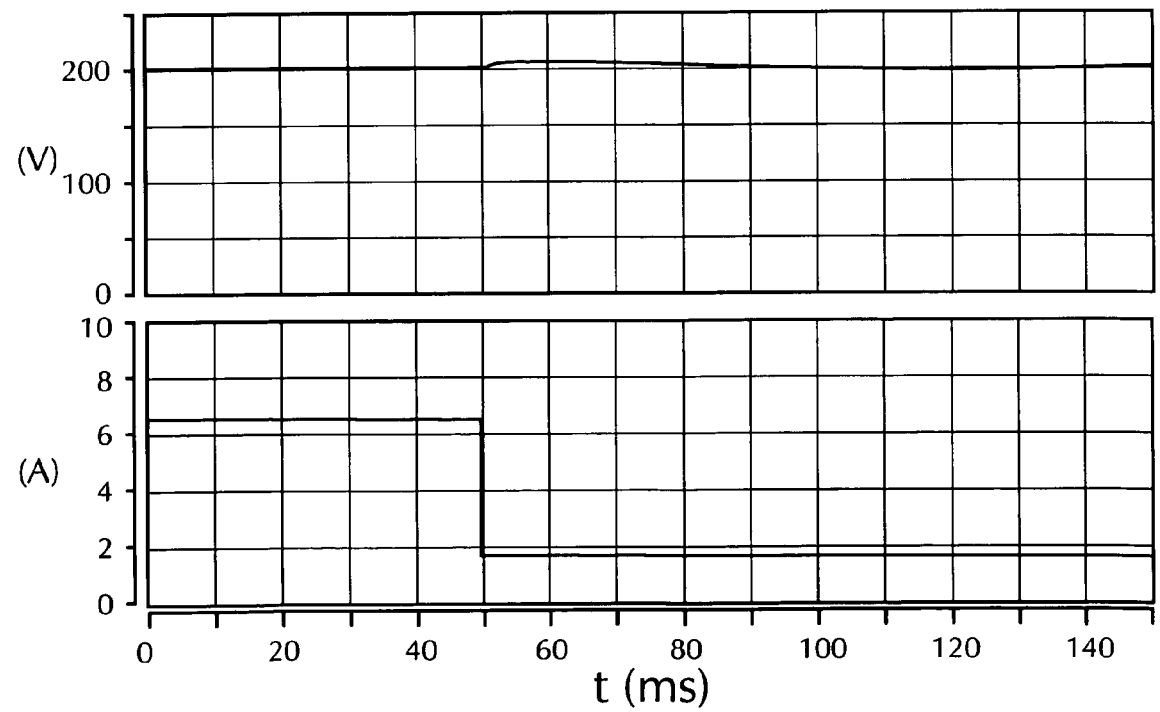

To verify the controller design and system stability, a step load between 400 W load and 1.2 kW is used for system transient analysis. The results are shown in FIGS. 42a and 42b, which demonstrate stable operation of the system using the designed compensator. FIGS. 42a and 42b shows simulation results on step load transient: FIG. 42a load step-up, and FIG. 42b load step-down. A three full-bridge single-phase converter can be controlled in an interleaved manner, which means the phase of their output waveforms will be 120° apart from each other. With this method, the rectifier output ripple frequency will be increased to six times the switching frequency, thus reducing the size of output filter significantly.

Before designing the compensator for the DC/DC converter, the overall system dynamics must be accounted for. A proton exchange membrane (PEM) fuel cell stack can quickly support a load step change if the stack has sufficient fuel flow, proper temperature and hydration level. However, the response of the auxiliary mechanical system is significantly slower than the fuel cell stack. If there is no dramatic change in step load, the fuel cell controller will keep the original air pressure. During large load transients, however, the air compressor has to kick in to maintain proper hydration level. In this case, the power throughput dynamic would have to rely on the mechanical system dynamic. For the fuel cell that has been used in converter testing, the compressor has a 0.5 second delay time to respond to the load transient, whereas the stack voltage level responds to the load change on the order on microseconds. In order to accommodate the slow response on power throughput, the converter needs to be designed with sufficient energy storage for power management and with proper control bandwidth for stable operation.

Figure 43:
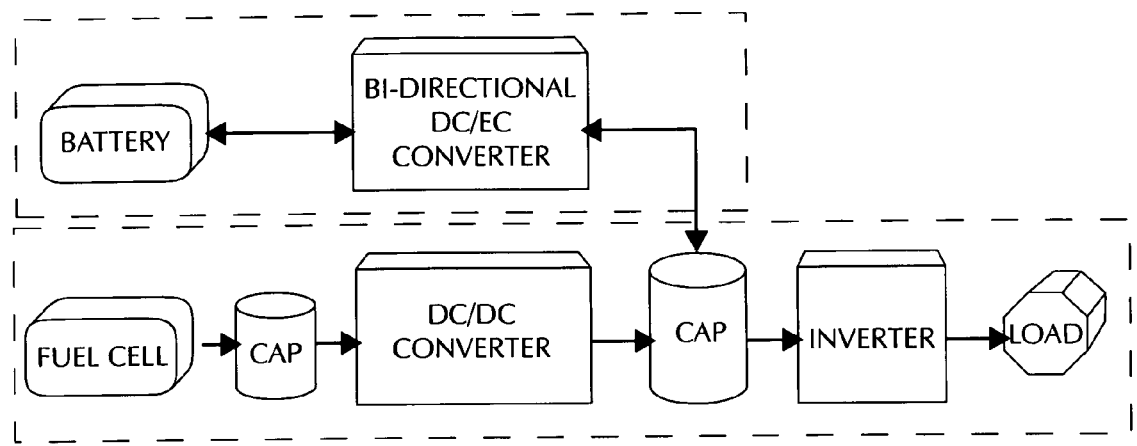
FIG. 43 is a block diagram depicting a fuel cell system power management structure including auxiliary power and without auxiliary power.

There are two types of energy management using auxiliary energy resources. For a standalone system powered only by fuel cells, a secondary source with fast dynamics, such as a battery or an ultra capacitor, is needed to handle fast load transients. The overall power management system structure with auxiliary power is shown in FIG. 43a. FIG. 43a is a block diagram depicting a fuel cell system power management structure (including auxiliary power).

For a grid intertie system that allows the fuel cell to be started with utility power or non-critical loads that do not need substantial back up power, the bidirectional dc/dc converter branch can be replaced by large dc bulk capacitors to reduce cost and to avoid battery maintenance problems. Intertie is the interconnection of two or more separate power-generating systems. In such applications, the dc bulk capacitors are used to handle fast system dynamics created by inverter load steps. The system power management structure without auxiliary power is shown in FIG. 43b. FIG. 43b is a low-cost fuel cell system power management structure (without auxiliary power).

Without an auxiliary power branch, the fuel cell is the only source of power. Hence, the static power delivered to the load is limited by fuel cell capability. For example, the commercially available Ballard Nexa 1.2 kW power module has a maximum continuous net output of 1.4 kW and provides 43 $V_{dc}$ output at system idle (no load) conditions and about 27 $V_{dc}$ at rated current of 53 A that accounts for the losses in the power converters. The maximum allowable load current is 70 A for no more than 50 milliseconds, after which time the fuel cell will shut down.

The DC bulk capacitors must be sized to manage load transient power during the compressor delay period. FIG. 35a shows the extreme case of the voltage and current responses from no load to full load and vice versa. FIG. 35b shows the corresponding power during load transient. From the plots, the transient energy required by the load can be determined by the difference between the steady state and transient voltage and current conditions. During the transient, the voltage waveform has approximately a 2.5-V dip below its steady-state level due to slow response of the air compressor. During this voltage dip, the fuel cell output power is 150-W below what the load is asking for, and the fuel cell hydration level needs to be adjusted by the compressor. Since the percentage of voltage and power dip is low, and the compressor delay time period is not long, it is possible to make up the energy deficit by the bulk capacitors. FIGS. 35a and 35b are diagrams showing load-step response of Nexa 1.2 kW fuel cell: FIG. 35a shows voltage and current plots, and FIG. 35b shows power plot.

The following equation shows the amount of energy deficit that needs to compensate for the compressor delay.

$$\Delta E = E_{req} - E_{fc} = V \cdot I \cdot \Delta t - \int (v \cdot i) dt \approx 41 (J),$$

where $E_{req}$ is the required energy calculated from the steady-state load voltage and current after the transient interval $\Delta t$. $E_{fc}$ is the energy provided by the fuel cell during the transient and is the integral of the fuel cell transient voltage and current during the power-dip period.

It should be noticed that the DC/DC converter input places a bulk capacitor to smooth the voltage at the converter input and to absorb the ripple current generated by the DC/DC converter. The selection of the bulk capacitor is typically dependent on the ripple current capability and the length of the cable between the fuel cell and DC/DC converter. In our design, a total of 30 mF electrolytic capacitors are placed to smooth the 120-Hz ripple current that reflects from the inverter side and a total of 60-µF polypropylene capacitors are placed to absorb high-frequency ripples caused by the DC/DC converter switching.

Although the input side capacitors can provide substantial energy storage, the output side of the DC/DC converter also allows additional energy storage to compensate for fuel cell transients. Assume the inverter output allows 15% below nominal value, or 102V AC for a 120V AC line. To generate this 102 V AC, at least 144 V DC is needed for the inverter input. With 200V as the regulated nominal DC bus voltage, the total output capacitance required for DC/DC converter can be found as follow:

First, input capacitor transient energy, if the voltage drops from 43V to 27V, the discharged energy $E_1$ is:

$$E_1 = \frac{1}{2} \cdot C_{in} \cdot (V_{in1}^2 - V_{in2}^2) = \frac{1}{2} \cdot 0.03 \cdot (43^2 - 27^2) \approx 17(J).$$

Second, required additional energy $E_2$ is:

$$E_2 = \Delta E - E_1 = 24(J)$$

Third, output capacitor energy, assuming voltage drops from 200V to 144V, is:

$$E_2 = \frac{1}{2} \cdot C_o \cdot (V_{o1}^2 - V_{o2}^2).$$

Rearranging the equation yields:

$$C_o = \frac{E_2}{\frac{1}{2} \cdot (V_{o1}^2 - V_{o2}^2)} = \frac{24}{\frac{1}{2} \cdot (200^2 - 144^2)} \approx 2.5 \, m(F).$$

It should be mentioned here that the above transient test is performed on the step-load between no-load and 1.4 kW. For typical load steps within the nominal 1.2 kW range, a bulk capacitor of 2.2 mF is sufficient and thus may be used in our design.

Figure 48:
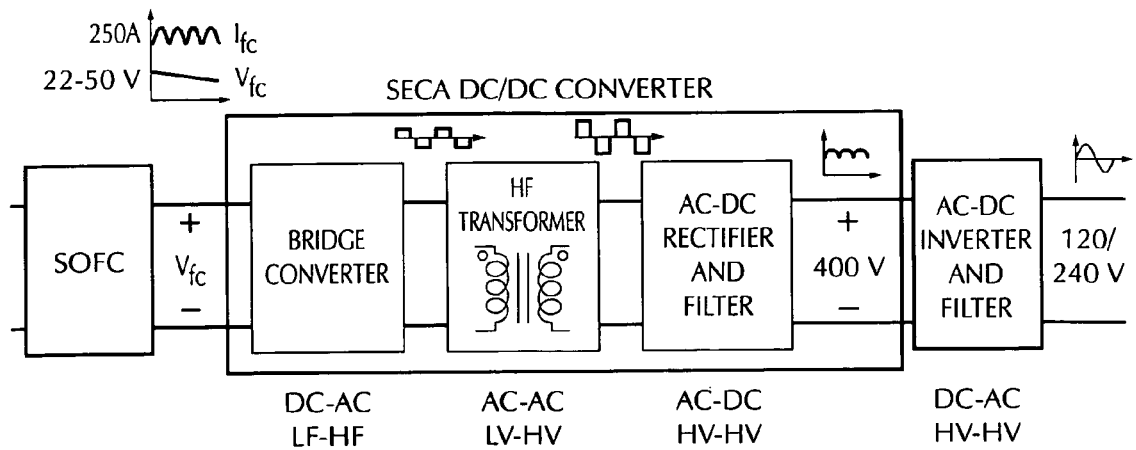
FIG. 48 is a block diagram of a SOFC power plant according to the present invention.

The present invention also contemplates a fuel cell power plant comprising a DC/DC converter. A potential fuel cell, according to the present invention, is depicted in FIG. 48, which is a block diagram of an SOFC power plant that contains a low-voltage high current DC/DC converter and a DC/AC inverter. The fuel cell output or converter input is low-voltage DC with a wide range variation. Plant output is high voltage AC. The output of the DC/DC converter, or the input of the DC/AC inverter for 120V AC is typically 200V and for 240V AC is about 400V. Multiple stage power conversions including isolation as needed may be provided.

For a nominal 20V, 5 kW fuel cell under full load condition, the voltage $V_{fc}$ is 20V, and the average current $I_{fc}$ is 250 A. The ripple is added on top of the average current with a peak current that tends to overload the fuel cell periodically. The fuel cell can experience nuisance tripping with such a ripple related overload situation. Adding energy storage capacitor either on the high-side DC bus or on the low-side fuel cell DC bus may help reduce the ripple, but the cost and size of added energy storage components may be objectionable when the ripple is reduced to an acceptable range. Laboratory test indicated a peak-to-peak ripple of 34% is obtained with a typical 1.2-kW design. This ripple current component implies that fuel cell requires a power handling capability 17% higher than its nominal output rating.

A SECA DC/DC converter may have the topographies indicated in FIGS. 17, 44, 45, 46 and 47, in addition to the V6 converter of the present invention. These alternative converters may be used in association with the ripple current control of the present invention. A fuel cell comprising the ripple current and a converter are seen to be included herein, as well as, a fuel cell comprising solely the 6V converter of the present invention. A fuel cell having a six-phase converter on the input side, and an AC-DC rectifier and filter deposed on the output side of the DC/DC converter is a preferred embodiment.

Figure 44:
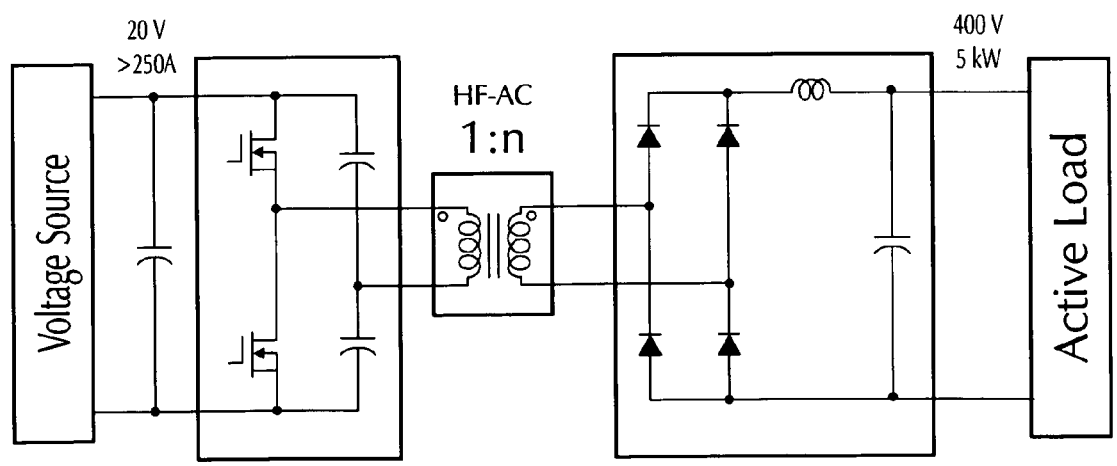
FIG. 44 is a circuit diagram showing a sing-phase option with a half-bridge converter.
Figure 45:
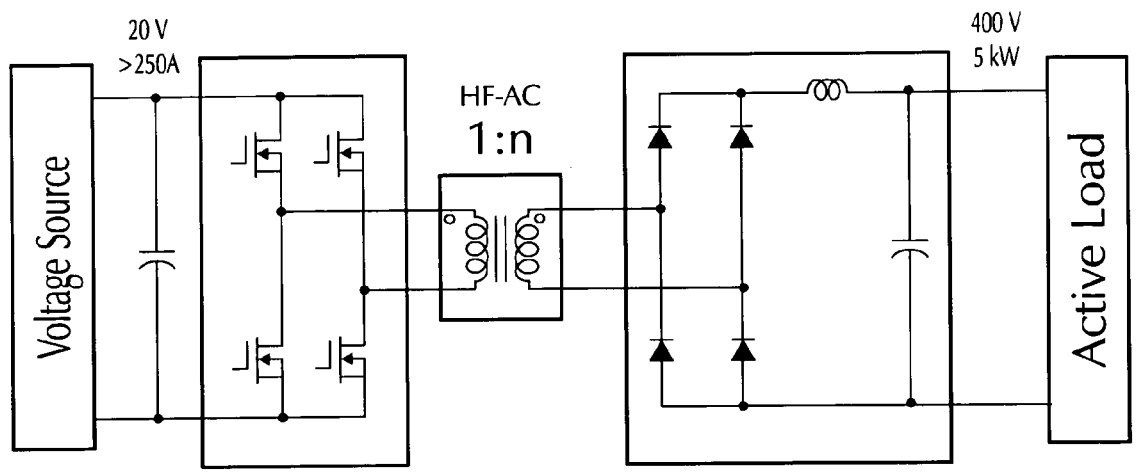
FIG. 45 is a circuit diagram showing a two-phase option with a full-bridge converter.

Several DC/DC alternatively converter topology options that can used in conjunction with the ripple reduction aspect of the present invention are shown. FIG. 44 shows a single-phase option with a half-bridge converter. FIG. 45 shows a two-phase option with a full-bridge converter.

Figure 46:
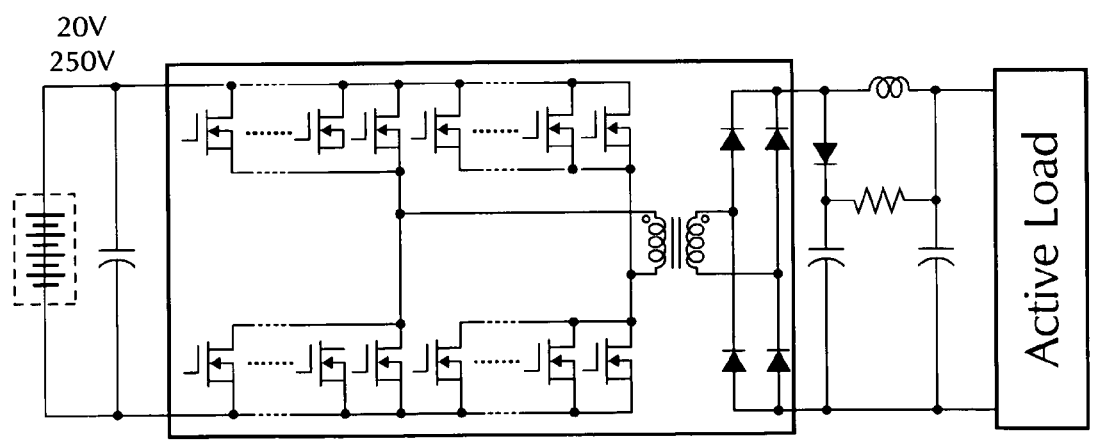
FIG. 46 is a circuit diagram showing a full-bridge converter with paralleled devices to achieve the desired efficiency.

FIG. 46 shows a full-bridge converter with paralleled devices to achieve the desired efficiency. The simplest version of FIG. 46 is shown in FIG. 17. This embodiment of a DC/DC inverter utilizes six devices in parallel; however, this two-leg converter barely achieves 97% efficiency. Unfortunately, this embodiment has problems including additional losses in parasitic components, voltage clamp, interconnects, filter inductor, transformer, diodes, and the like.

Figure 47:
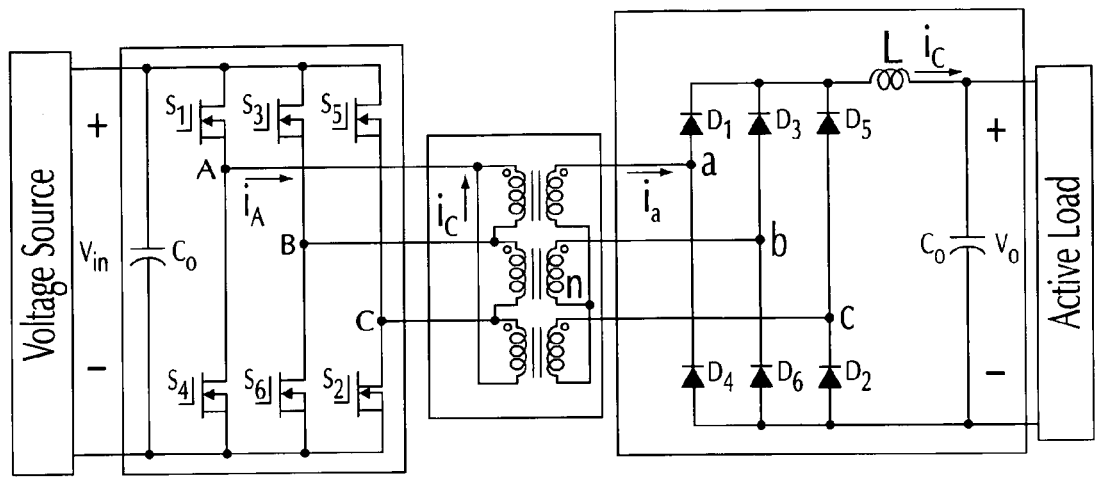
FIG. 47 is a circuit diagram showing a three-phase option with a three-phase bridge converter.

FIG. 47 shows a three-phase option with a three-phase bridge converter. This embodiment of the DC/DC converter utilizes hard switching with four devices in parallel per switch. The efficiency of the embodiment of FIG. 47 is about 95%.

Figure 49A:
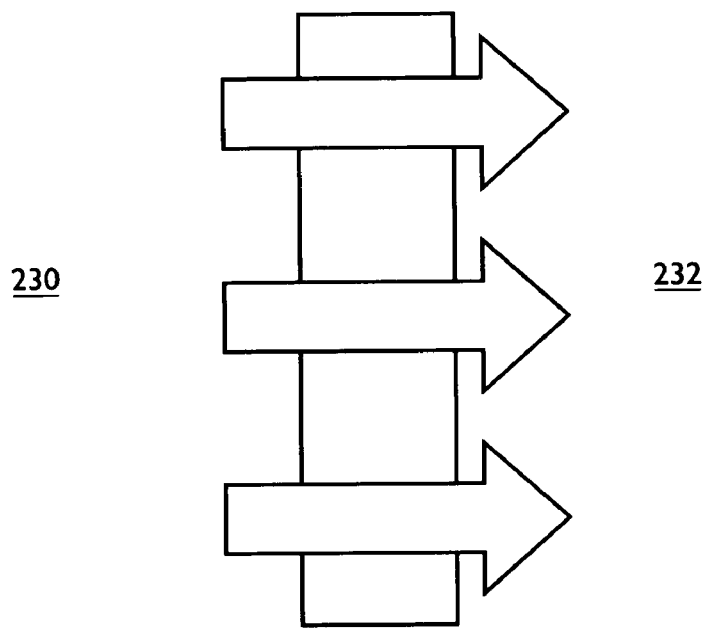
FIGS. 49a and 49b are diagrams which can be used to explain the basic calorimeter principle and the basic setup of a calorimeter.
Figure 49B:
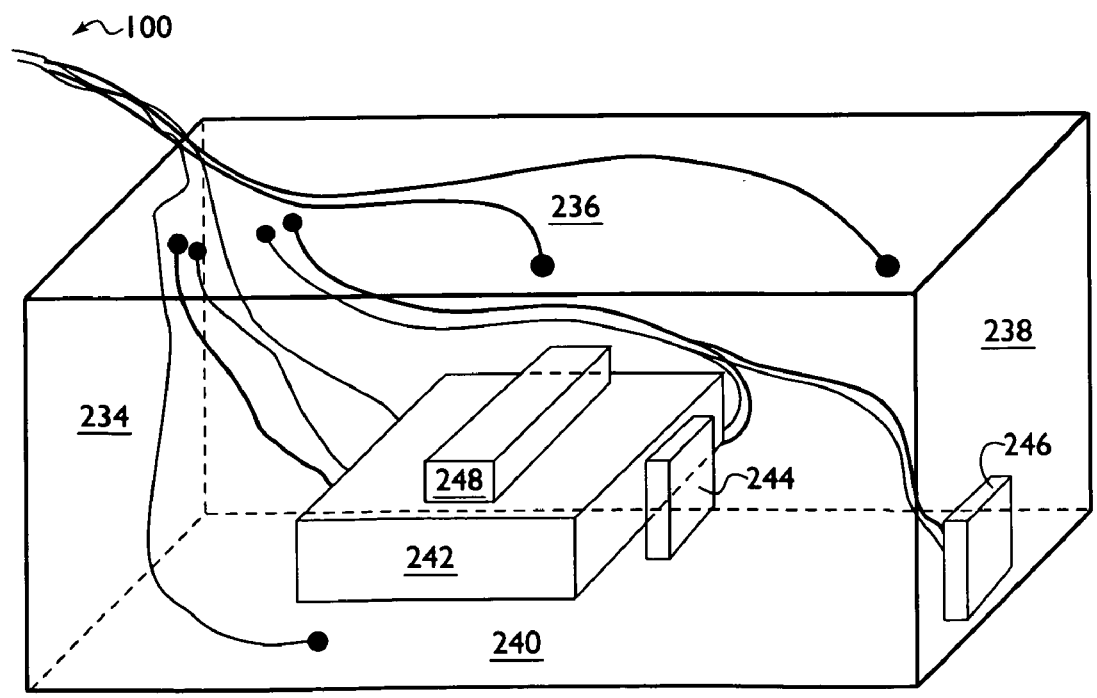

A significant aspect of the present invention is that it does not generate inordinate amounts of heat. A calorimeter setup and test for demonstration of fuel cell for accurate loss measurements were determined. A 50-liter calorimeter was used following calibration. A 160-liter calorimeter was also used following calibration. FIGS. 49a and 49b can be used to explain the basic calorimeter principle. For FIG. 49a, the difference in temperature ($T_{hot}$ and $T_{cold}$) of the internal ambient air 230 and the outside ambient air 232 are used to calculate the heat flow. The formula used in analysis is $$\frac{Q}{t} = \frac{k \cdot A \cdot (T_{hot} - T_{cold})}{d};$$

where $$\frac{Q}{t}$$

is heat flow (W), k=thermal conductivity of the barrier (k≅0.029 W/m·K for Styrofoam), A=surface area (m²), T=temperature (° C.) and d=thickness of barrier. FIG. 49b shows the basic setup of a calorimeter having a lid end 234, middle 236, fan end 238, two fans 244 and 246, power resistors 248, heat sink 242 and bottom 240, as indicated. A data logger 250 is attached at various points, as indicated, to monitor temperature.

Figure 50A:
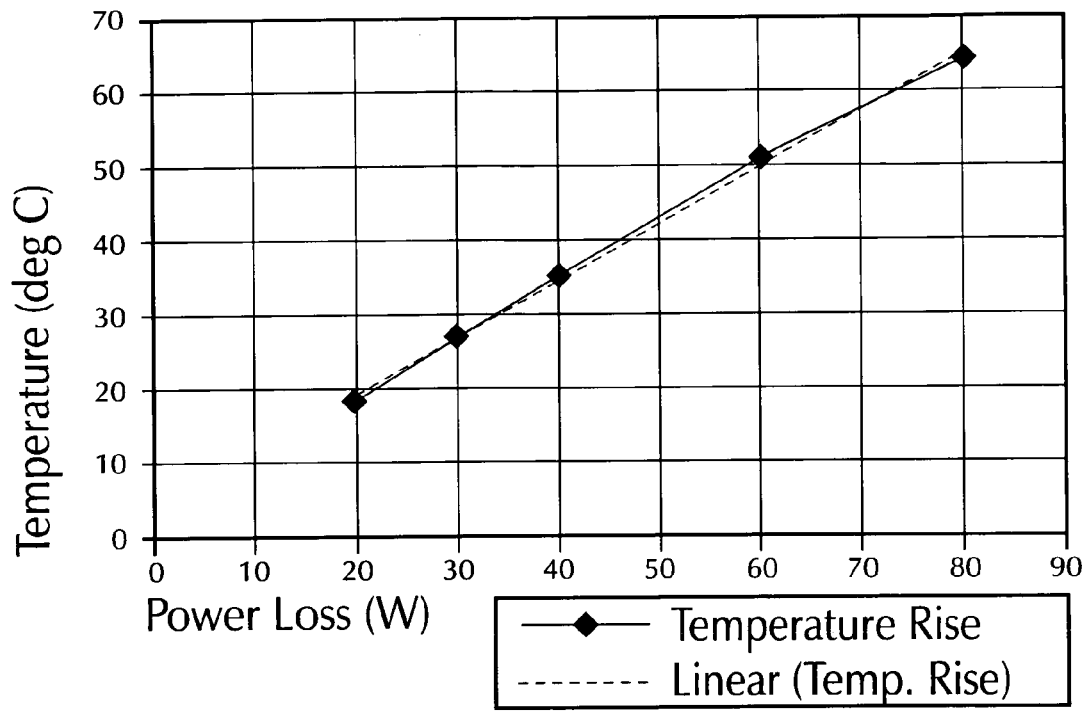
FIGS. 50a-50c are graphs depicting (a) the results of testing of the 50-liter calorimeter, (b) the test results of the 160- liter calorimeter at 120 W conditions, and (c) the temperature rise versus power loss respectively.
Figure 50B:
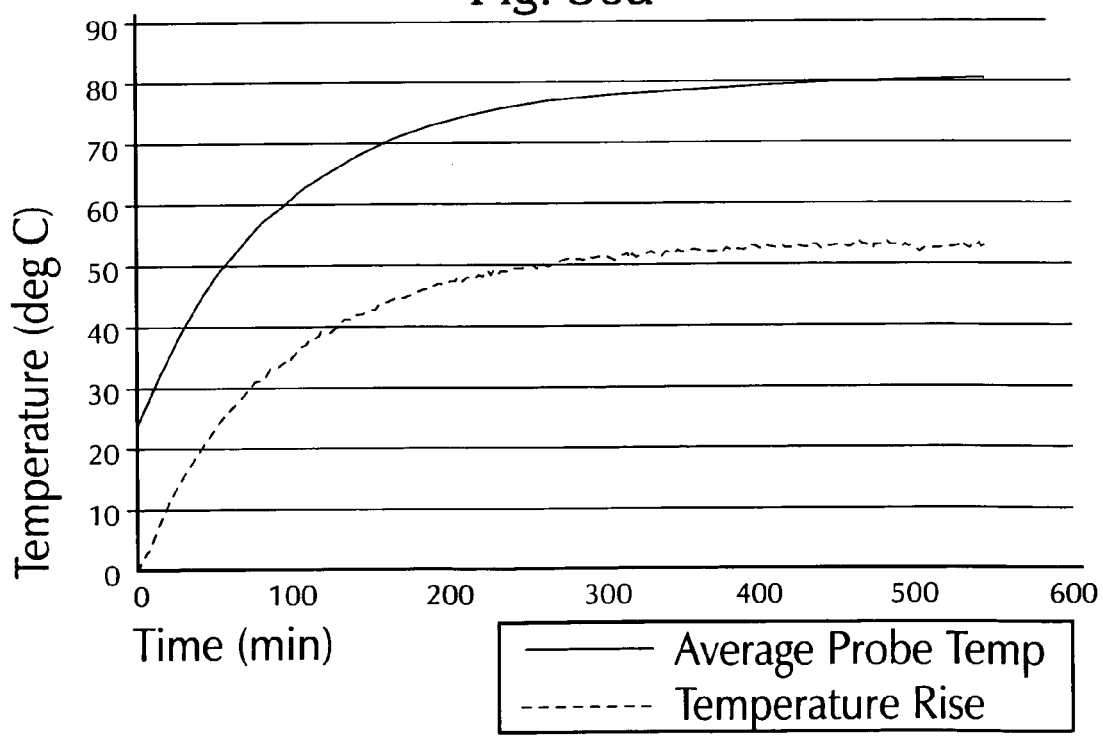
Figure 50C:
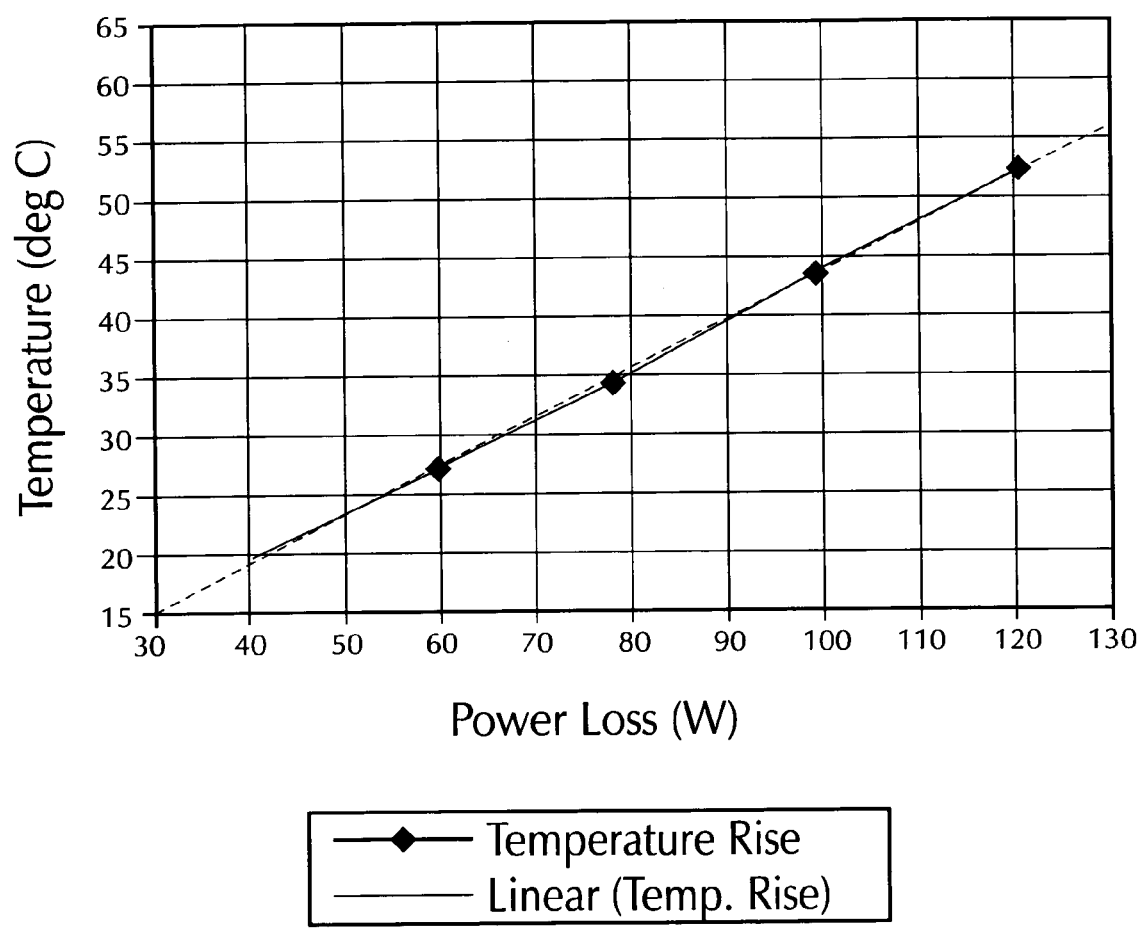

Testing was performed with PEM fuel cells. The results of testing of the 50-liter calorimeter are shown in FIG. 50a, while the test results of the 160-liter calorimeter at 120 W conditions are depicted in FIG. 50b. Temperature rise versus power loss are depicted in FIG. 50c. There are some design trade-offs between control loop bandwidth and low frequency ripple reduction effect. Once the current loop bandwidth is high enough, the dynamic response and ripple performance are no longer sensitive to the current loop bandwidth changes. Instead, the voltage loop bandwidth becomes very sensitive to the ripple magnitude. FIGS. 51a and 51b compare the ripple performance under three different voltage loop bandwidths with current loop bandwidth at 667 Hz and 2 kHz.

FIG. 51a compares the ripple performance with current loop bandwidth being set at 667 Hz and voltage loop bandwidth being set at 1.2 Hz, 2 Hz, and 4 Hz wherein the graph line for 1.2 Hz is denoted 251, 2 Hz is denoted 253, 4 Hz denoted 255. It is apparent that the ripple performance is the best with 1.2 Hz bandwidth. The same comparison is also applied to the case, FIG. 51b, with current loop bandwidth being set at 2 kHz and voltage loop bandwidth being set at 1.2 Hz, 2 Hz, and 4 Hz wherein the graph line for 1.2 Hz is denoted 257, 2 Hz is denoted 259, 4 Hz is denoted 261. Again, the 1.2 Hz voltage loop bandwidth gives the best ripple performance. However, the performance difference between two current loop bandwidths is invisible. In other words, the voltage loop bandwidth is in fact the dominant factor for the ripple current reduction. Such an argument may be contrary to the common sense, but it can be explained to be the case that the voltage loop and current loop are fighting each other, and a faster voltage loop can hurt current loop performance.

Although lower voltage loop bandwidth seems to be more favorable to the ripple performance, its transient response will be suffered, and a large overshoot or undershoot output voltage can be expected during load transient. In this study, the hardware was implemented with a voltage loop bandwidth of 2 Hz, and a current loop bandwidth of 667 Hz.

Low frequency current ripple generated by a single-phase inverter can be filtered by energy storage type passive capacitors or suppressed by active control techniques. The size of capacitors can be determined for a desired ripple performance either with high-voltage or low-voltage side capacitors. The studied case indicates that the capacitor size is approximately related to the $n^{th}$ power of the per unit ripple reduction, where n is 1.5 for high side capacitor, and 2 for low-side capacitor. The amount of capacitor saving using active technique can be easily translated to cost saving.

It is to be understood that the present invention is not limited to the embodiments described above, but encompasses any and all embodiments within the scope of the following claims.

What is claimed is:

1. A fuel cell power management structure comprising:
   a. a multiphase soft switch DC/DC converter comprising:
      i. a transformer, an input side connected to a power source, and an output side connected to an output filter,
      ii. said transformer having a plurality of primary coils connected to said input side and a plurality of secondary coils connected to said output side,
      iii. wherein each primary coil connects a full-bridge circuit and each full-bridge circuit comprises two switches on two legs,
      iv. said primary coil being connected between said switches on each leg of the full bridge circuit,
      v. each full-bridge circuit being connected in parallel to each other such that each leg is disposed parallel to one another and to said power source, and
      vi. said secondary coils connected to a rectifying circuit; and
   b. a ripple reduction control circuit comprising:
      i. an outer loop control circuit disposed parallel to said DC/DC converter for reducing ripple in a voltage reference.

2. The fuel cell power management structure of claim 1, wherein:
   the multiphase soft switch DC/DC converter further comprises at least one capacitor in parallel with said power source.

3. The fuel cell power management structure of claim 1, wherein:
   the multiphase soft switch DC/DC converter further comprises a plurality of capacitors equivalent to the number of primary coils wherein each capacitor is connected in parallel with each half bridge circuit.

4. The fuel cell power management structure of claim 1, wherein:
   the multiphase soft switch DC/DC converter further comprising: a leakage inductor connected to said primary coil.

5. The fuel cell power management structure of claim 1, wherein:
   each of said secondary coils further connected to a leg between two diodes each leg disposed parallel to one another with the load disposed across.

6. The fuel cell power management structure of claim 1, wherein:
   there are n primary coils and n secondary coils wherein n is an integer greater than or equal to 2.

7. The fuel cell power management structure of claim 1, wherein:
   there are three secondary coils having a wye coil configuration.

8. The fuel cell power management structure of claim 6, wherein: n is equal to three.

9. The fuel cell power management structure of claim 8, wherein:
   the multiphase soft switch DC/DC converter further comprises a control circuit operable for controlling each full-bridge circuit with a phase shift in the range of 120-180 degrees.

10. The fuel cell power management structure of claim 6, wherein:
    the multiphase soft switch DC/DC converter further comprises a control circuit operable for controlling each full-bridge circuit with a phase shift in the range l degrees to h degrees wherein l is equivalent to 360 degrees divided by n and h is equivalent to l plus 60 degrees.

11. The fuel cell power management structure of claim 6, wherein:
    the control circuit, further comprises: an inner loop control circuit for reducing ripple in a current reference.

12. A method for operating an n phase power converter, comprising:
    a. providing an n phase soft switch DC/DC converter, wherein the n phase soft switch DC/DC converter comprises:
       i. a transformer, an input side connected to a power source, and an output side connected to an output filter,
       ii. said transformer having a plurality of primary coils connected to said input side and a plurality of secondary coils connected to said output side,
       iii. wherein each primary coil connects a full-bridge circuit and each full-bridge circuit comprises two switches on two legs,
       iv. said primary coil being connected between said switches on each leg of the full bridge circuit,
       v. each full-bridge circuit being connected in parallel to each other such that each leg is disposed parallel to one another and to said power source, and
       vi. said secondary coils connected to a rectifying circuit;
    b. operating each individual full-bridge circuit with a phase shift in the range l degrees to h degrees wherein l is equivalent to 360 degrees divided by n and h is equivalent to l plus 60 degrees.

13. The method of claim 12, wherein:
    the multiphase soft switch DC/DC converter further comprises at least one capacitor in parallel with said power source.

14. The method of claim 12, wherein:

the multiphase soft switch DC/DC converter further comprises a plurality of capacitors equivalent to the number of primary coils wherein each capacitor is connected in parallel with each half bridge circuit.

15. The method of claim 12, wherein:

the multiphase soft switch DC/DC converter further comprising: a leakage inductor connected to said primary coil.

16. The method of claim 12, wherein:

each of said secondary coils further connected to a leg between two diodes each leg disposed parallel to one another with the load disposed across.

17. The method of claim 12, wherein:

there are n primary coils and n secondary coils wherein n is an integer greater than or equal to 2.

18. The method of claim 17, wherein:

there are three secondary coils having a wye coil configuration.

19. The method of claim 17, wherein:

n is equal to three.

20. The method of claim 19, wherein:

the phase shift is in the range of 120-180 degrees.

21. The method of claim 12 further comprising:

a ripple reduction control circuit, comprising: an outer loop control circuit with a first outer loop pole and a second outer loop pole for reducing ripple in a voltage reference.

22. The method of claim 21, wherein:

the control circuit further comprises: an inner loop control circuit with a first inner loop pole and a second inner loop pole for reducing ripple in a current reference.

* * * * *